US012632214B2

(12) United States Patent
Paul

(10) Patent No.: US 12,632,214 B2
(45) Date of Patent: May 19, 2026

(54) AUDIO-BASED MESSAGING

(71) Applicant: Apple Inc., Cupertino, CA (US)

(72) Inventor: Grant R. Paul, San Francisco, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 18/327,318

(22) Filed: Jun. 1, 2023

(65) Prior Publication Data

US 2024/0111479 A1 Apr. 4, 2024

Related U.S. Application Data

(60) Provisional application No. 63/365,728, filed on Jun. 2, 2022.

(51) Int. Cl.

| | |
|---|---|
| ***G06F 3/048*** | (2013.01) |
| ***G06F 3/0482*** | (2013.01) |
| ***G06F 3/0484*** | (2022.01) |
| ***G06F 3/16*** | (2006.01) |
| *G10L 15/26* | (2006.01) |

(52) U.S. Cl.

CPC ............ *G06F 3/165* (2013.01); *G06F 3/0482* (2013.01); *G06F 3/0484* (2013.01); *G06F 3/167* (2013.01); *G10L 15/26* (2013.01)

(58) Field of Classification Search

CPC ...... G06F 3/165; G06F 3/0482; G06F 3/0484; G06F 3/167; G06F 3/0488; G06F 3/04883; G10L 15/26

See application file for complete search history.

(56) References Cited

U.S. PATENT DOCUMENTS

| | | |
|---|---|---|
| 6,323,846 B1 | 11/2001 | Westerman et al. |
| 6,570,557 B1 | 5/2003 | Westerman et al. |
| 6,677,932 B1 | 1/2004 | Westerman |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,844,914 B2 | 11/2010 | Andre et al. |
| 7,957,762 B2 | 6/2011 | Herz et al. |
| 8,006,002 B2 | 8/2011 | Kalayjian et al. |
| 8,239,784 B2 | 8/2012 | Hotelling et al. |
| 8,279,180 B2 | 10/2012 | Hotelling et al. |
| 8,381,135 B2 | 2/2013 | Hotelling et al. |
| 8,479,122 B2 | 7/2013 | Hotelling et al. |

(Continued)

FOREIGN PATENT DOCUMENTS

| | | | |
|---|---|---|---|
| CN | 106575149 A * | 4/2017 | ........... G06F 1/1686 |
| WO | 2013/169849 A2 | 11/2013 | |
| WO | 2014/105276 A1 | 7/2014 | |

OTHER PUBLICATIONS

International Search Report received for PCT Application No. PCT/US2023/017335, mailed on Aug. 22, 2023, 6 pages.

(Continued)

*Primary Examiner* — Rashawn N Tillery
(74) *Attorney, Agent, or Firm* — Kubota & Basol LLP

(57) ABSTRACT

In some embodiments, an electronic device facilitates efficient inputting of audio-based messages. In some embodiments, an electronic device facilitates efficient transcription of audio into text-based messages.

36 Claims, 34 Drawing Sheets

(56) References Cited

U.S. PATENT DOCUMENTS

| | | | | |
|---|---|---|---|---|
| 8,805,690 | B1 * | 8/2014 | Lebeau | H04M 1/6091 704/270.1 |
| 9,348,458 | B2 | 5/2016 | Hotelling et al. | |
| 9,933,937 | B2 | 4/2018 | Lemay et al. | |
| 10,431,216 | B1 * | 10/2019 | Lemon | G06F 3/017 |
| 10,530,731 | B1 * | 1/2020 | Wu | H04L 51/046 |
| 10,732,721 | B1 | 8/2020 | Clements | |
| 11,765,114 | B2 | 9/2023 | Jon et al. | |
| 2002/0015024 | A1 | 2/2002 | Westerman et al. | |
| 2005/0190059 | A1 | 9/2005 | Wehrenberg | |
| 2006/0017692 | A1 | 1/2006 | Wehrenberg et al. | |
| 2006/0033724 | A1 | 2/2006 | Chaudhri et al. | |
| 2006/0197753 | A1 | 9/2006 | Hotelling | |
| 2009/0164219 | A1 * | 6/2009 | Yeung | G06F 3/01 704/258 |
| 2010/0150526 | A1 | 6/2010 | Rose et al. | |
| 2012/0113223 | A1 | 5/2012 | Hilliges et al. | |
| 2012/0151416 | A1 | 6/2012 | Bell et al. | |
| 2012/0218395 | A1 | 8/2012 | Andersen et al. | |
| 2014/0024324 | A1 * | 1/2014 | Mumick | H04W 4/10 455/90.1 |
| 2015/0035832 | A1 | 2/2015 | Sugden et al. | |
| 2015/0187093 | A1 | 7/2015 | Chu et al. | |
| 2015/0227285 | A1 | 8/2015 | Lee et al. | |
| 2015/0255067 | A1 * | 9/2015 | White | G10L 15/197 704/235 |
| 2015/0287403 | A1 * | 10/2015 | Holzer Zaslansky | G06T 13/205 704/231 |
| 2015/0350141 | A1 * | 12/2015 | Yang | H04M 1/72433 709/206 |
| 2015/0350147 | A1 * | 12/2015 | Shepherd | H04L 51/02 715/752 |
| 2016/0239165 | A1 * | 8/2016 | Chen | H04L 51/42 |
| 2017/0046872 | A1 | 2/2017 | Geselowitz et al. | |
| 2017/0357390 | A1 * | 12/2017 | Alonso Ruiz | G06F 3/0482 |
| 2018/0095635 | A1 | 4/2018 | Valdivia et al. | |
| 2018/0285028 | A1 * | 10/2018 | Yamada | H04N 1/00411 |
| 2018/0288206 | A1 * | 10/2018 | Stimpson | H04M 3/42391 |
| 2019/0130733 | A1 | 5/2019 | Hodge | |
| 2021/0319617 | A1 | 10/2021 | Ahn et al. | |
| 2021/0339134 | A1 | 11/2021 | Knoppert | |
| 2021/0352172 | A1 * | 11/2021 | Kim | H04R 27/00 |
| 2021/0407506 | A1 | 12/2021 | Drummond et al. | |
| 2023/0206921 | A1 * | 6/2023 | Edelsburg | G06F 3/165 704/235 |
| 2023/0315385 | A1 | 10/2023 | Akmal et al. | |
| 2023/0350539 | A1 | 11/2023 | Owen et al. | |

OTHER PUBLICATIONS

International Search Report received for PCT Application No. PCT/US2023/019458, mailed on Aug. 8, 2023, 7 pages.

Non-Final Office Action received for U.S. Appl. No. 18/305,201, mailed on May 23, 2024, 11 pages.

Camalich, Sergio, CSS Buttons with Pseudo-elements, Available online at: <https://tympanus.net/codrops/2012/01/11/css-buttons-with-pseudo-elements/>, [retrieved on Jul. 12, 2017], Jan. 11, 2012, 8 pages.

Notice of Allowance received for U.S. Appl. No. 18/305,201, mailed on Apr. 30, 2025, 5 pages.

Final Office Action received for U.S. Appl. No. 18/305,201, mailed on Jan. 2, 2025, 12 pages.

Notice of Allowance received for U.S. Appl. No. 18/295,137, mailed on Feb. 14, 2025, 10 pages.

* cited by examiner

700

702a

Display, via the display generation component, a messaging user interface that includes a respective selectable option for recording an audio message, the messaging user interface corresponding to a messaging conversation including a first user of the electronic device and a second user of a second electronic device, different from the electronic device 702b While displaying the messaging user interface, detect, via the one or more input devices, a first input including an initiation of a selection input detected at a location corresponding to the respective selectable option and a termination of the selection input, wherein the first input satisfies one or more first criteria 702c In response to detecting the initiation of the selection input, initiate a process to record a respective audio message at the electronic device 702d In response to detecting the termination of the selection input:

702e

In accordance with a determination that the termination of the selection input was detected at a first location corresponding to the respective selectable option, transmitting, to the messaging conversation, the respective audio message including audio recorded between the initiation of the selection input and the termination of the selection input 702f In accordance with a determination that the termination of the selection input was detected at a second location corresponding to a region of the messaging user interface other than the respective selectable option, terminate the process to record the respective audio message without transmitting the respective audio message to the messaging conversation

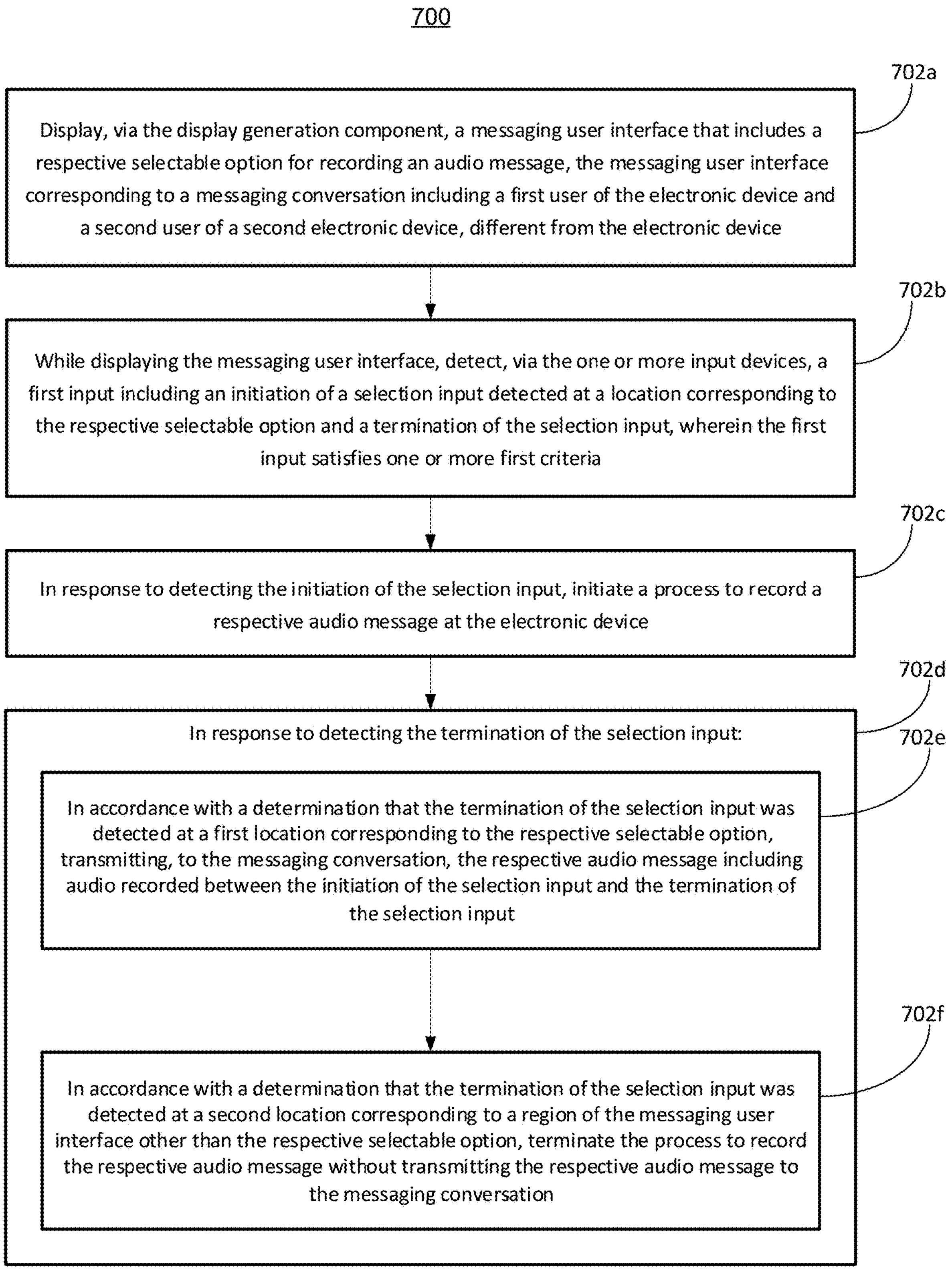

Display, via a display generation component, a user interface, including:    902a A text-entry region that includes a text cursor at a first location in the text-entry region    902b A first selectable option that is selectable to initiate a dictation mode at the electronic device    902c While displaying the user interface, detect, via one or more input devices, a first input corresponding to selection of the first selectable option    902d In response to detecting the first input, initiate the dictation mode and display, via the display generation component, a first visual indicator that indicates the dictation mode is active, wherein the first visual indicator is displayed at the first location of the text cursor in the text-entry region    902e While displaying the first visual indicator at the first location in the text-entry region and while the dictation mode is active, detect, via the one or more input devices, a second input that includes first speech input    902f While detecting the second input:    902g Display, via the display generation component, a first text representation of the first speech input at the first location in the text-entry region    902h Cease display of the first visual indicator in the text-entry region    902i

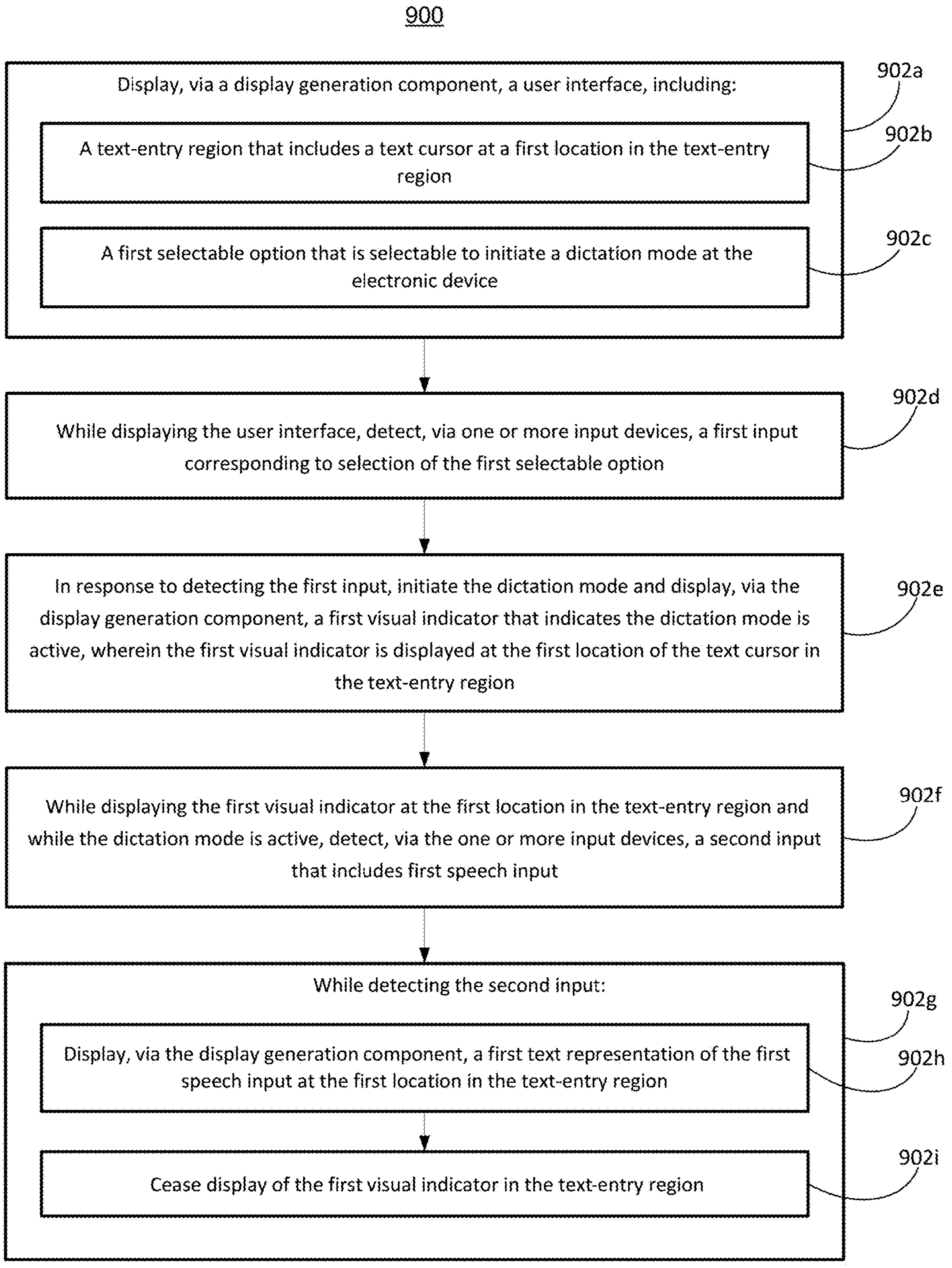

FIG. 9

AUDIO-BASED MESSAGING

CROSS-REFERENCE TO RELATED APPLICATIONS

This application claims the benefit of U.S. Provisional Application No. 63/365,728, filed Jun. 2, 2022, the content of which is incorporated herein by reference in its entirety for all purposes.

FIELD OF THE DISCLOSURE

This relates generally to electronic devices that generate audio-based messages, and user interactions with such devices.

BACKGROUND

User interaction with electronic devices has increased significantly in recent years. These devices can be devices such as computers, tablet computers, televisions, multimedia devices, mobile devices, and the like.

In some circumstances, users wish to input audio-based messages efficiently. Enhancing these interactions improves the user's experience with the device and decreases user interaction time, which is particularly important where input devices are battery-operated.

SUMMARY

Some embodiments described in this disclosure are directed to one or more electronic devices that facilitate efficient inputting of audio-based messages. Some embodiments described in this disclosure are directed to one or more electronic devices that facilitate efficient transcription of audio into text-based messages. The full descriptions of the embodiments are provided in the Drawings and the Detailed Description, and it is understood that the Summary provided above does not limit the scope of the disclosure in any way.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIG. 7 is a flow diagram illustrating a method of facilitating efficient inputting of audio-based messages in accordance with some embodiments.

FIG. 9 is a flow diagram illustrating a method of facilitating transcription of audio into text-based messages in accordance with some embodiments of the disclosure.

DETAILED DESCRIPTION

Figure 1A:
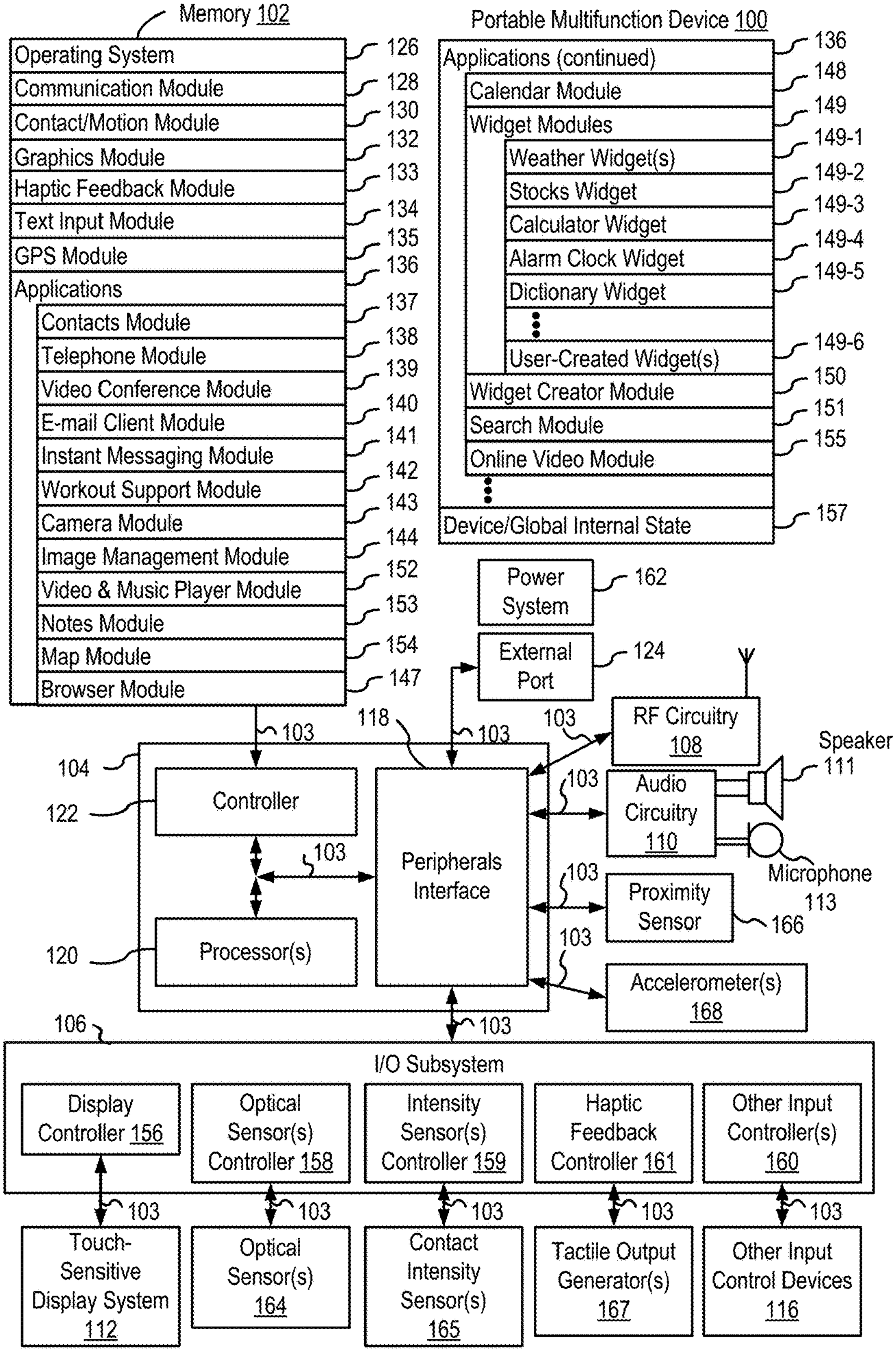
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods for inputting of audio-based messages. In some embodiments, an electronic device initiates a process to record an audio message in response to a touch and hold input, and either transmits the recorded audio message to a messaging conversation or cancels the recorded audio message in response to detecting termination of the touch and hold input depending on the location of the contact when the touch and hold input is terminated. Such techniques can reduce the cognitive burden on a user who uses such devices. Further, such techniques can reduce processor and battery power otherwise wasted on redundant user inputs.

There is a need for electronic devices that provide efficient methods for transcribing audio into text. In some embodiments, an electronic device activates a dictation mode at the electronic device in response to detecting selection of a selectable option. In some embodiments, while the dictation mode is active, the electronic device displays a visual indicator indicating that the dictation mode is active. In some embodiments, in response to detecting speech input, the electronic device displays text representation of the detected speech input in an entry field and ceases display of the visual indicator while the electronic device remains in the dictation mode. Such techniques can reduce the cognitive burden on a user who uses such devices. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, device 100 is a portable computing system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system (e.g., an integrated display, touch screen 112, etc.). In some embodiments, the display generation component is separate from the computer system (e.g., an external monitor, a projection system, etc.). As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
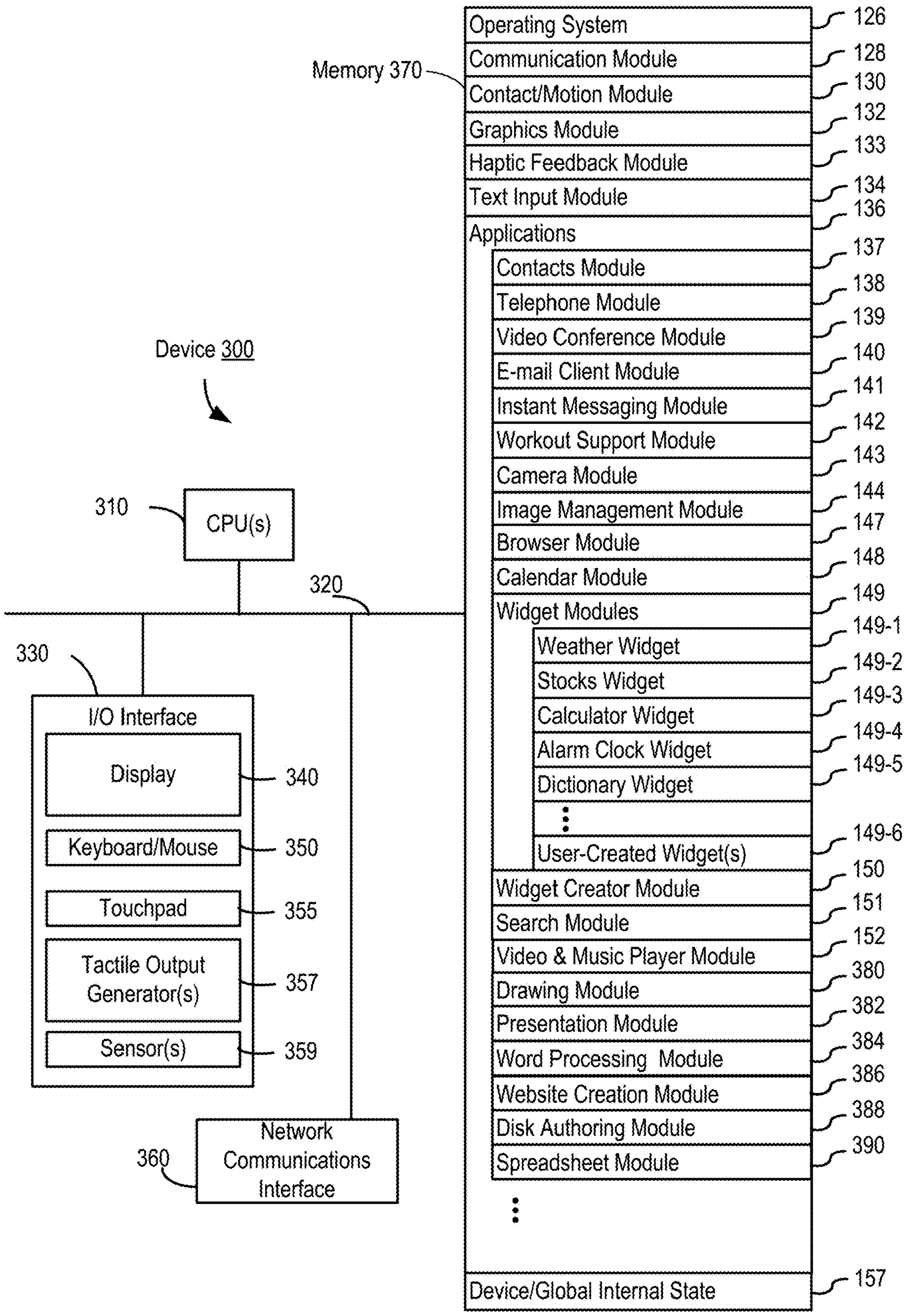
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client module 140, IM 141, browser 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
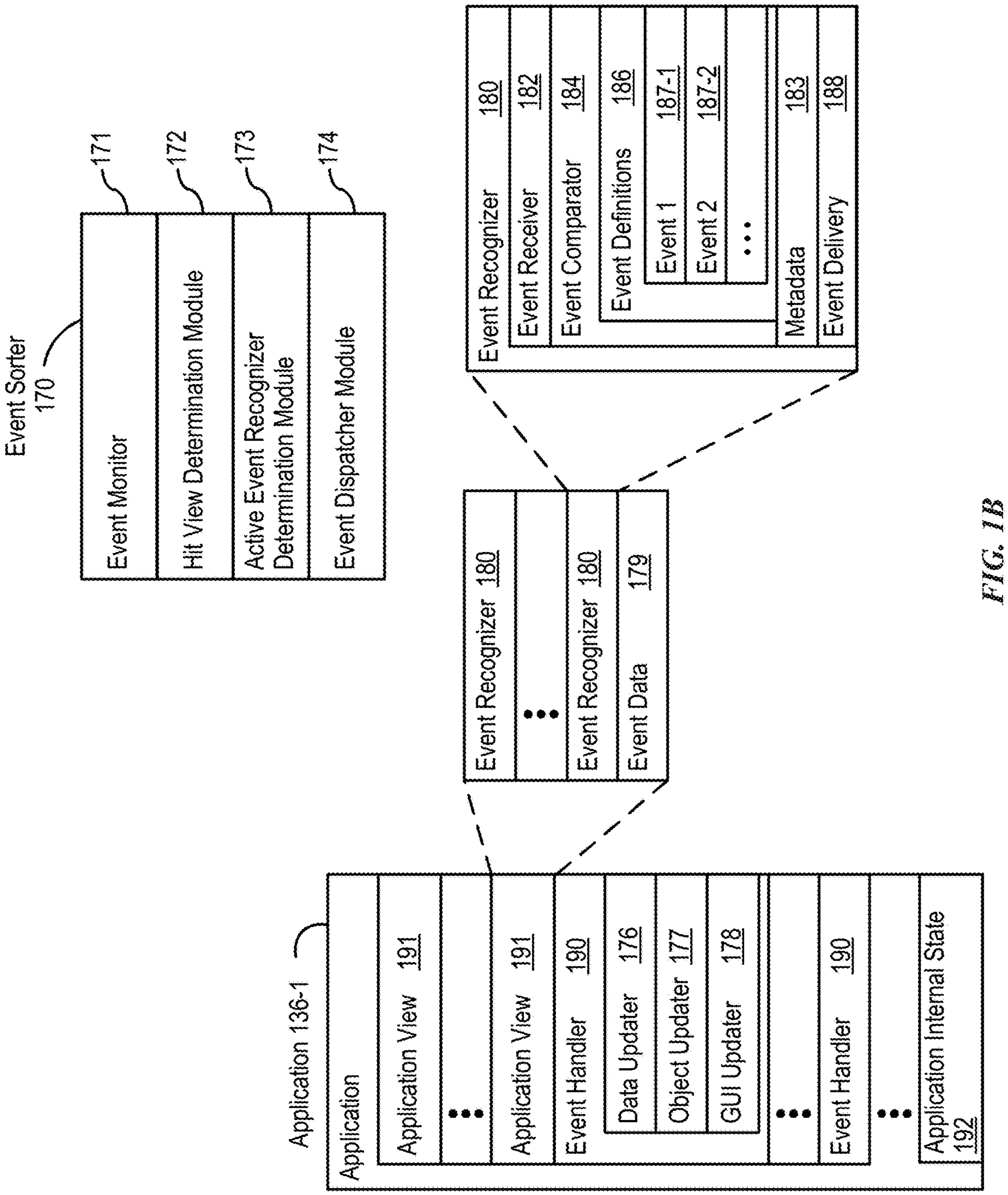
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
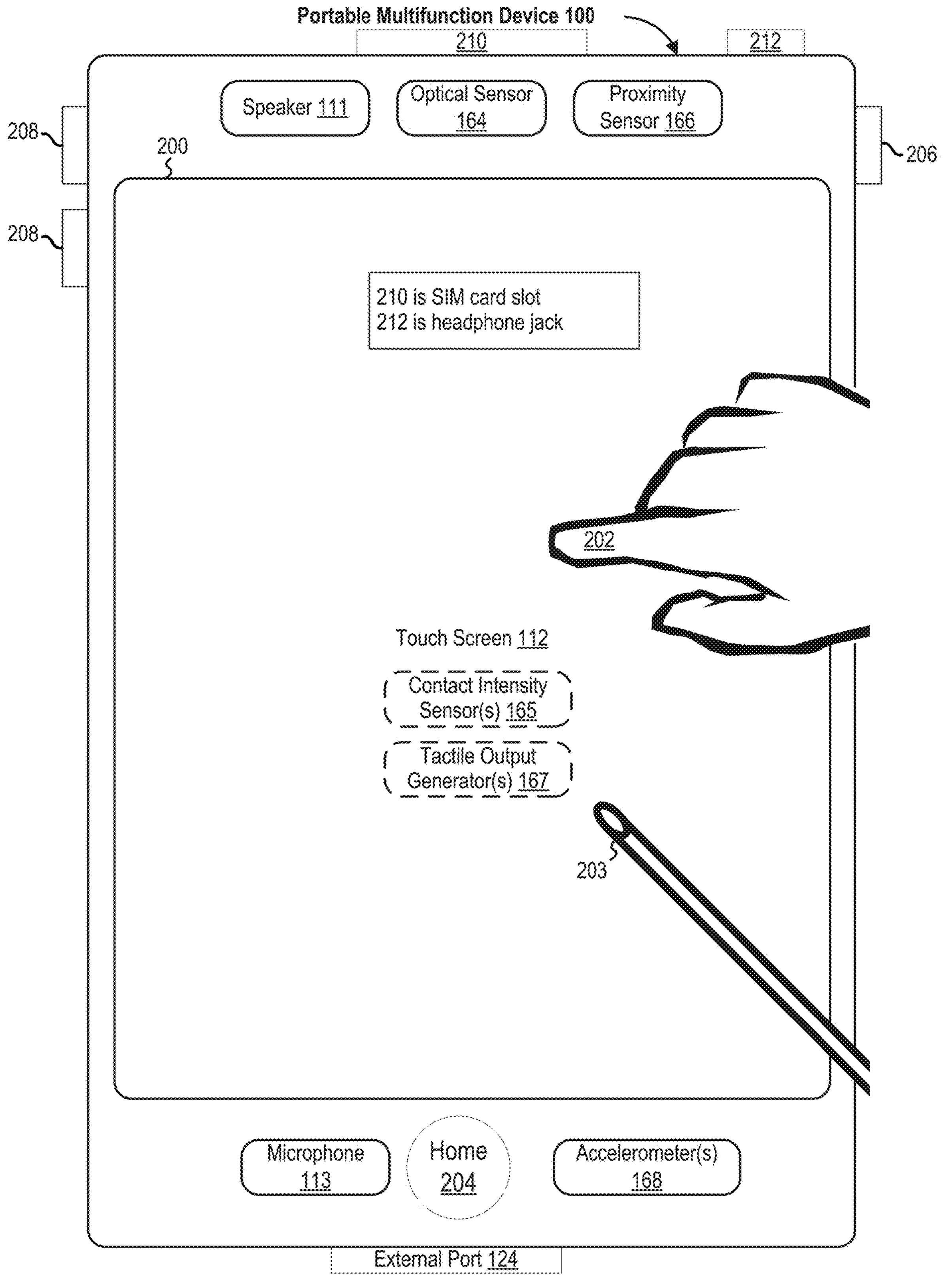
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

In some embodiments, stylus 203 is an active device and includes one or more electronic circuitry. For example, stylus 203 includes one or more sensors, and one or more communication circuitry (such as communication module 128 and/or RF circuitry 108). In some embodiments, stylus 203 includes one or more processors and power systems (e.g., similar to power system 162). In some embodiments, stylus 203 includes an accelerometer (such as accelerometer 168), magnetometer, and/or gyroscope that is able to determine the position, angle, location, and/or other physical characteristics of stylus 203 (e.g., such as whether the stylus is placed down, angled toward or away from a device, and/or near or far from a device). In some embodiments, stylus 203 is in communication with an electronic device (e.g., via communication circuitry, over a wireless communication protocol such as Bluetooth) and transmits sensor data to the electronic device. In some embodiments, stylus 203 is able to determine (e.g., via the accelerometer or other sensors) whether the user is holding the device. In some embodiments, stylus 203 can accept tap inputs (e.g., single tap or double tap) on stylus 203 (e.g., received by the accelerometer or other sensors) from the user and interpret the input as a command or request to perform a function or change to a different input mode.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
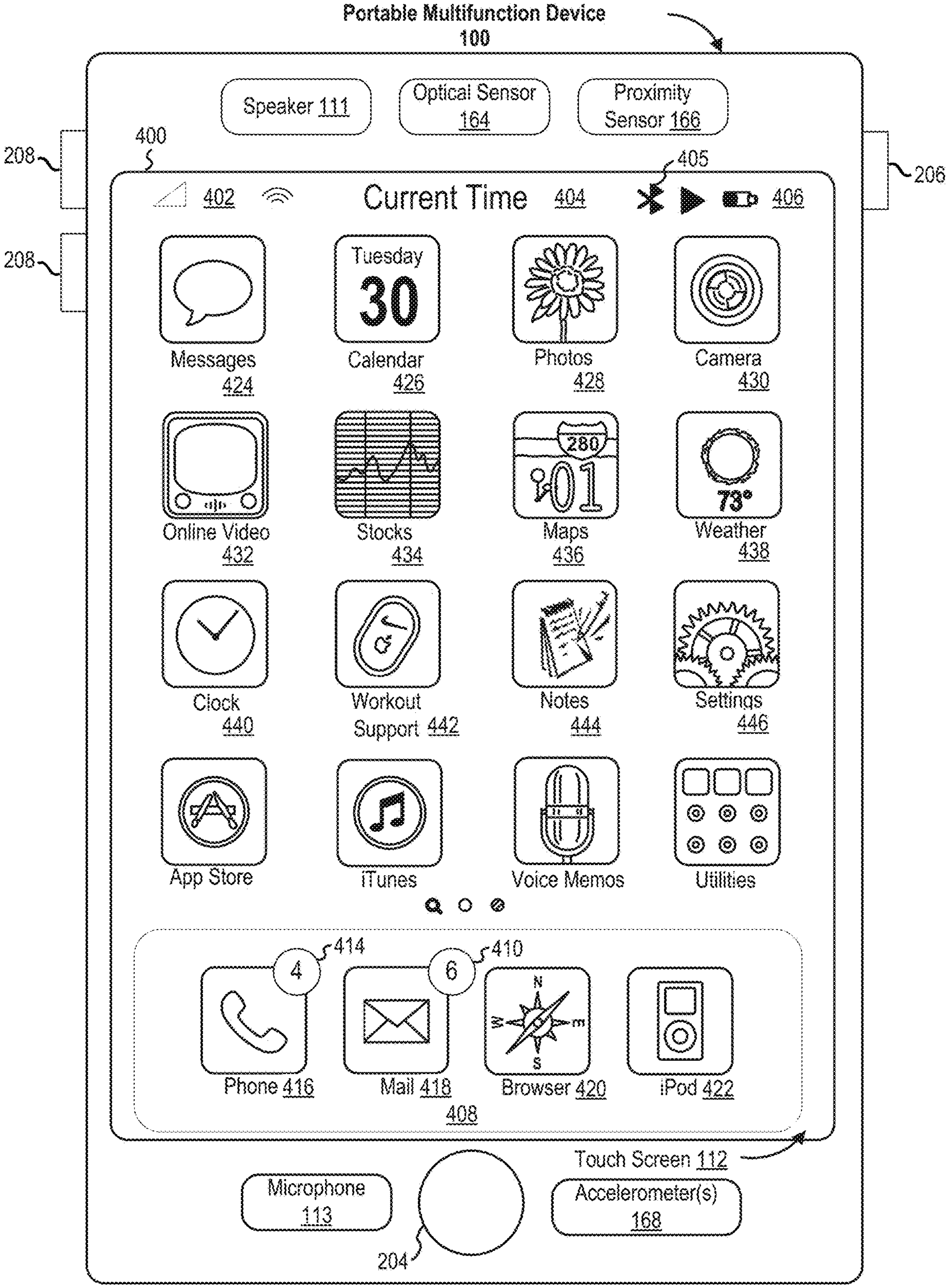
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
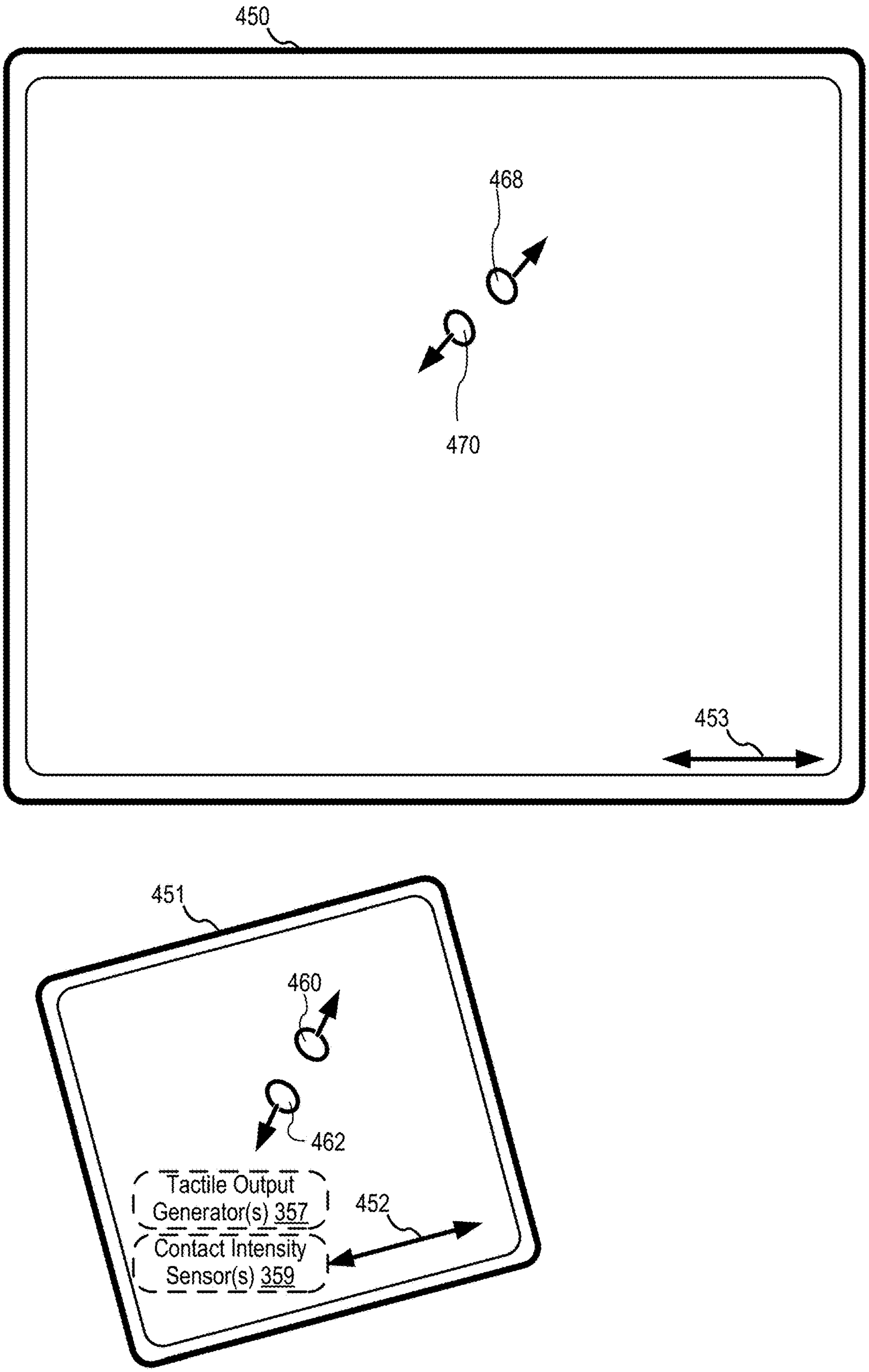
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
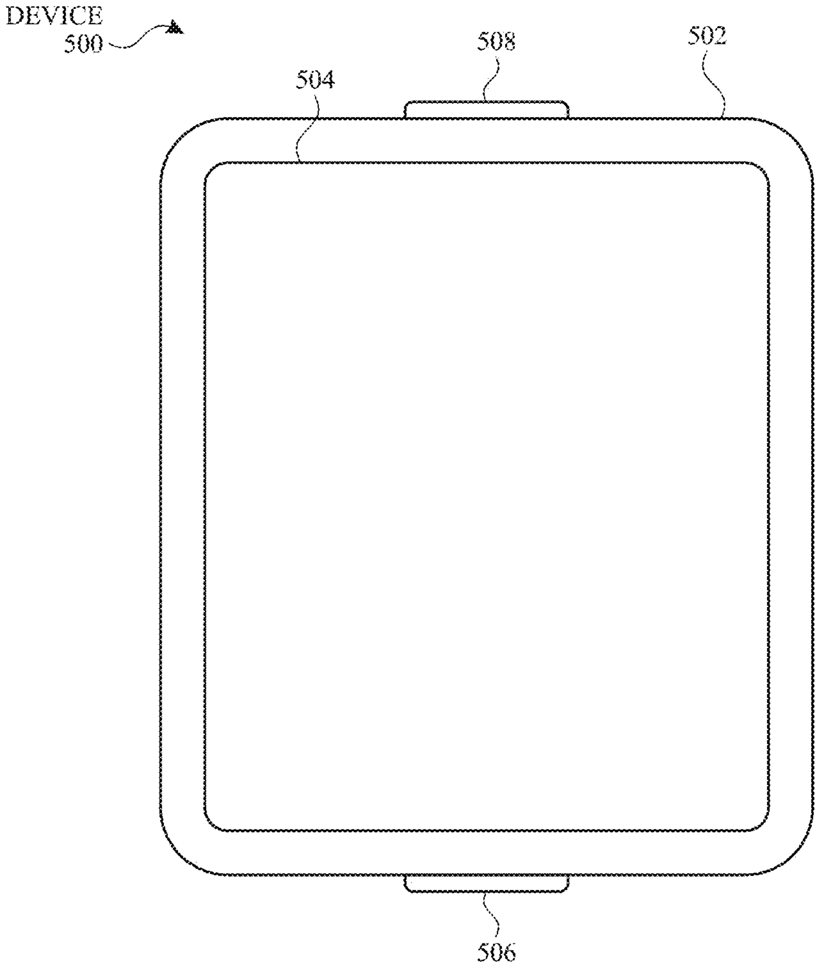
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
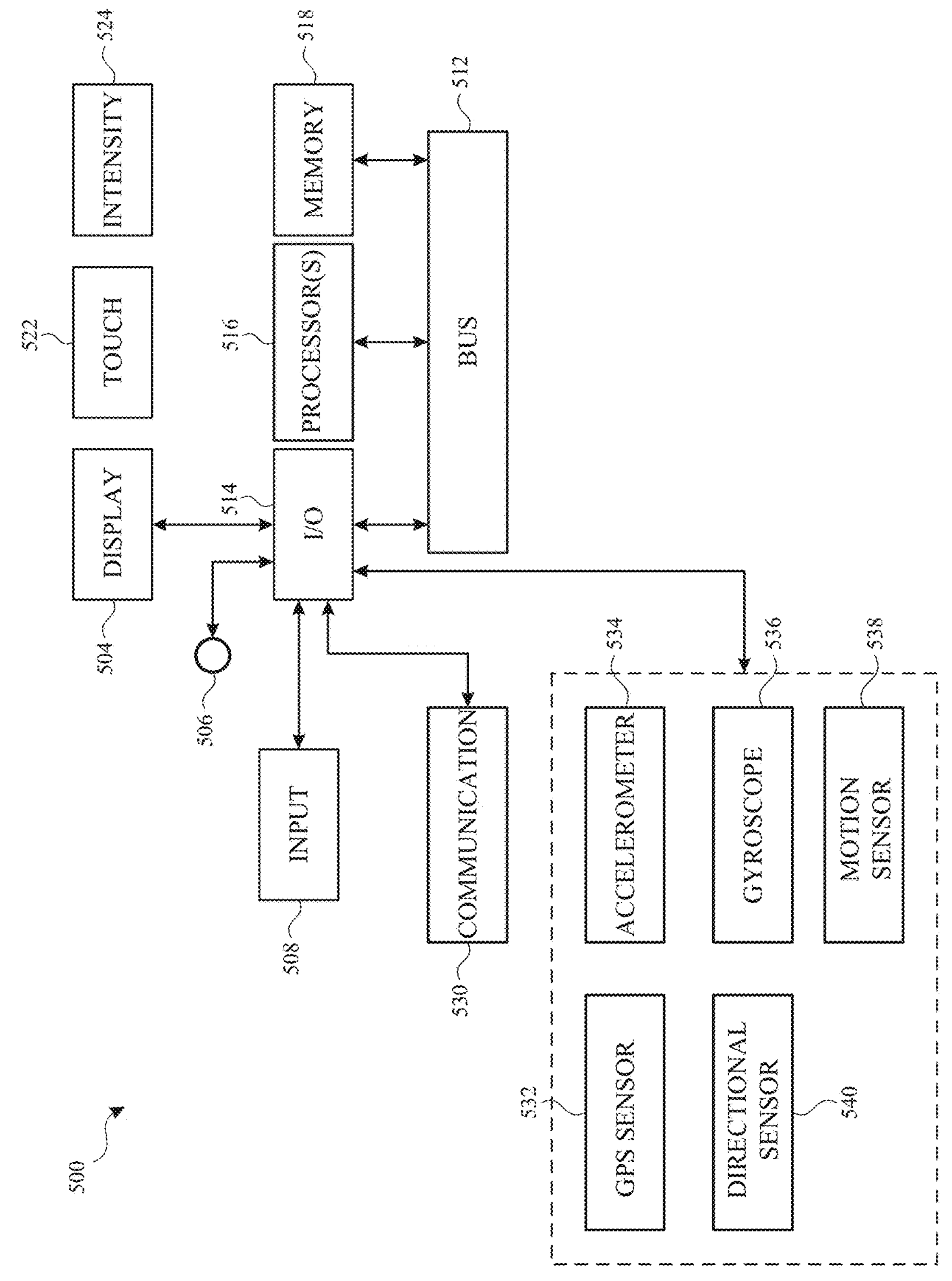
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 (FIG. 7) and/or 900 (FIG. 9). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
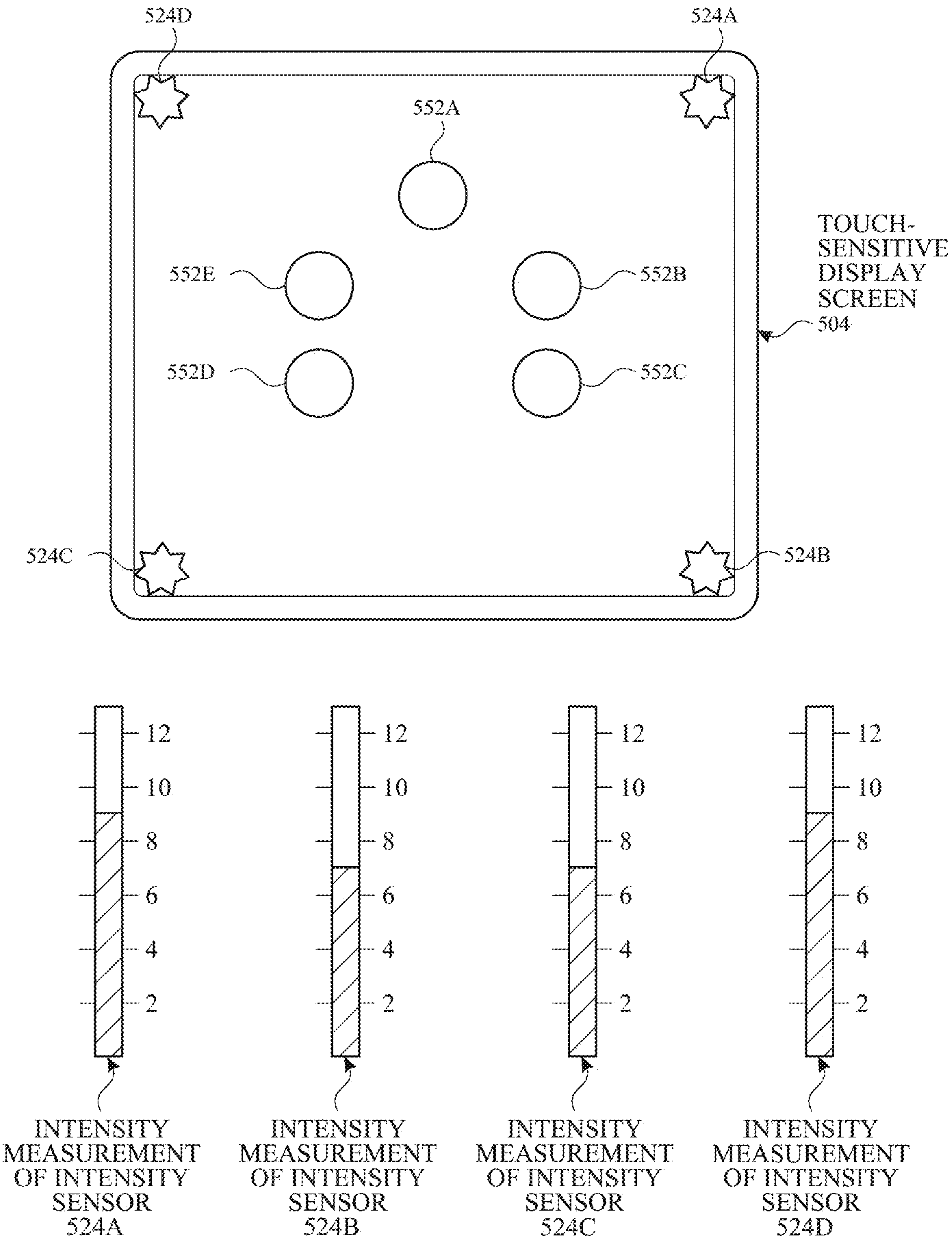
FIGS. 5C-5D illustrate exemplary components of a personal electronic device having a touch-sensitive display and intensity sensors in accordance with some embodiments.
Figure 5D:
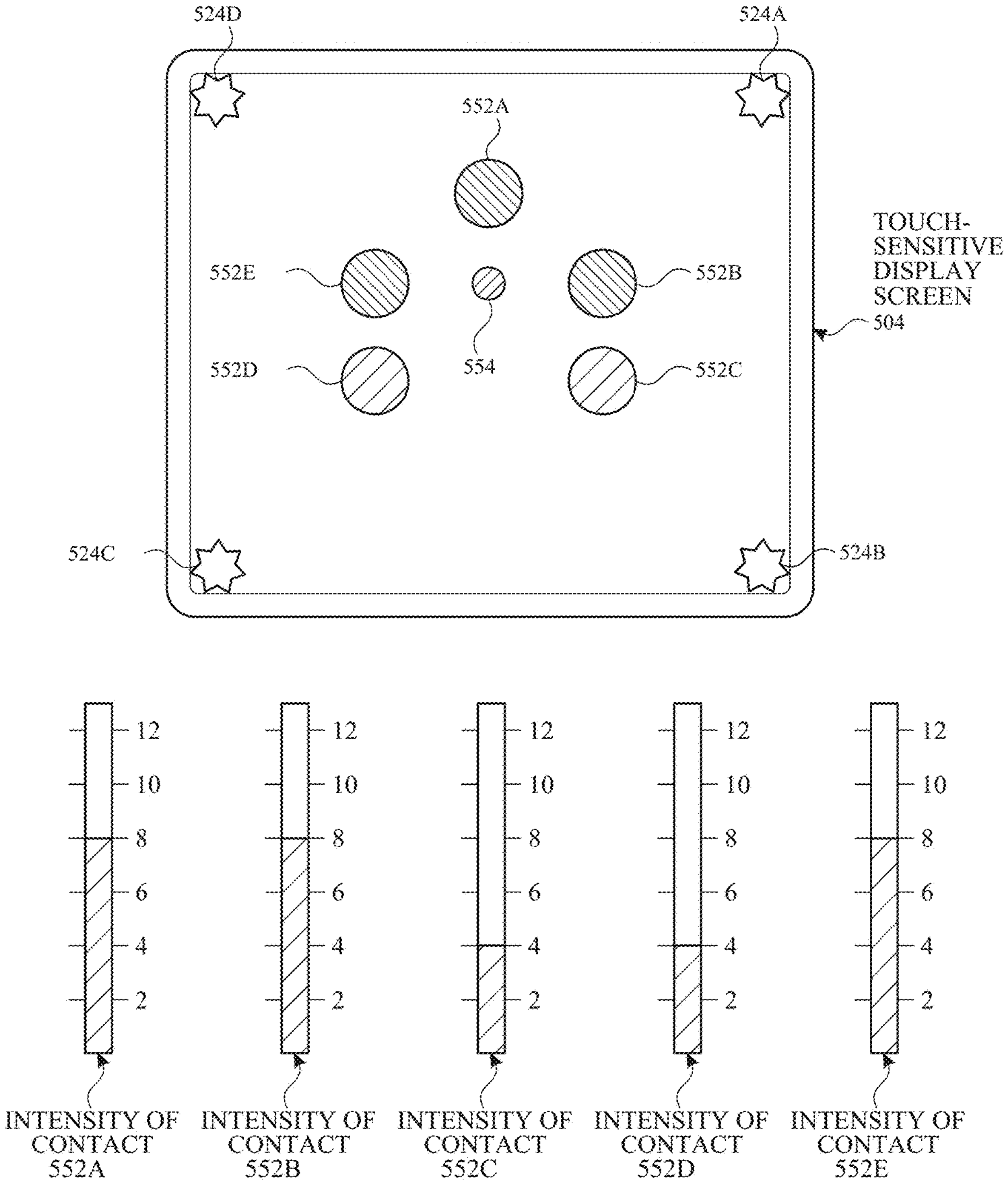

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A\cdot(Dj/\Sigma Di)$, where Dj is the distance of the respective contact j to the center of force, and ΣDi is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
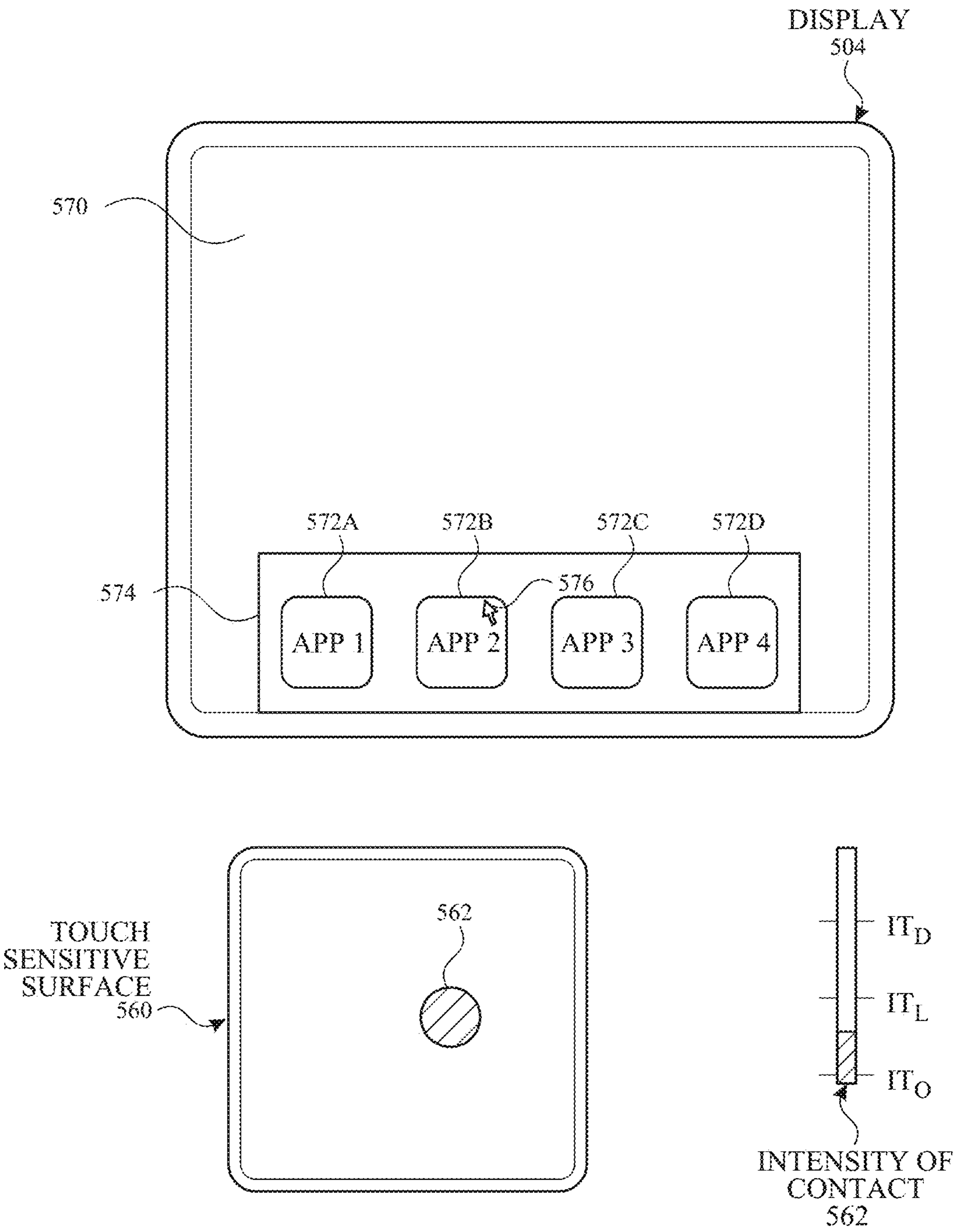
FIGS. 5E-5H illustrate exemplary components and user interfaces of a personal electronic device in accordance with some embodiments.
Figure 5F:
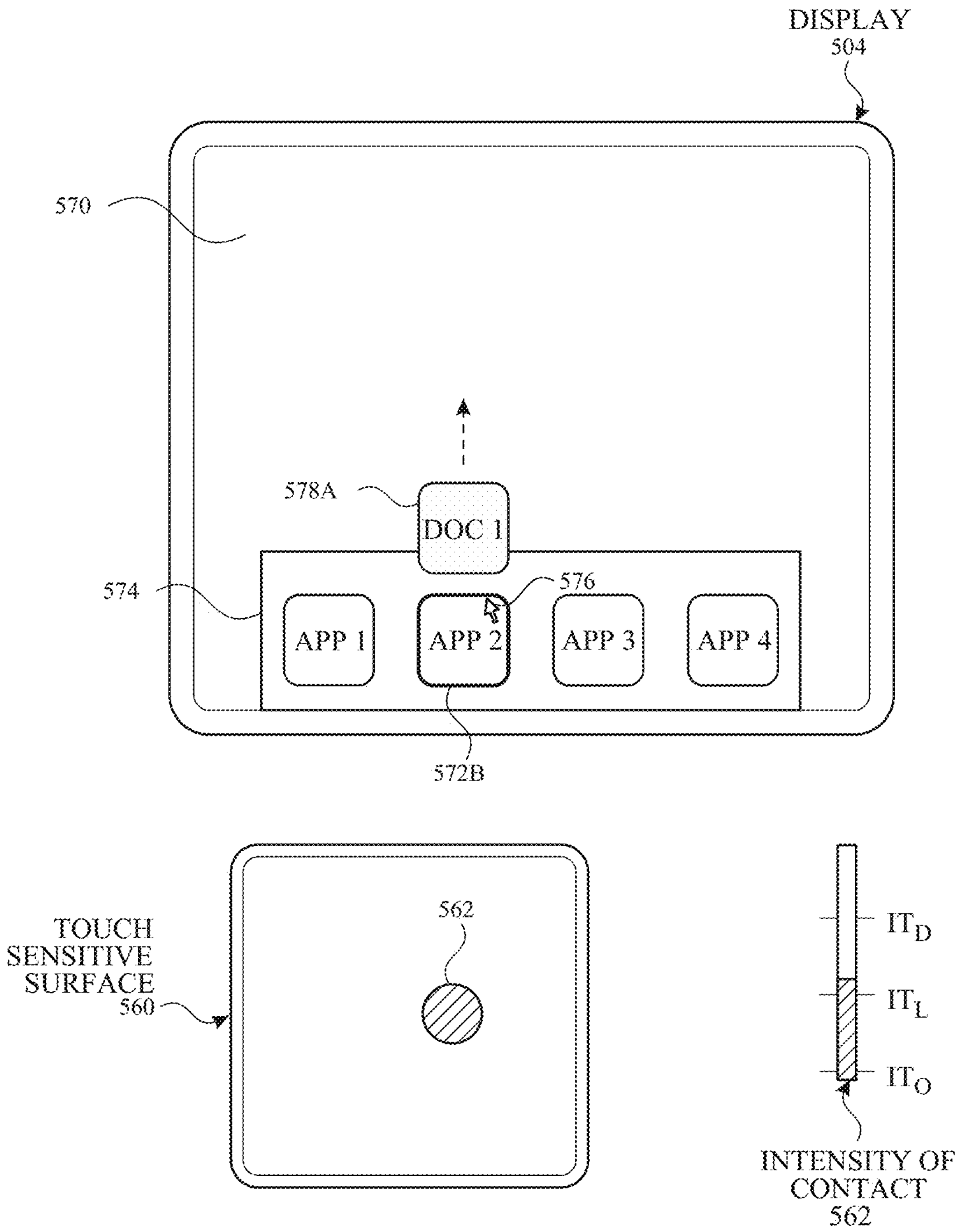
Figure 5G:
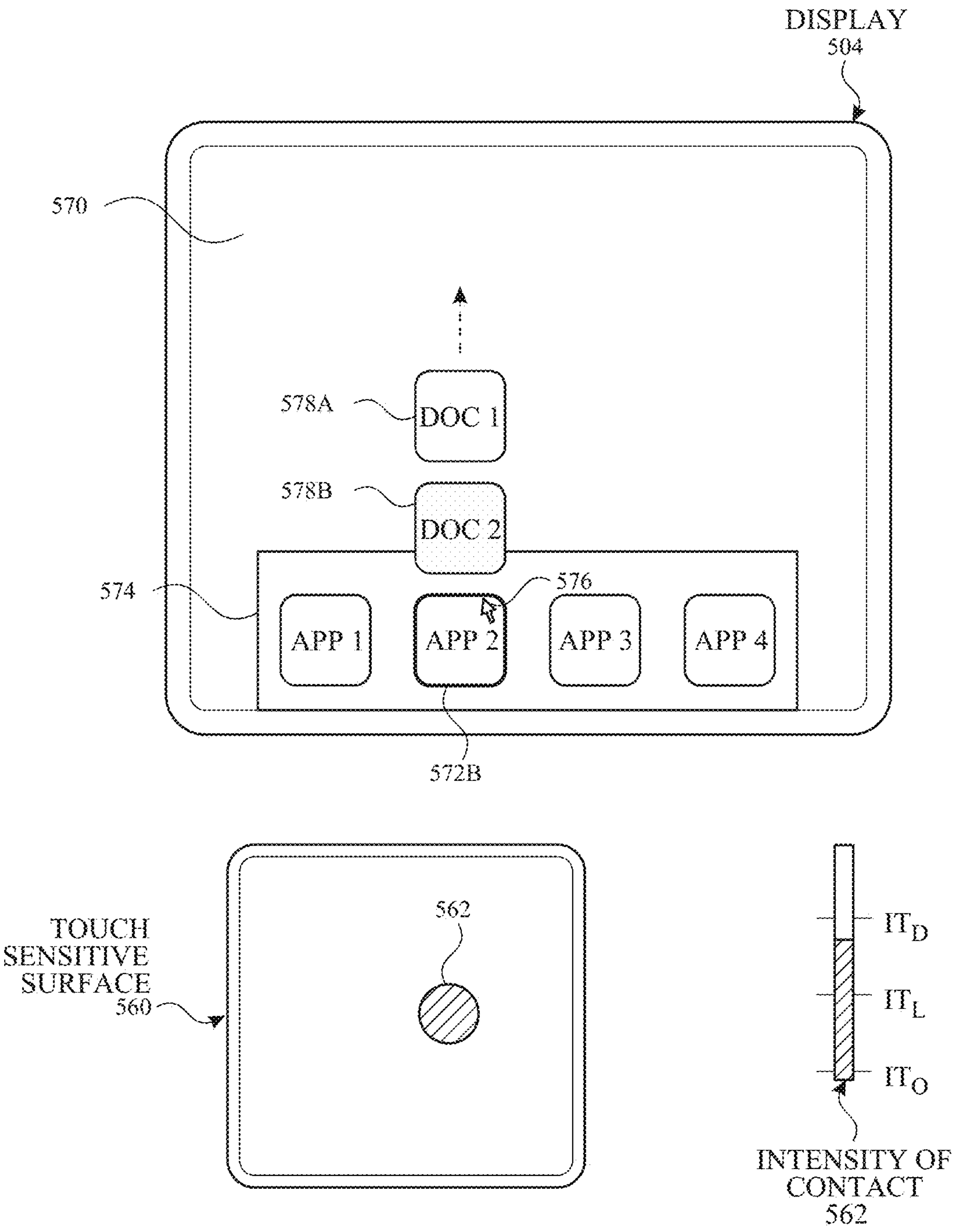
Figure 5H:
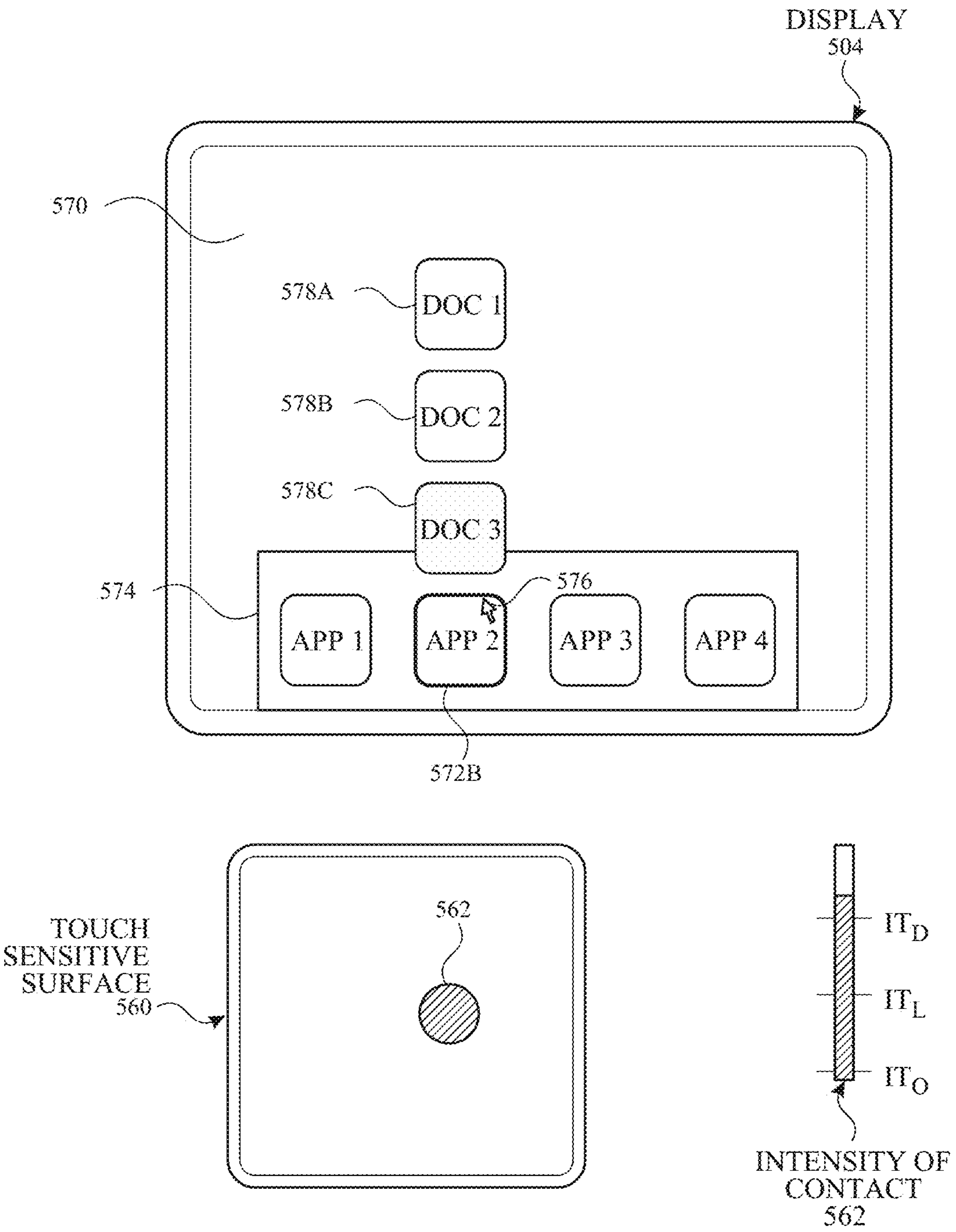

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "IT S"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

User Interfaces and Associated Processes

Audio-Based Messaging

Users interact with electronic devices in many different manners, including providing audio input to messaging user interfaces for recording audio messages and/or for audio transcription into text. In some circumstances, it can be desirable to access and interact with such user interfaces efficiently. The embodiments described below provide ways in which an electronic device facilitates efficient inputting of audio-based messages, thus enhancing the user's interactions with the device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 6B:
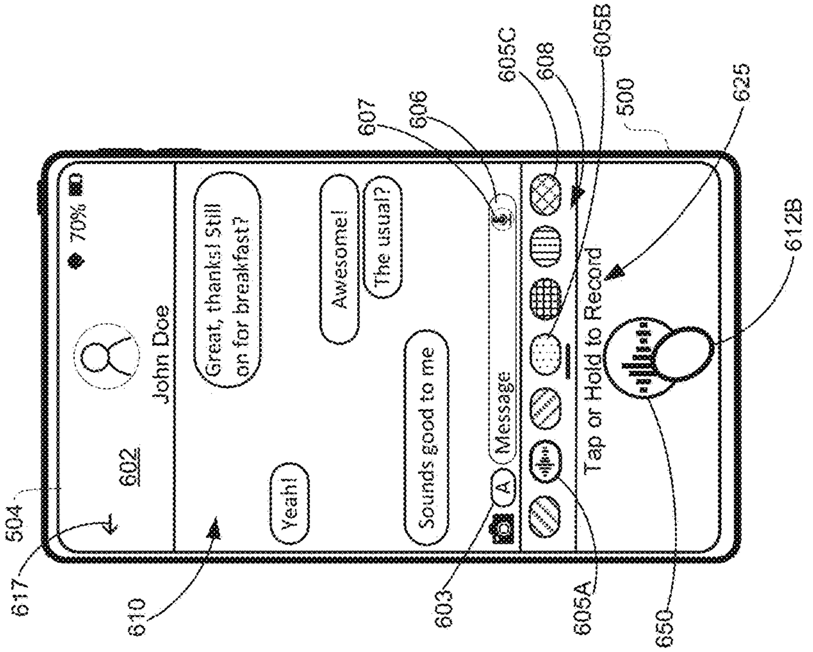
FIGS. 6A-6P illustrate exemplary ways in which an electronic device facilitates efficient inputting of audio-based messages in accordance with some embodiments.
Figure 6A:
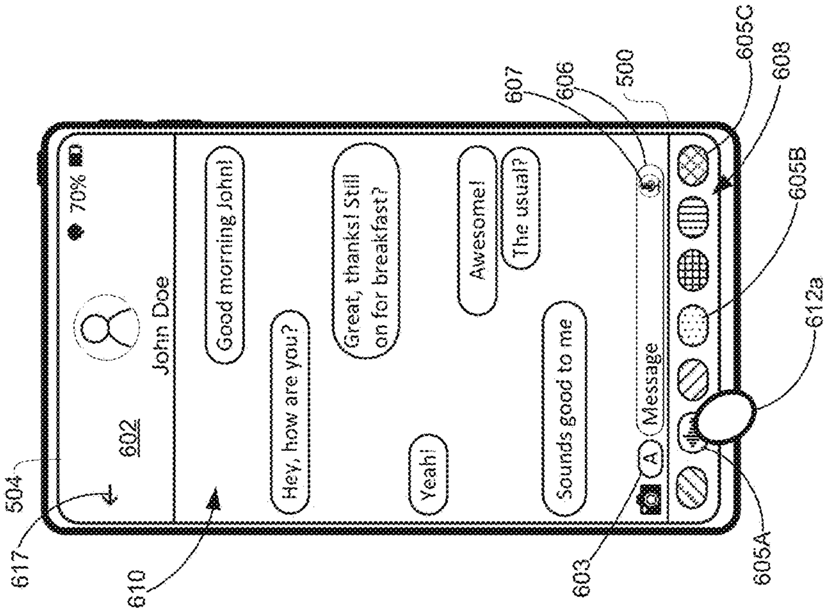
Figure 6C:
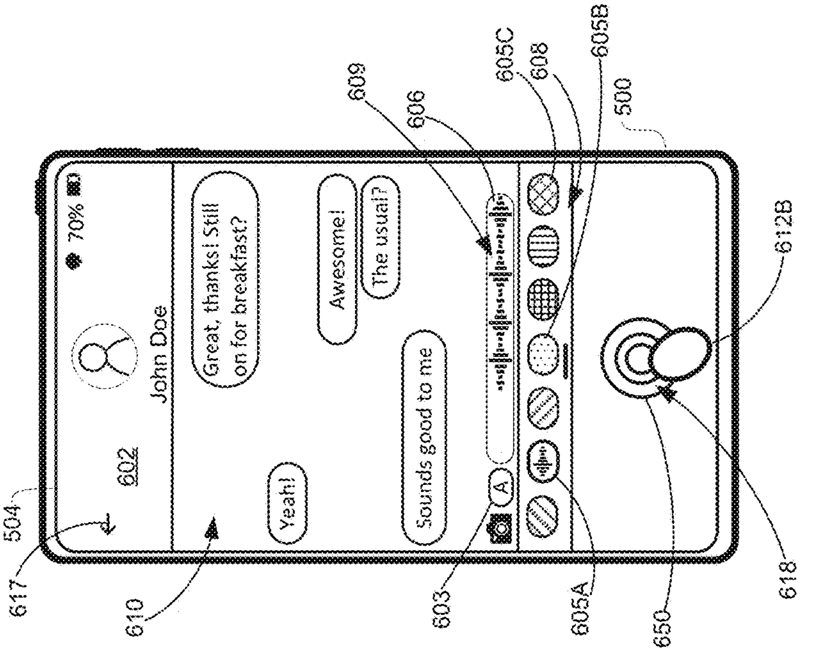
Figure 6D:
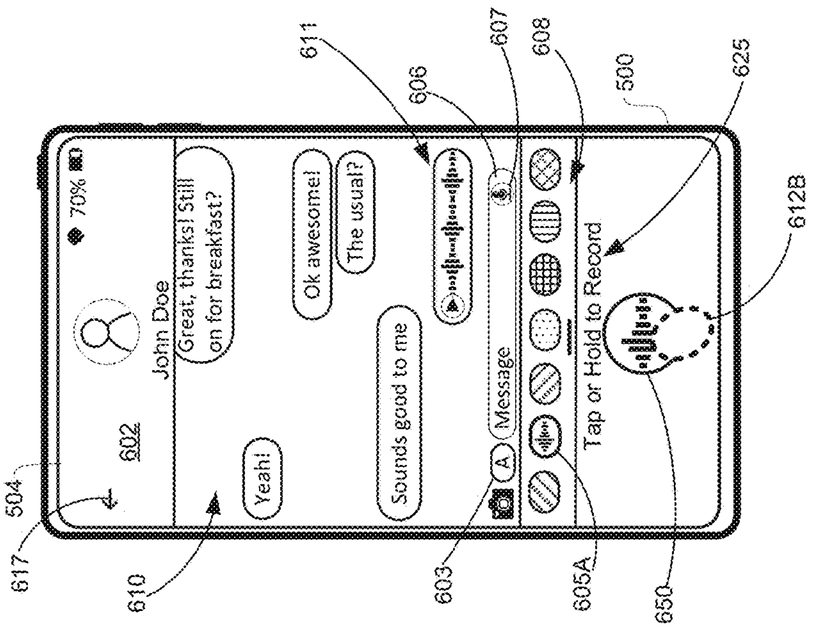
Figure 6F:
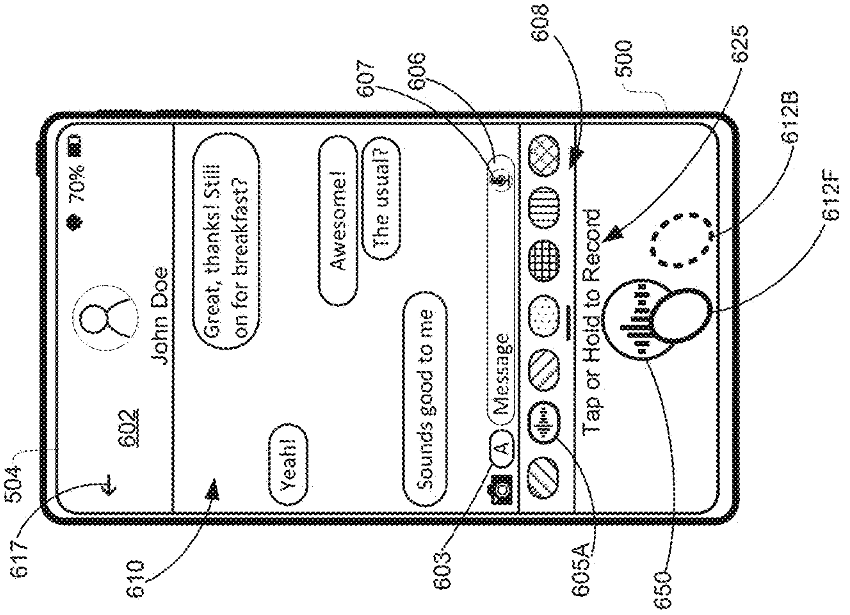
Figure 6E:
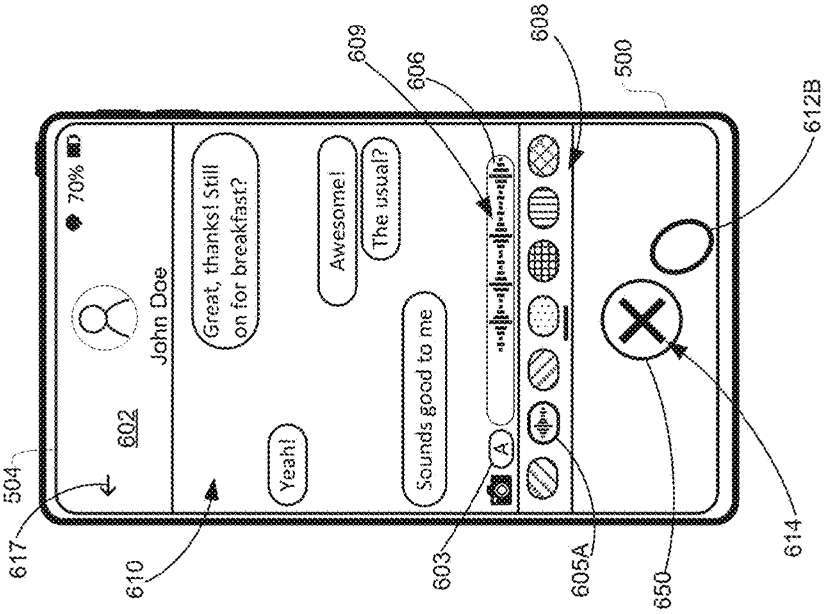
Figure 6H:
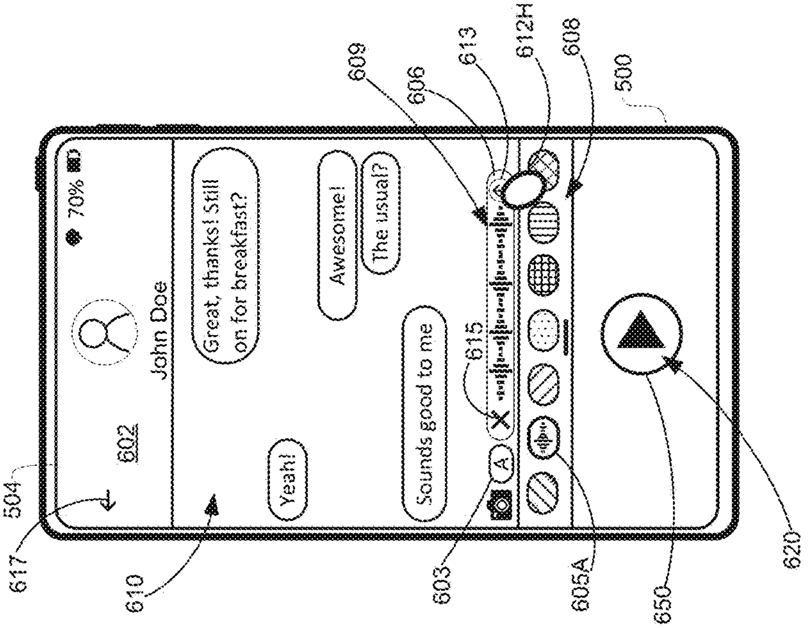
Figure 6G:
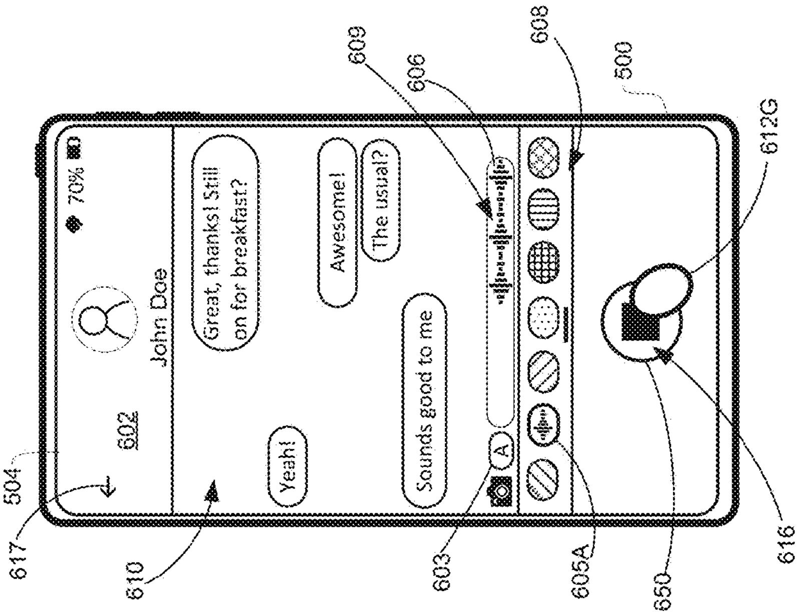
Figure 6J:
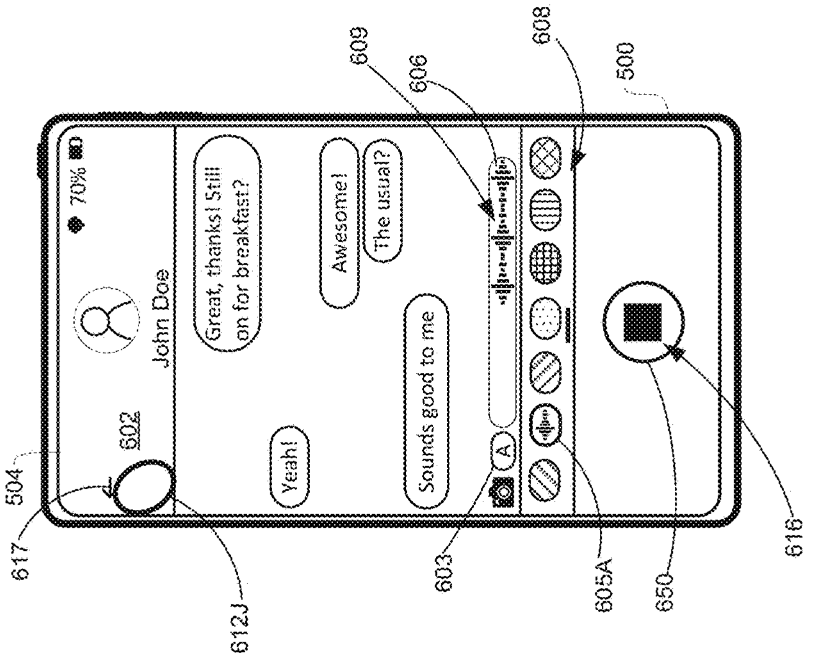
Figure 6I:
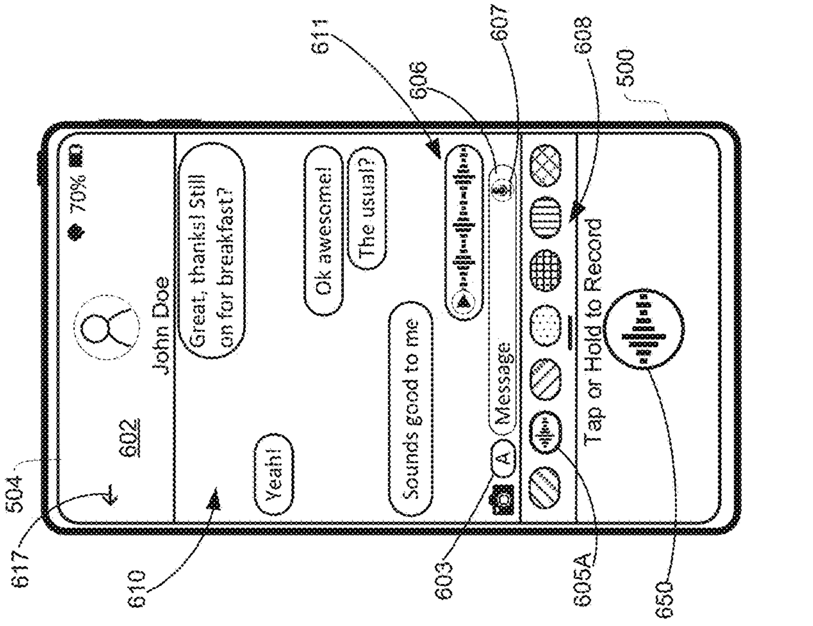
Figure 6L:
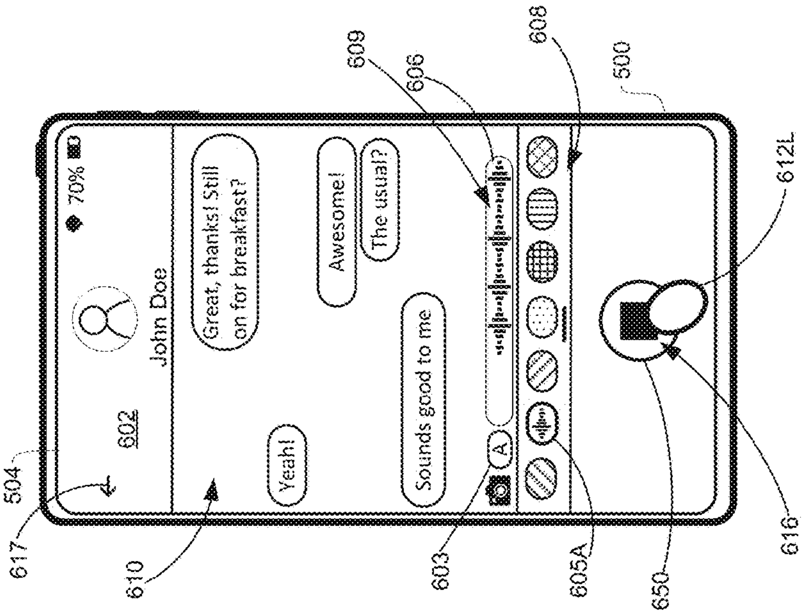
Figure 6K:
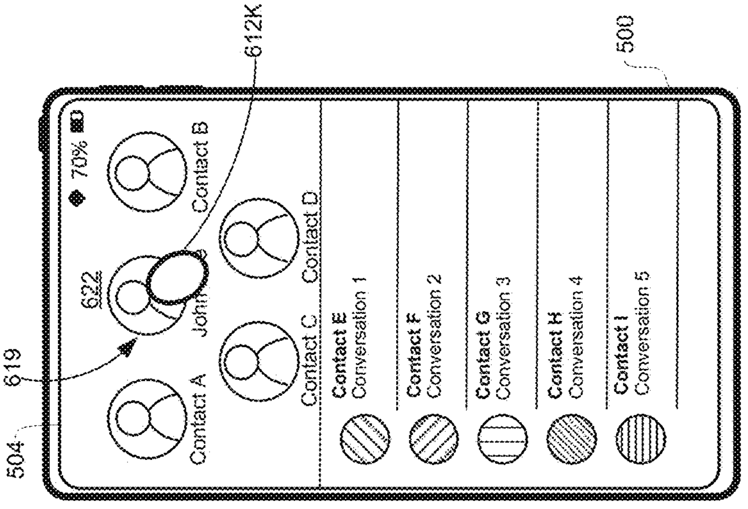
Figure 6N:
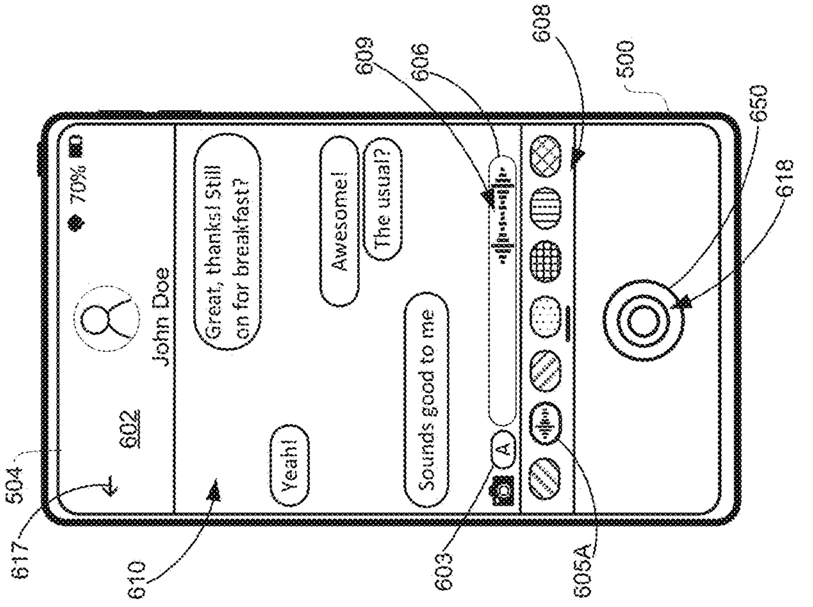
Figure 6M:
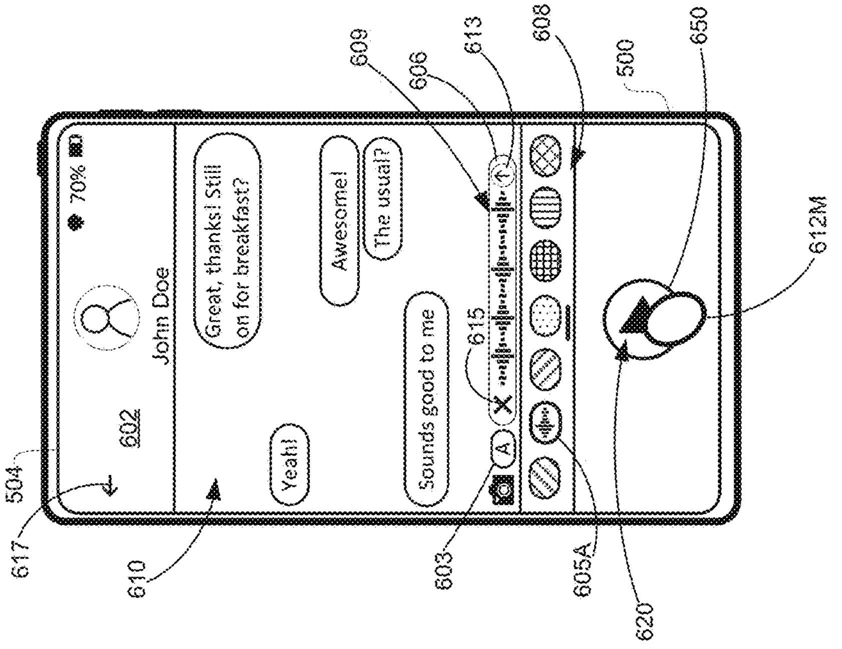
Figure 6P:
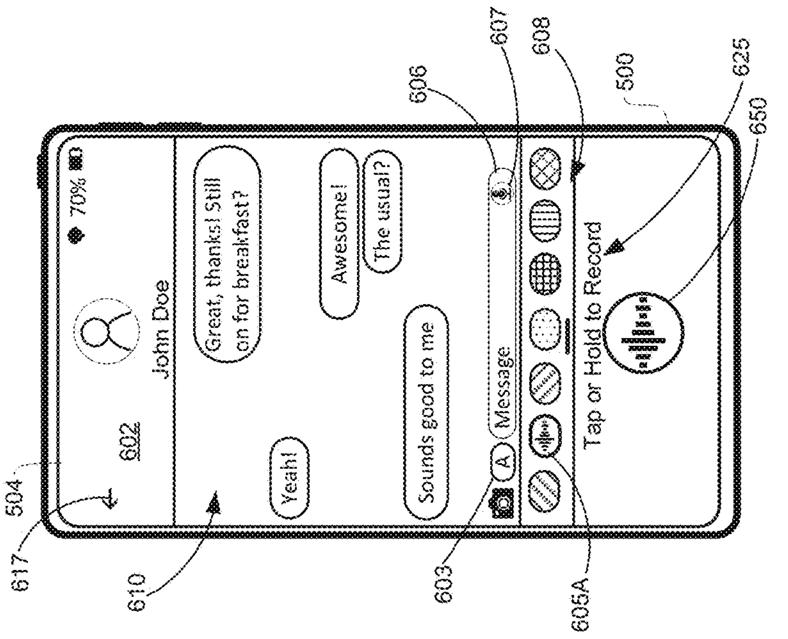

FIGS. 6A-6P illustrate exemplary ways in which an electronic device facilitates efficient inputting of audio-based messages in accordance with some embodiments. The embodiments in these figures are used to illustrate the processes described below, including the processes described with reference to FIG. 7. Although FIGS. 6A-6P illustrate various examples of ways an electronic device is able to perform the processes described below with reference to FIG. 7, it should be understood that these examples are not meant to be limiting, and the electronic device is able to perform one or more processes described below with reference to FIG. 7 in ways not expressly described with reference to FIGS. 6A-6P.

FIG. 6A illustrates electronic device 500 displaying user interface 602 (e.g., via a display device, via a display generation component, etc.). In some embodiments, user interface 602 is displayed via a display generation component. In some embodiments, the display generation component is a hardware component (e.g., including electrical components) capable of receiving display data and displaying a user interface. In some embodiments, examples of a display generation component include a touch screen display (such as touch screen 504), a monitor, a television, a projector, an integrated, discrete, or external display device, or any other suitable display device that is in communication with device 500.

In some embodiments, user interface 602 of a messaging application via which messages between two or more users can be viewed or sent. In FIG. 6A, user interface 602 is a user interface of a messaging conversation between the user of device 500 and John Doe. User interface 602 includes region 610, which includes representations of messages included in the messaging conversation (e.g., messages that have been sent by John Doe or the user of device 500 to the messaging conversation and/or to each other). User interface 602 also includes entry field 606, which is optionally a field into which the user of device 500 can provide content (e.g., text, images, etc.), such as via a soft keyboard or other input mechanism, to subsequently transmit to the messaging conversation. Entry field 606 includes option 607 that is selectable to cause device 500 to record audio at the microphone of device 500, and convert speech input provided by the user into text input to entry field 606, which the user of device 500 can transmit to the messaging conversation in response to an input to transmit that text to the messaging conversation.

In FIG. 6A, user interface 602 also includes application bar 608. Application bar 608 optionally includes one or more options 605A, 605B and 605C that are associated with different applications or functionalities related to messaging. For example, option 605B is optionally selectable to initiate a process to transmit money to participant(s) of the messaging conversation, and option 605C is optionally selectable to initiate a process to search for images to transmit to the messaging conversation. Application bar 608 is optionally displayed in user interface 602 in response to device 500 detecting selection of option 603.

Option 605A in application bar 608 is optionally selectable to initiate a process to record and/or transmit an audio message to the messaging conversation, as will now be described. In FIG. 6A, device 500 detects selection of option 605A (e.g., via a tap of contact 612*a*). In response, device 500 shifts the content of user interface 602 upward, as shown in FIG. 6B, and displays option 650 below application bar 608. Option 650 is optionally selectable to record and/or transmit an audio message to the messaging conversation, as will be described later. Device 500 also displays indication 625 (e.g., above option 650) to indicate that option 650 can be selected via a tap or via a touch and hold input to record an audio message for transmission to the messaging conversation.

In FIG. 6B, device 500 detects touchdown of contact 612B on option 650, and contact 612B remains touched down on touch screen 504 through to FIG. 6C. In response to the touch and hold input detected on option 650, and while contact 612B remains in contact with touch screen 504, device 500 begins recording audio detected at the microphone of device 500, such as shown in FIG. 6C. Device 500 also ceases display of option 607 in entry field 606, and instead displays indication 609 in entry field 606, which is optionally an indication of one or more characteristics of the audio recorded by device 500 since option 650 was selected. For example, indication 609 is a waveform indication that indicates how the intensity, volume, magnitude, frequency and/or other characteristic of the audio that has and/or is being recorded by device 500 has changed over time. Additionally or alternatively, device 500 causes option 650 to pulse or otherwise animate 618 based on the intensity, volume, magnitude, frequency and/or other characteristic of the audio that has and/or is being recorded by device 500. Device 500 optionally continues recording audio at its microphone as part of the audio message until device 500 detects liftoff of contact 612B from touch screen 504.

In FIG. 6D, device 500 detects liftoff of contact 612B from touch screen 504. Further, as shown in FIG. 6D, contact 612B was within the boundaries of option 650 and/or at least partially overlapping with option 650 when liftoff of contact 612B was detected. As a result, in response to detecting liftoff of contact 612B, device 500 stops recording audio for the audio message and transmits the audio message to the messaging conversation, as shown with representation 611 of the audio message being displayed in region 610 of user interface 602. Further, device 500 redisplays option 607 in entry field 606, and redisplays indication 625 above option 650. Option 650 optionally returns to having the functionality described with reference to FIG. 6B. Therefore, if device 500 detects a touch and hold input on option 650, detecting liftoff of the contact from an area of the touch screen 504 that corresponds to option 650 optionally results in device 500 automatically ceasing recording of the audio message, and transmitting that audio message to the messaging conversation.

If during the audio message recording initiated by the touch and hold input detected on option 650 in FIG. 6B, device 500 detects contact 612B move outside of option 650 (e.g., to an area of touch screen 504 that does not correspond to option 650), device 500 optionally displays user interface 602 as shown in FIG. 6E. In particular, device 500 optionally continues recording the audio message and correspondingly displaying indication 609 in entry field 606. However, device 500 has updated option 650 to include indication 614 (e.g., an "X"), which is optionally an indication that indicates that if liftoff of contact 612B is detected while contact 612B is outside of option 650, device 500 will cancel the audio message without transmitting it to the messaging conversation. In FIG. 6F, device 500 detects liftoff of contact 612B in an area outside of option 650, and in response, device 500 has ceased recording the audio message and has ceased display of indication 609 in entry field 606 without transmitting the audio message to the messaging conversation. Further, device 500 redisplays option 607 in entry field 606, and redisplays indication 625 above option 650. Option 650 optionally returns to having the functionality described with reference to FIG. 6B. Therefore, if device 500 detects a touch and hold input on option 650, detecting liftoff of the contact from an area of the touch screen 504 that does not correspond to option 650 optionally results in device 500 ceasing recording of and canceling (e.g., deleting) the audio message without transmitting that audio message to the messaging conversation.

Audio message recording initiated in response to a tap input on option 650 will now be described. In FIG. 6F, device 500 detects a tap input from contact 612F detected on option 650. In response, device 500 begins recording audio detected at the microphone of device 500, such as shown in FIG. 6G. Device 500 also ceases display of option 607 in entry field 606, and instead displays indication 609 in entry field 606, which is optionally an indication of one or more characteristics of the audio recorded by device 500 since option 650 was selected. Additionally or alternatively, device 500 displays indication 616 within option 650, which indicates that another selection of option 650 (e.g., via a tap input) will cause device 500 to end the recording of the audio message. Device 500 optionally continues recording audio at its microphone as part of the audio message until device 500 detects selection of option 650 (e.g., via a tap input).

In FIG. 6F, device 500 detects a tap input from contact 612G detected on option 650. In response, as shown in FIG. 6H, device 500 ends the recording of the audio message, and option 650 is optionally selectable to playback the audio message that was recorded at device 500 (e.g., option 650 includes indication 620 that indicates that option 650 is selectable to playback the audio message). Further, device 500 maintains display of indication 609 within entry field 606 as an indication of the recorded audio message. Device 500 also displays option 615 within entry field 606, which is optionally selectable to delete the audio message without transmitting the audio message to the messaging conversation. Device 500 also displays option 613 within entry field 606, which is optionally selectable to transmit the audio message to the messaging conversation. In FIG. 6H and in response to the selection of option 650 in FIG. 6G, device 500 has not yet transmitted the audio message to the messaging conversation.

In FIG. 6H, device 500 detects selection of option 613 (e.g., via a tap of contact 612H). In response, as shown in FIG. 6I, device 500 transmits the audio message to the messaging conversation (e.g., corresponding to representation 611), ceases display of options 615 and 613 and indication 609 in entry field 606, and redisplays option 607 in entry field 606. Further, option 650 optionally returns to having the functionality described with reference to FIG. 6B.

In some embodiments, during recording of an audio message, device 500 can navigate away from user interface 602 in response to user input while continuing to record the audio message, and the user can provide subsequent input to return to user interface 602 to complete and transmit the audio message. For example, in FIG. 6J, device 500 is recording an audio message (e.g., in any of the manners previously described). In FIG. 6J, device 500 detects selection of option 617 (e.g., via a tap of contact 612J), which is optionally an option to navigate away from user interface 602 in the messaging application. In response, as shown in FIG. 6K, device 500 ceases display of user interface 602, and displays user interface 622. User interface 622 is optionally a higher-level user interface in the messaging application from which different messaging conversations are accessible. In FIG. 6K, device 500 is optionally continuing to record the audio message that was being recorded in FIG. 6J.

In FIG. 6K, device 500 detects selection of option 619 (e.g., via a tap of contact 612K), which is optionally selectable to return to user interface 602. In response, as shown in FIG. 6L, device 500 redisplays user interface 602, which indicates that device 500 is still recording the audio message (e.g., indication 609 has been updated according to the continued recording of the audio message). User interface 602 in FIG. 6L optionally has one or more of the characteristics of user interface 602 described with reference to FIG. 6G. In FIG. 6L, device 500 detects selection of option 650 (e.g., via a tap of contact 612L), and in response ends the recording of the audio message, as shown in FIG. 6M. User interface 602 in FIG. 6M optionally has one or more of the characteristics of user interface 602 described with reference to FIG. 6H.

In FIG. 6M, while option 650 is selectable to initiate playback of the recorded audio message at device 500, device 500 detects selection of option 650 (e.g., via a tap of contact 612M). In response, as shown in FIG. 6N, device 500 plays back the recorded audio message. In some embodiments, device 500 displays an animation of waveform indication 609 in entry field 606 growing and progressing as playback of the recorded audio message progresses. Further, similar to or the same as the animation effect 618 of option 650 while recording (e.g., as described with reference to FIG. 6C), device 500 displays option 650 with the animation effect 618 based on the intensity, volume, magnitude, frequency and/or other characteristic of the audio that has and/or is being played by device 500.

Figure 6O:
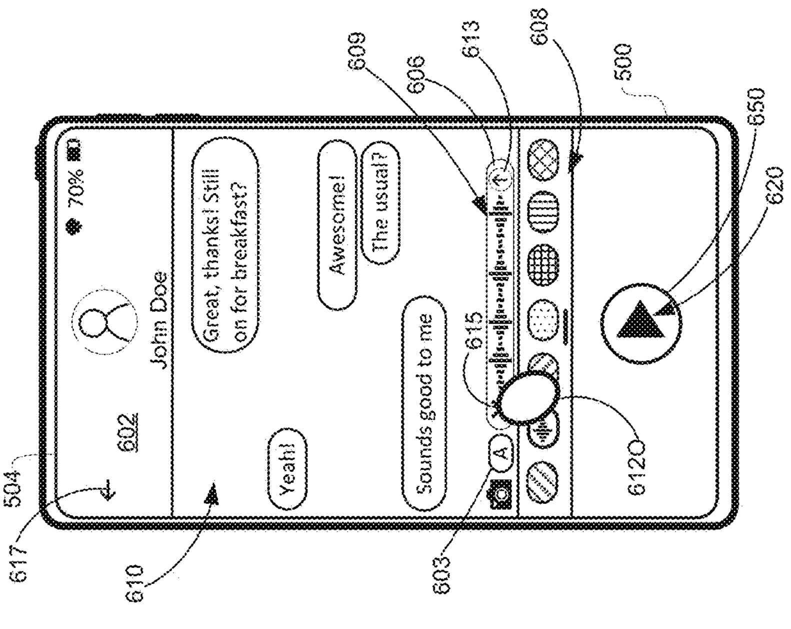

In FIG. 6O, device 500 has reached the end of the playback of the recorded audio message, and is displaying user interface 602. User interface 602 in FIG. 6O optionally has one or more of the characteristics of user interface 602 described with reference to FIG. 6H. In FIG. 6O, device 500 detects selection of option 615. In response, as shown in FIG. 6P, device 500 has deleted the recorded audio message and has ceased display of indication 609 in entry field 606 without transmitting the audio message to the messaging conversation. Further, device 500 redisplays option 607 in entry field 606, and redisplays indication 625 above option 650. Option 650 optionally returns to having the functionality described with reference to FIG. 6B. User interface 602 in FIG. 6P optionally has one or more of the characteristics of user interface 602 described with reference to FIG. 6F.

FIG. 7 is a flow diagram illustrating a method 700 of facilitating efficient inputting of audio-based messages in accordance with some embodiments. The method 700 is optionally performed at an electronic device such as device 100, device 300, or device 500 as described above with reference to FIGS. 1A-1B, 2-3, 4A-4B and 5A-5H. Some operations in method 700 are, optionally combined and/or order of some operations is, optionally, changed.

As described below, the method 700 provides ways to facilitate efficient inputting of audio-based messages. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 700 is performed by an electronic device in communication with a display generation component and one or more input devices. For example, a mobile device (e.g., a tablet, a smartphone, a media player, or a wearable device), a computer (e.g., a desktop computer, a laptop computer), a wearable device (e.g., a watch, a head-mounted device), or an automobile device optionally in communication with one or more of a mouse (e.g., external), trackpad (optionally integrated or external), remote control device (e.g., external), another mobile device (e.g., separate from the electronic device), a handheld device (e.g., external), and/or a controller (e.g., external, etc.), or a set-top box in communication one or more input devices (e.g., a remote control). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, the electronic device displays (702*a*), via the display generation component, a messaging user interface that includes a respective selectable option (e.g., a selectable button displayed in the messaging user interface) for recording an audio message, such as option 650 in FIG. 6B (e.g., the audio message is optionally a recording of audio captured by a microphone of the electronic device, such as a recording of speech input provided by a user of the electronic device while the electronic device was recording audio via the microphone of the electronic device), the messaging user interface corresponding to a messaging conversation including a first user of the electronic device and a second user of a second electronic device, different from the electronic device, such as user interface 602 in FIG. 6B. For example, the messaging user interface includes one or more representations of messages (e.g., audio messages, text messages, media (e.g., image, video, songs, etc.) messages composed and sent by the first and/or second users (and/or sent by the respective devices of the first and/or second users) to the messaging conversation and/or each other). In some embodiments, the messaging conversation includes only the first and the second user, in which case a message sent by a given user to the messaging conversation optionally corresponds to sending the message to the other user in the messaging conversation; in some embodiments, the messaging conversation includes the first user and the second user and one or more additional users, in which case a message sent by a given user to the messaging conversation optionally corresponds to sending the message to a plurality of users (e.g., all of the other users) in the messaging conversation. In some embodiments, the messaging user interface further includes a soft keyboard via which text messages can be composed and sent from the electronic device to the messaging conversation. In some embodiments, the respective selectable option is displayed in the messaging user interface in response to the electronic device detecting selection of a selectable option for recording and/or sending an audio message, and the respective selectable option optionally replaces display of the soft keyboard in the messaging user interface.

In some embodiments, while displaying the messaging user interface, the electronic device detects (702*b*), via the one or more input devices, a first input including an initiation of a selection input detected at a location corresponding to the respective selectable option, such as from contact 612B in FIG. 6B, and a termination of the selection input, such as in FIG. 6D or 6F, wherein the first input satisfies one or more first criteria (e.g., the first input is a touchdown and hold input, where liftoff of the contact is not detected until after a time threshold (e.g., 0.05, 0.1, 0.3, 0.5, 1, 3, 5, 10 or 20 seconds) after the touchdown of the contact). In some embodiments, the messaging user interface is displayed via a touch screen (or a touch-sensitive surface), and the initiation of the selection input is the touchdown of a contact on the touch screen (or a touch-sensitive surface), and the termination of the selection input is the liftoff of the contact, subsequent to the touchdown of the contact, on the touch screen. In the case of a touch screen, the initiation of the selection input is optionally detected at the location corresponding to the respective selectable option when the touchdown of the contact is detected at a location on the touch screen at which (any part of) the respective selectable option is displayed, and is optionally not detected at the location corresponding to the respective selectable option when the touchdown of the contact is detected at a location on the touch screen outside of where the respective selectable option is displayed. In the case of a touch-sensitive surface, the initiation of the selection input is optionally detected at the location corresponding to the respective selectable option when the touchdown of the contact is detected while a cursor (or other input element that is displayed on a display and that is controlled by the touch-sensitive surface) is displayed at a location on the display at which (any part of) the respective selectable option is displayed, and is optionally not detected at the location corresponding to the respective selectable option when the touchdown of the contact is detected while the cursor is displayed at a location on the display outside of where the respective selectable option is displayed. If the initiation of the selection input is detected outside of the respective selectable option, the below-described process to record a respective audio message is optionally not initiated in response to detecting the initiation of the selection input. The first input is optionally a touch and hold input in which the termination of the selection input is detected after a time threshold (e.g., 0.1, 0.2, 0.5, 1, 2, 3 or 5 seconds) of the detection of the initiation of the selection input. Other selection inputs are also contemplated, such as hover or air gesture selection inputs performed by one or more hands of a user that are not in contact with any input device (e.g., detected using one or more cameras in communication with the electronic device), which optionally have corresponding selection initiation inputs and selection termination inputs.

In some embodiments, in response to detecting the initiation of the selection input, the electronic device initiates (702*c*) a process to record a respective audio message at the electronic device, such as in FIG. 6C. For example, upon detecting touchdown of the contact on the respective selectable option, and while the contact remains in contact with the touch-sensitive surface, the electronic device optionally records audio captured by the microphone of the electronic device (e.g., speech input provided by the user of the electronic device).

In some embodiments, in response to detecting the termination of the selection input (702*d*) (e.g., detecting liftoff of the contact from the touch-sensitive surface. In some embodiments, the contact has moved away from its initial touchdown location when the liftoff of the contact is detected; in some embodiments, the contact has not moved away from its initial touchdown location when the liftoff of the contacts is detected), in accordance with a determination that the termination of the selection input was detected at a first location corresponding to the respective selectable option, such as in FIG. 6D (e.g., the contact or cursor is within the display area of the respective selectable option when the liftoff of the contact is detected. In some embodiments, the contact or cursor (e.g., movement of which is controlled by movement of the contact on the touch-sensitive surface) has moved outside of the display area of the respective selectable option during the selection input, but has moved back inside the display area of the respective selectable option by the time the termination of the selection input is detected, and the below-described transmission of the respective audio message occurs. In some embodiments, the contact or cursor must remain within the display area of the respective selectable option for the entirety of the selection input—otherwise, the transmission of the respective audio message described below optionally does not occur), the electronic device transmits (702*e*), to the messaging conversation, the respective audio message including audio recorded between the initiation of the selection input and the termination of the selection input, such as in FIG. 6D (e.g., audio recorded by the microphone of the device between when the contact touched down on the touch-sensitive surface or touch screen and when the contact lifted off from the touch-sensitive surface or touch screen). In response to transmitting the respective audio message to the messaging conversation, the messaging user interface optionally includes a representation of the respective audio message and/or a selectable option (e.g., displayed at the electronic device and other electronic devices displaying messaging user interfaces for this same messaging conversation) that is selectable to cause playback of the respective audio message at the device at which the selection is detected.

In some embodiments, in accordance with a determination that the termination of the selection input was detected at a second location corresponding to a region of the messaging user interface other than the respective selectable option, such as in FIG. 6F (e.g., the contact or cursor is outside of the display area of the respective selectable option when the liftoff of the contact is detected. In some embodiments, the contact or cursor (e.g., movement of which is controlled by movement of the contact on the touch-sensitive surface) has moved outside of the display area of the respective selectable option after touchdown of the contact was detected), the electronic device terminates (**702*f*) the process to record the respective audio message without transmitting the respective audio message to the messaging conversation, such as in FIG. 6**F. For example, the electronic device stops recording the respective audio message and/or deletes the portions of audio already recorded between when the touchdown of the contact was detected and the liftoff of the contact was detected and/or does not transmit (any of) the recording to the messaging conversation. Controlling the transmission or cancellation of an audio message based on the location of the termination of a selection input reduces the number of inputs needed to transmit or cancel the audio message.

In some embodiments, while displaying the messaging user interface, the electronic device detects, via the one or more input devices, a second input including an initiation of a second selection input detected at a location corresponding to the respective selectable option and a termination of the second selection input detected at a location corresponding to the respective selectable option, wherein the second input does not satisfy the one or more first criteria, such as from a tap of contact 612B in FIG. 6B (e.g., satisfies one or more second criteria). For example, the second input is a touch-down and liftoff input (e.g., a "tap" input), where liftoff of the contact is detected within a time threshold (e.g., 0.05, 0.1, 0.3, 0.5, 1, 3, 5, 10 or 20 seconds) after the touchdown of the contact. The one or more second criteria optionally include a criterion that is satisfied when the touchdown of the contact and the liftoff of the contact occur within the time threshold of one another. The one or more second criteria optionally include a criterion that is satisfied when the touchdown and the liftoff of the contact occur within an area of the display of the respective selectable option. Otherwise, the second input optionally has one or more of the characteristics of the first input, except as otherwise stated above.

In some embodiments, in response to detecting the second input, the electronic device initiates a second process to record a second respective audio message at the electronic device, such as in FIG. 6G. For example, upon detecting touchdown and liftoff of the contact on the respective selectable option, the electronic device optionally records audio captured by the microphone of the electronic device (e.g., speech input provided by the user of the electronic device).

In some embodiments, while the second process is being performed, the electronic device detects, via the one or more input devices, a third input including an initiation of a third selection input detected at a location corresponding to the respective selectable option and a termination of the third selection input detected at a location corresponding to the respective selectable option, wherein the third input does not satisfy the one or more first criteria, such as a tap of contact 612G in FIG. 6G (e.g., satisfies one or more second criteria). The third input optionally has one or more characteristics of the second input (e.g., is a "tap" input on the respective selectable option).

In some embodiments, in response to detecting the third input, the electronic device ceases the second process to record the second respective audio message and stores the second respective audio message, the second respective audio message including audio recorded while the second process was being performed, such as in FIG. 6H (e.g., audio recorded by the microphone of the device between when the contact of the second input lifted off of the touch-sensitive surface or touch screen and when the contact of the third input touched down on or lifted off from the touch-sensitive surface or touch screen). In some embodiments, the electronic device does not yet transmit the second respective audio message to the messaging conversation—rather, a separate input is optionally required for that to occur, as will be described below. Thus, in some embodiments, the respective selectable option is selectable in different manners (e.g., tap-and-hold vs. tap) to cause the electronic device to perform different types of audio message recording, as described above. Allowing different types of audio recording processes to occur in response to different types of inputs directed to the respective selectable option allows the two different types of recording processes to be performed without displaying additional controls.

In some embodiments, after detecting the second input and before detecting the third input, the respective selectable option is selectable to cease the second process, such as in FIG. 6G (e.g., the respective selectable option changes from a button to start audio recording to an option to cease audio recording), and in response to detecting the third input, the respective selectable option is selectable to playback the second respective audio message at the electronic device, such as in FIG. 6H (e.g., without transmitting the second respective audio message to the messaging conversation and/or without voiding the recording of the second respective audio message). Thus, in some embodiments, the functionality of the same selectable option is updated to cause playback of the recorded audio message at the electronic device (e.g., as an audio preview of what will be transmitted to the messaging conversation, if separate input for doing so is provided). Updating the same selectable option to change from an option to begin the audio recording process, to an option to end the audio recording process, to an option to playback the recorded audio enables such functionality to be performable without displaying additional controls.

In some embodiments, the messaging user interface includes a content entry field for accepting content to be transmitted to the messaging conversation, such as entry field 606. For example, the content entry field is optionally a text entry field or other entry field into which user input (e.g., at a keyboard, voice input and/or other input) causes content (e.g., text, images, videos, etc.) to be populated. While the content entry field is populated with content, a user input for transmitting that content to the messaging conversation, if detected, causes the electronic device to transmit that content to the messaging conversation (e.g., representation(s) of such content is (are) displayed in the messaging transcript of the messaging conversation, and accessible and/or visible by the users included in the messaging conversation).

In some embodiments, after detecting the second input and before detecting the third input, the content entry field does not include a selectable option that is selectable to transmit the second respective audio message to the messaging conversation, such as in FIG. 6G. For example, no option for transmitting content in the content entry field (whether or not that content entry field actually includes content) to the messaging conversation is displayed in the content entry field and/or in the messaging user interface and/or by the electronic device.

In some embodiments, in response to detecting the third input, the content entry field does include the selectable option that is selectable to transmit the second respective audio message to the messaging conversation, such as in FIG. 6H. For example, after the electronic device records (e.g., in response to the electronic device recording) the second respective audio message pursuant to the second and third inputs, the electronic device updates the content entry field to include the option that is selectable to transmit the content in the content entry field to the messaging conversation. In some embodiments, the content in the content entry field includes (a representation of) the second respective audio message. In some embodiments, the content entry field also includes other content (e.g., text, images, videos, audio recordings, etc.) that was entered into the content entry region before or after the process for recording the second respective audio message. In some embodiments, any content included in the content entry field when the selectable option is selected is transmitted to the messaging conversation. Displaying the selectable option for transmitting the second respective audio message to the messaging conversation in the content entry field causes the electronic device to automatically display the selectable option at an easily accessible location and when content to be transmitted to the messaging conversation exists.

In some embodiments, the messaging user interface includes a content entry field for accepting content to be transmitted to the messaging conversation (e.g., a content entry field as previously described), such as entry field 606, and after detecting the second input and before detecting the third input, the content entry field does not include a selectable option that is selectable to void the second respective audio message, such as in FIG. 6G. For example, no option for deleting the second respective audio message is displayed in the content entry field and/or in the messaging user interface and/or by the electronic device. In some embodiments, in response to detecting the third input, the content entry field does include the selectable option that is selectable to void the second respective audio message, such as in FIG. 6H. For example, after the electronic device records (e.g., in response to the electronic device recording) the second respective audio message pursuant to the second and third inputs, the electronic device updates the content entry field to include the option that is selectable to delete the second respective audio message (e.g., without transmitting the second respective audio message to the messaging conversation). Displaying the selectable option for voiding the second respective audio message in the content entry field causes the electronic device to automatically display the selectable option at an easily accessible location and when content to be voided exists.

In some embodiments, the content entry field does not include a selectable option that is selectable to void the respective audio message while detecting or in response to detecting the first input, such as in FIG. 6C or 6D. For example, while the electronic device is performing and/or after the electronic device performs the tap-and-hold audio message recording process, the electronic device does not display a separate option in the messaging user interface for voiding or deleting the respective audio message, because voiding/deleting the respective audio message is optionally accomplished via a different input (e.g., liftoff of the tap-and-hold contact in an area of the display outside of the area of the respective selectable option, as previously described). Not displaying a separate option for voiding the respective audio message when the tap-and-hold process for recording the audio message is performed avoids unnecessary consumption of space in the messaging user interface, thus allowing for more space to be occupied by content included in and/or to be transmitted to the messaging conversation.

In some embodiments, the content entry field does not include a selectable option that is selectable to transmit the respective audio message to the messaging conversation while detecting or in response to detecting the first input, such as in FIG. 6C or 6D. For example, while the electronic device is performing and/or after the electronic device performs the tap-and-hold audio message recording process, the electronic device does not display a separate option in the messaging user interface for transmitting the respective audio message to the messaging conversation, because transmitting the respective audio message to the messaging conversation is optionally accomplished via a different input (e.g., liftoff of the tap-and-hold contact in an area of the display within the area of the respective selectable option, as previously described). Not displaying a separate option for transmitting the respective audio message when the tap-and-hold process for recording the audio message is performed avoids unnecessary consumption of space in the messaging user interface, thus allowing for more space to be occupied by content included in and/or to be transmitted to the messaging conversation.

In some embodiments, while detecting the first input (and/or during the process or the second process to record a respective audio message), the electronic device changes a value of a respective visual characteristic of the respective selectable option based on audio detected by the electronic device, such as in FIG. 6C. For example, the respective selectable option optionally pulses (e.g., in color, in brightness, size, shape and/or in intensity) based on the intensity, amplitude, frequency, volume and/or tempo of audio (e.g., speech) detected and/or recorded by the microphone of the electronic device. Changing a visual characteristic of the respective selectable option based on audio detected by the electronic device provides feedback about the recording status of the electronic device.

In some embodiments, the messaging user interface includes a content entry field for accepting content to be transmitted to the messaging conversation (e.g., a content entry field as described previously), such as entry field 606, and the respective selectable option is displayed outside of the content entry field, such as shown in FIG. 6B (e.g., the respective selectable option is displayed in a region of the messaging user interface outside of the content entry field, such as a region below the content entry field and/or a region corresponding to user interfaces of different application icons arranged in an application bar, as will be described below). Displaying the respective selectable option outside of the content entry field avoids accidental selection of the respective selectable option.

In some embodiments, the content entry field includes a second respective selectable option that is selectable to initiate a process to transcribe audio detected at the electronic device into font-based text in the content entry field, such as option 607 in FIG. 6B. For example, in response to detecting selection of the second respective selectable option, the electronic device records audio (e.g., speech) at the microphone of the electronic device, and transcribes that audio into text and displays that text in the content entry field. The process to transcribe audio into font-based text is optionally different from the process to record a respective audio message, as the latter optionally prepares and/or places an audio recording (e.g., without transcription) for transmission to the messaging conversation, whereas the former optionally prepares and/or places text (e.g., without an audio recording) for transmission to the messaging conversation. Displaying the second respective selectable option in the content entry field provides easy access to the audio transcription process.

In some embodiments, while the process to record the respective audio message is being performed, the electronic device replaces display of the second respective selectable option in the content entry field with display of a visual indicator that indicates information associated with audio detected at the electronic device during the process to record the respective audio message, such as indication 609 in FIG. 6C. For example, the button to transcribe audio is no longer displayed in the content entry field during and/or after the process to record a respective audio message. Rather, in some embodiments, a representation of a waveform and/or information about the length of the recording of the audio message are displayed in the content entry field. The representation of the waveform and/or information about the length of the recording of the audio message are optionally updated as the recording progresses, and cease being updated after the recording has been completed. Displaying the visual indicator that indicates information associated with audio detected at the electronic device during the process to record the respective audio message without displaying the second respective selectable option avoids clutter in the user interface and provides more user interface area for use by the visual indicator.

In some embodiments, the respective selectable option is displayed in a first region of the messaging user interface (e.g., a region displayed below the content entry field of the messaging user interface) in response to detecting selection of a first option in a respective user interface element (e.g., 608) displayed in the messaging user interface, such as selection of option 605A in FIG. 6A, the respective user interface element further including a second option that is selectable to display a second user interface, different from the respective selectable option, in the first region of the messaging user interface, such as option 605B. For example, the respective user interface element is optionally an application bar that includes a plurality of different options (e.g., icons) that correspond to different applications. The application bar is optionally displayed between the content entry field and the first region of the messaging user interface. In response to detecting selection of a given option corresponding to an application in the application bar, the electronic device optionally displays a user interface for that application in the first region of the messaging user interface. The different applications and their corresponding different user interfaces displayed in the first region are optionally for performing different actions with respect to the messaging conversation. For example, the first option and the respective selectable option optionally correspond to a first application for performing audio message recording to be transmitted to the messaging conversation, as previously described. A second option and its corresponding user interface that would be displayed in the first region optionally corresponds to a second application for making a mobile payment to one or more participants in the messaging conversation. A third option and its corresponding user interface that would be displayed in the first region optionally corresponds to a third application for adding images or videos (e.g., from a photo library of the electronic device) to the messaging conversation. Additional and/or alternative options and corresponding applications and user interfaces are also within the scope of the disclosure. Making the respective selectable option available via the respective user interface element avoids clutter in the user interface (e.g., avoids display of the respective user interface element until it is needed) and provides for consistent interaction with and/or access to different applications and/or operations relating to the messaging conversation.

In some embodiments, while the process to record the respective audio message or the process to record the second respective audio message is being performed, if the electronic device detects an input to cease displaying the messaging user interface (e.g., to exit the messaging conversation), such as in FIG. 6J, the electronic device continues the process to record the respective audio message or the process to record the second respective audio message, respectively, such as in FIG. 6K. In such embodiments, even while the messaging user interface is no longer being displayed by the electronic device, the electronic device continues recording audio detected at the microphone. As such, the user of the electronic device is optionally able to continue providing audio (e.g., speech) input to the electronic device for inclusion in the respective audio message or the second respective audio message, respectively. Upon subsequently receiving input to redisplay the messaging user interface, such as in FIG. 6K, the electronic device optionally redisplays the messaging user interface while continuing to perform the above processes, respectively, such as in FIG. 6L. After and while redisplaying the messaging user interface, in response to detecting input to cease the above processes, respectively (e.g., as described above for each process, separately), such as in FIG. 6L, the electronic device optionally ceases the above processes, respectively, and subsequent operations performed by the electronic device are optionally as they were described previously for each process, such as in FIG. 6M.

It should be understood that the particular order in which the operations in method 700 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 900) are also applicable in an analogous manner to method 700 described above with respect to FIG. 7. For example, the operation of the electronic device facilitating efficient inputting of audio for audio-based messaging, described above with reference to method 700 optionally has one or more of the characteristics of transcribing audio into text for transmission as a message, described herein with reference to other methods described herein (e.g., method 900). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5H) or application specific chips. Further, the operations described above with reference to FIG. 7 are, optionally, implemented by components depicted in FIGS. 1A-1B. For example, displaying operation 702*a*, detecting operation 702*b* and transmitting operation 702*e*, are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Audio-Based Text Transcription

Users interact with electronic devices in many different manners, including providing audio input to content-entry user interfaces (e.g., messaging user interfaces) for audio transcription into text. In some circumstances, it can be desirable to access and interact with such user interfaces efficiently. The embodiments described below provide ways in which an electronic device facilitates efficient transcription of audio into text-based messages, thus enhancing the user's interactions with the device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 8B:
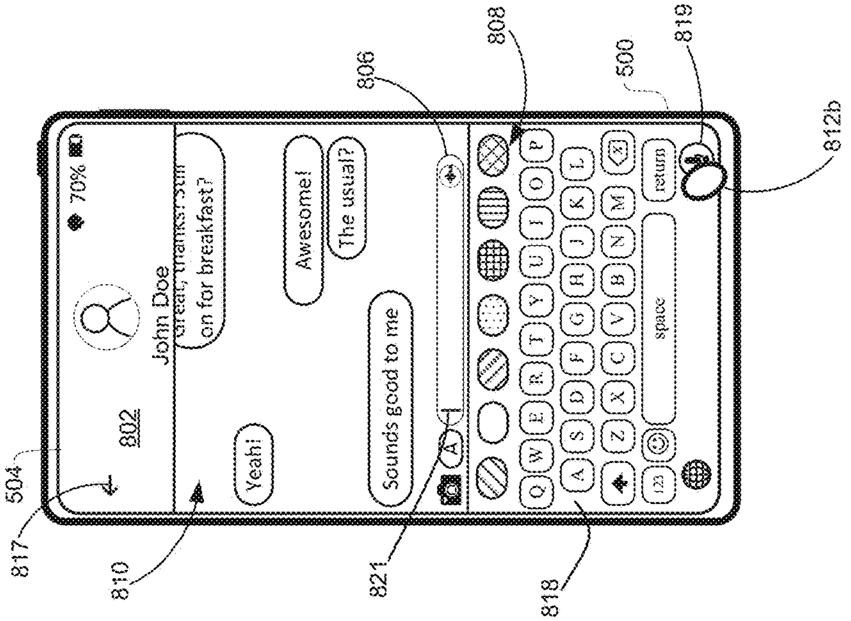
FIGS. 8A-8S illustrate exemplary ways in which an electronic device facilitates transcription of audio into text-based messages in accordance with some embodiments of the disclosure.
Figure 8A:
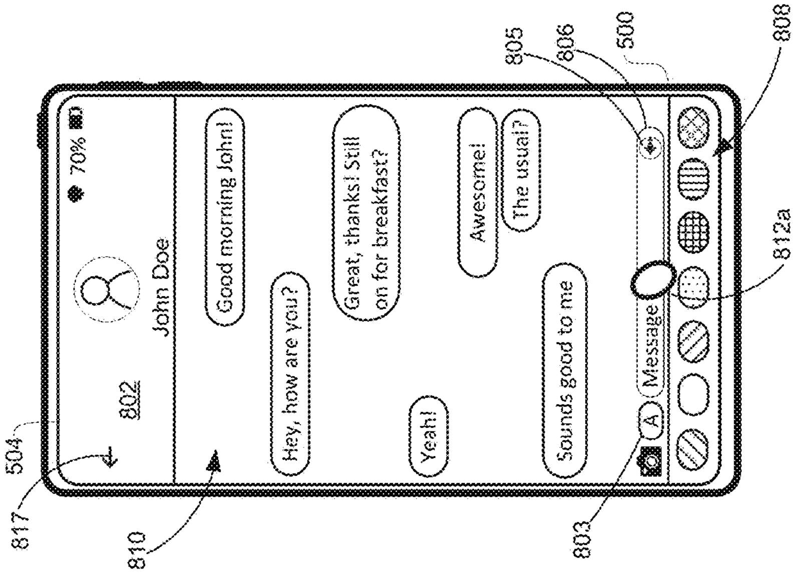
Figure 8D:
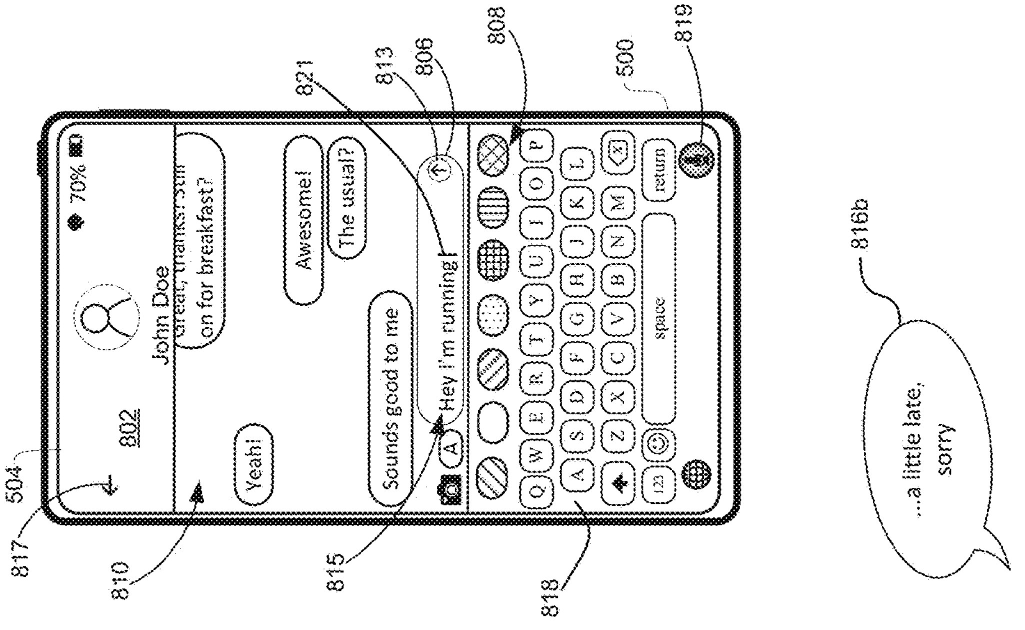
Figure 8C:
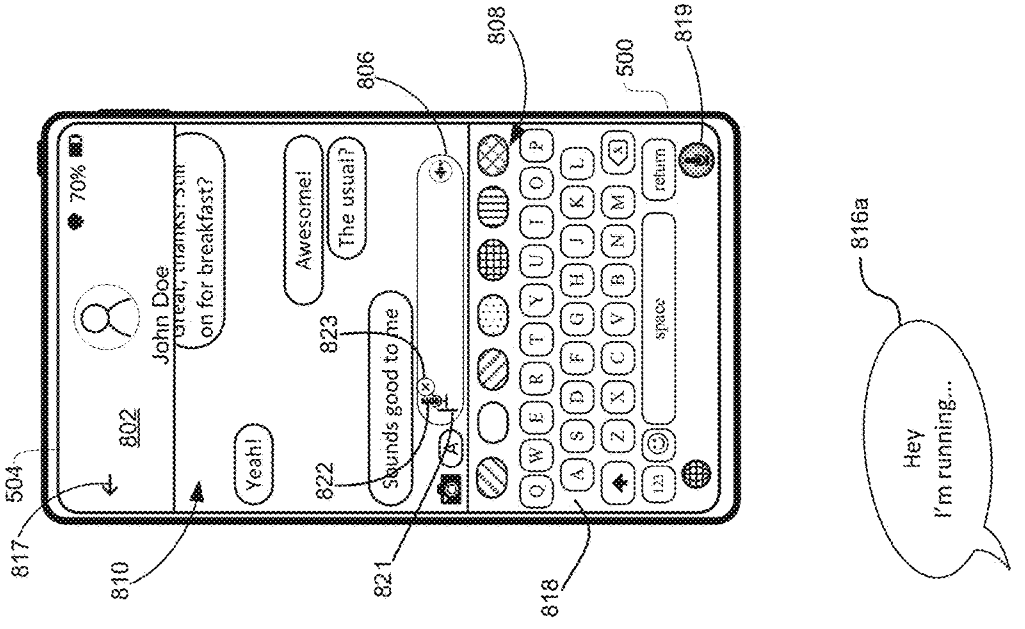
Figure 8F:
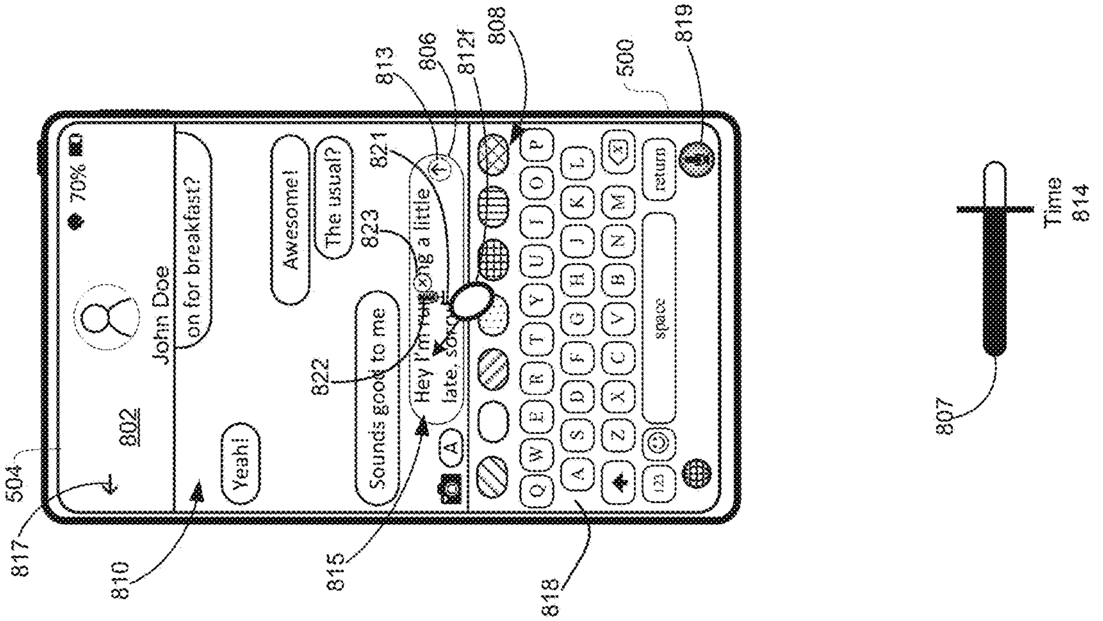
Figure 8E:
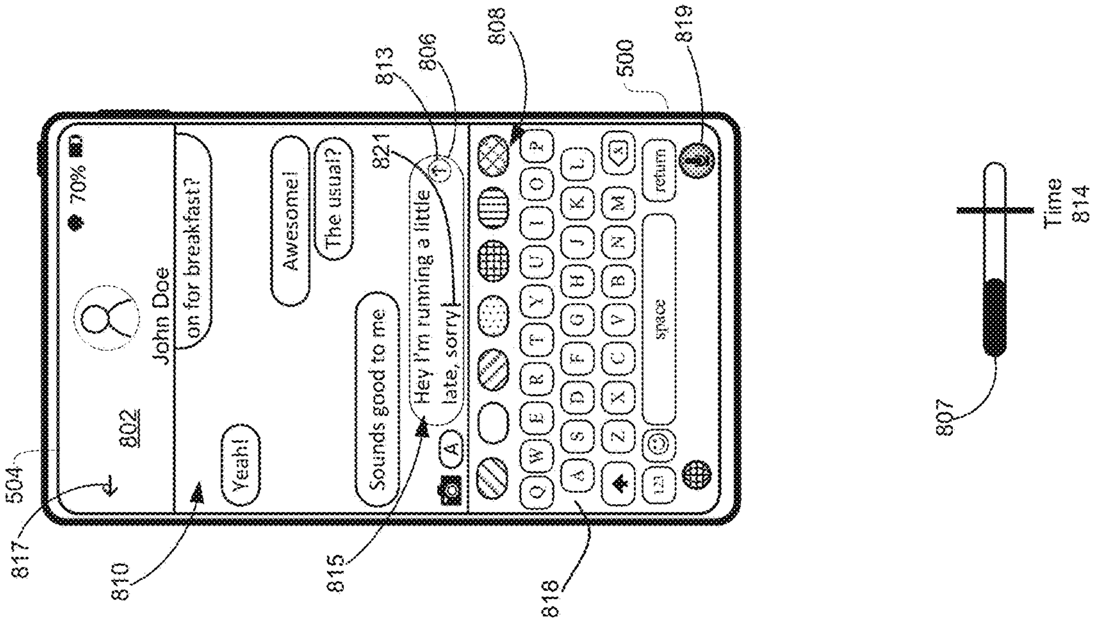
Figure 8H:
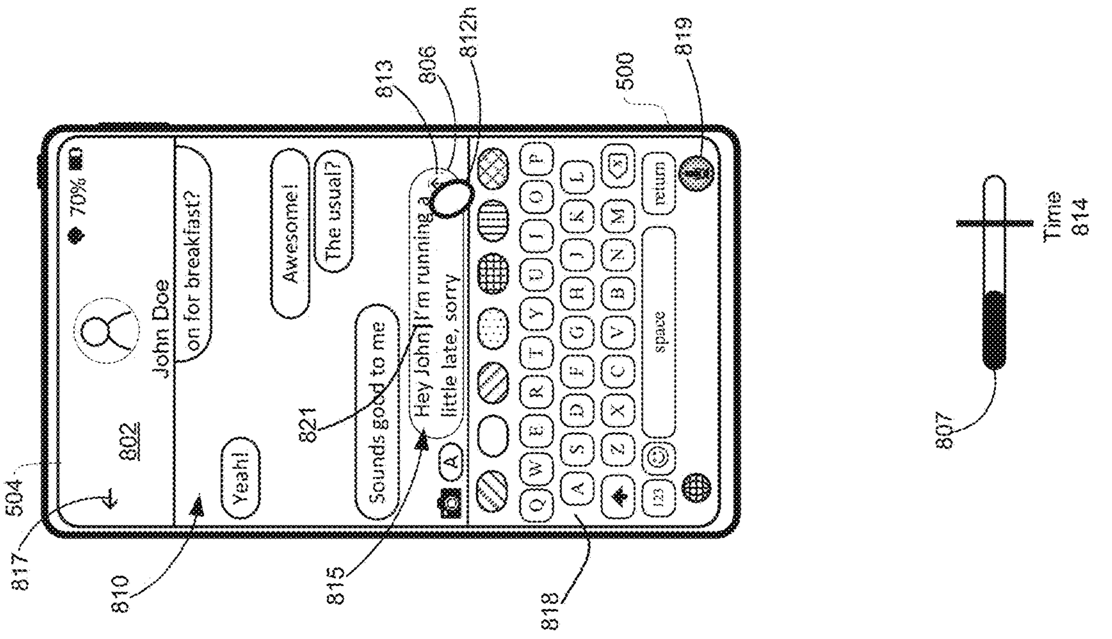
Figure 8G:
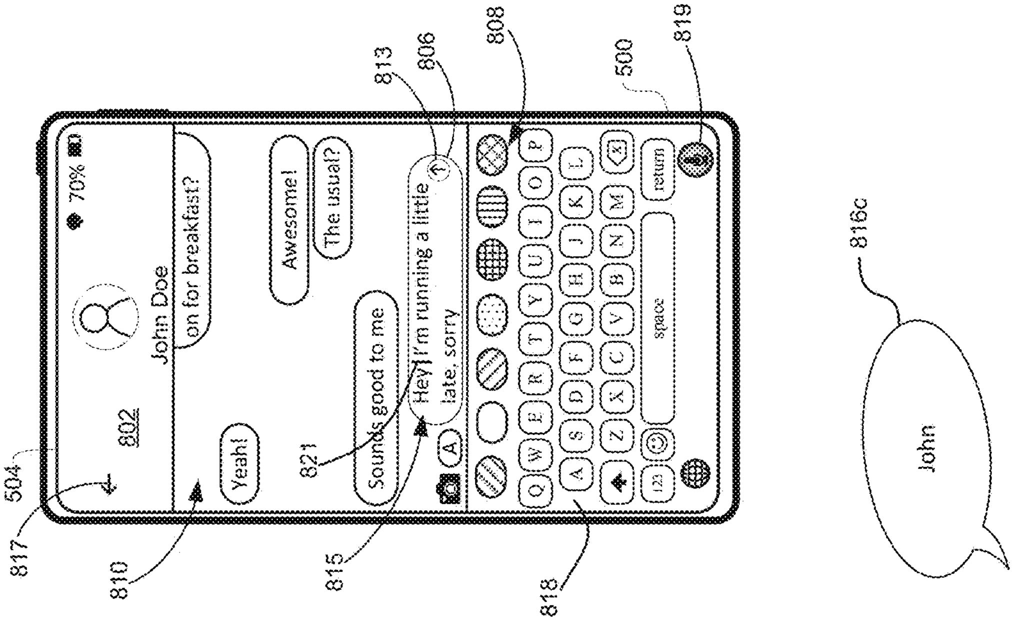
Figure 8J:
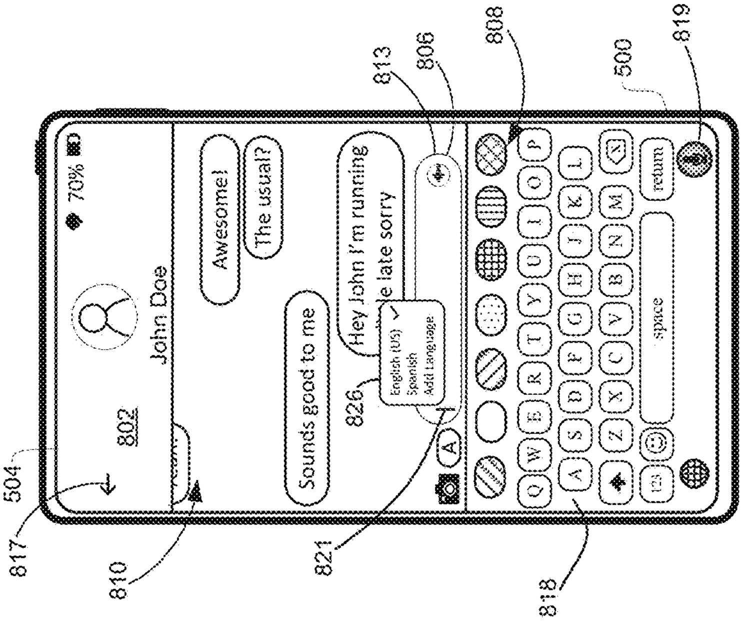
Figure 8I:
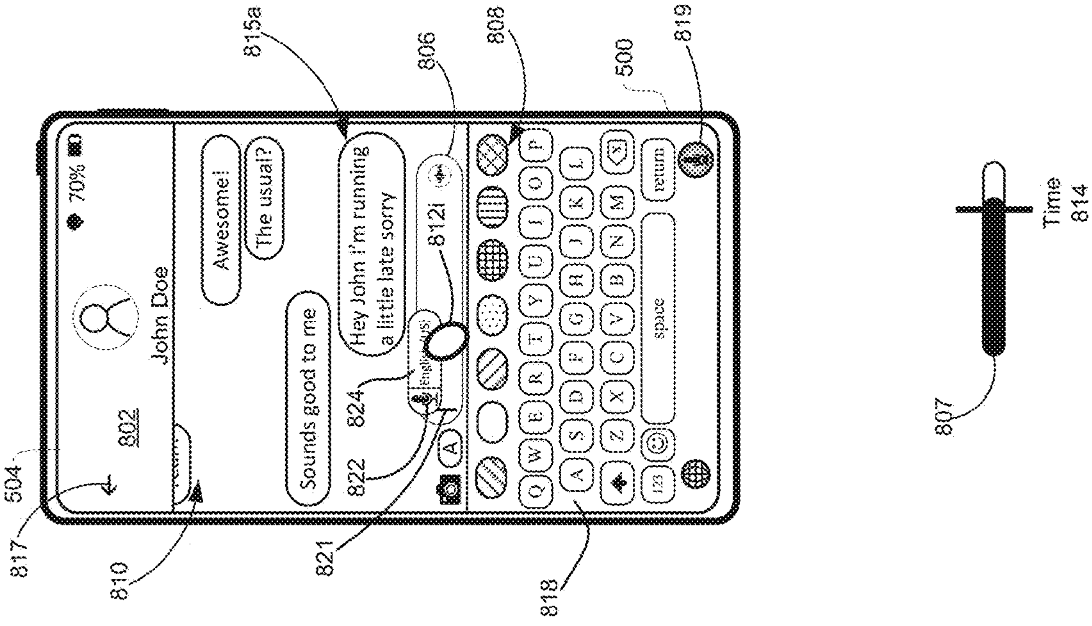
Figure 8K:
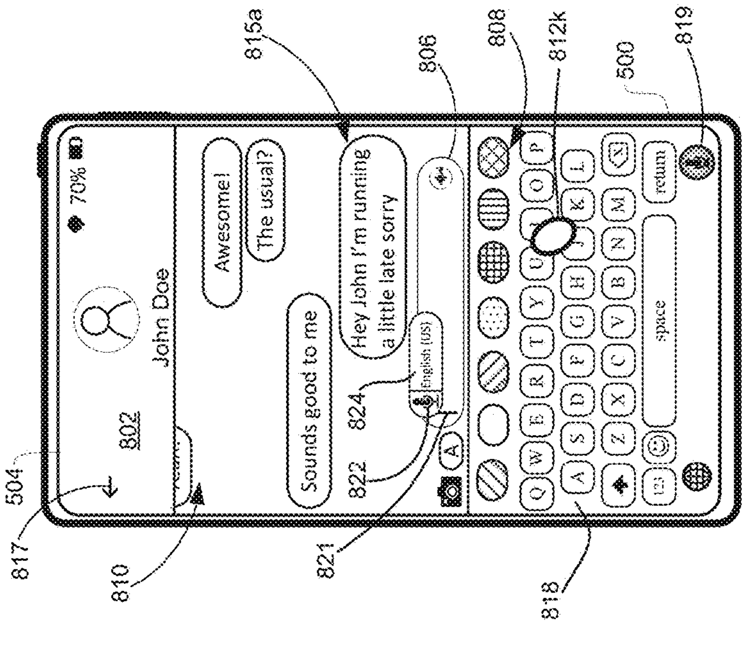
Figure 8L:
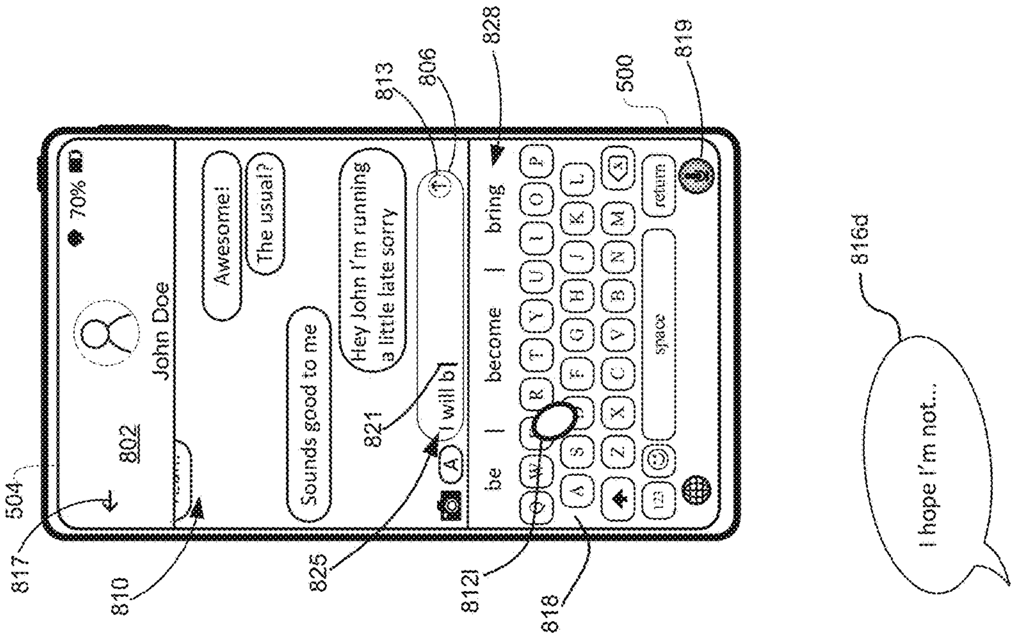
Figure 8N:
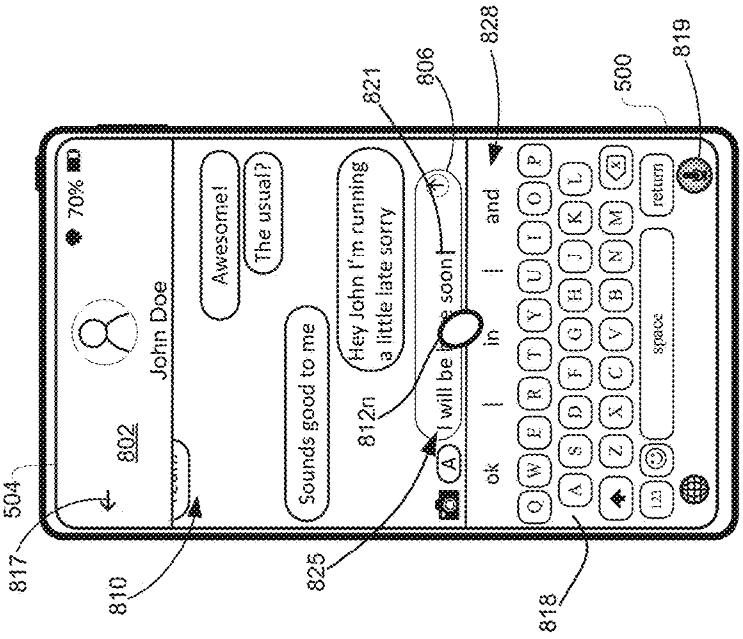
Figure 8M:
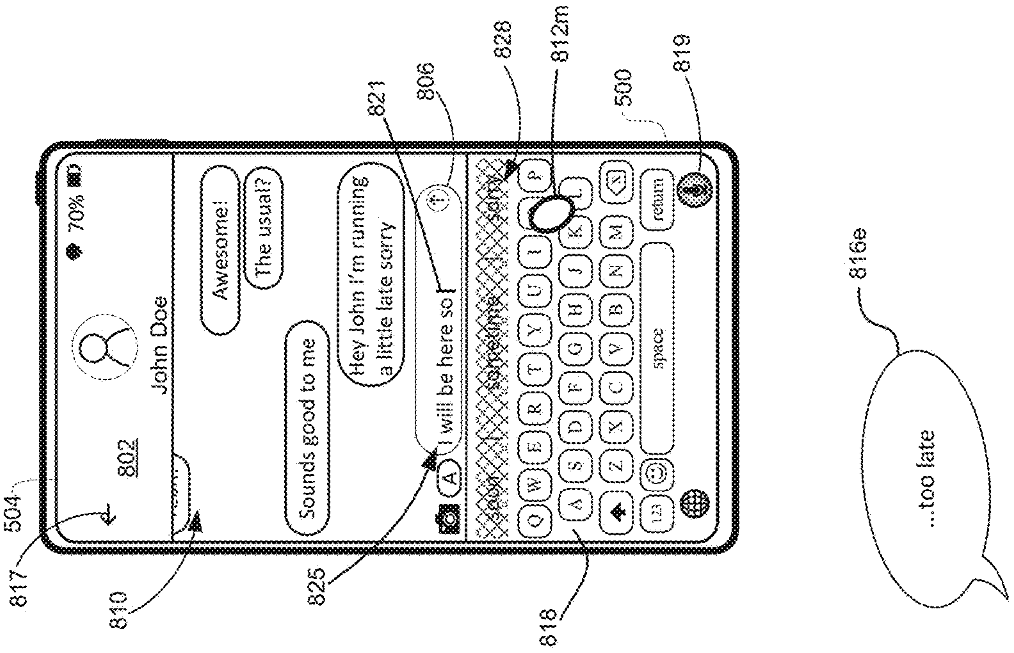
Figure 8P:
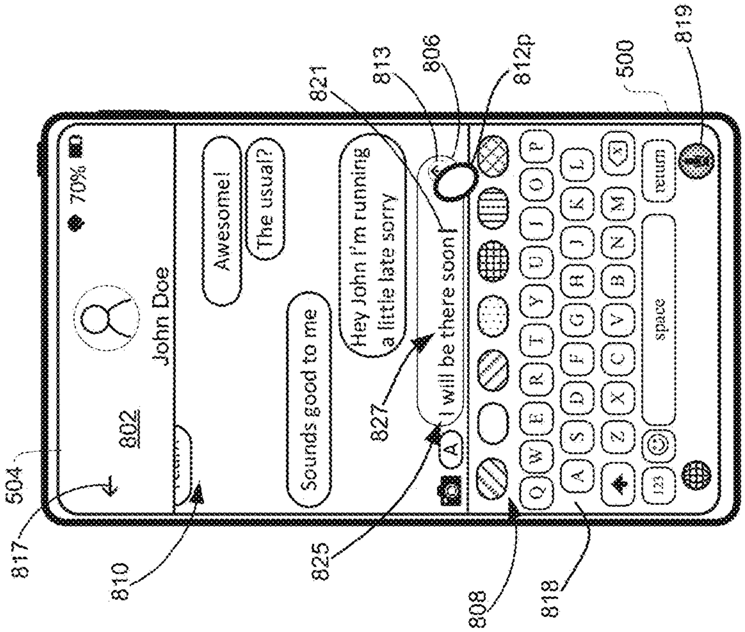
Figure 8O:
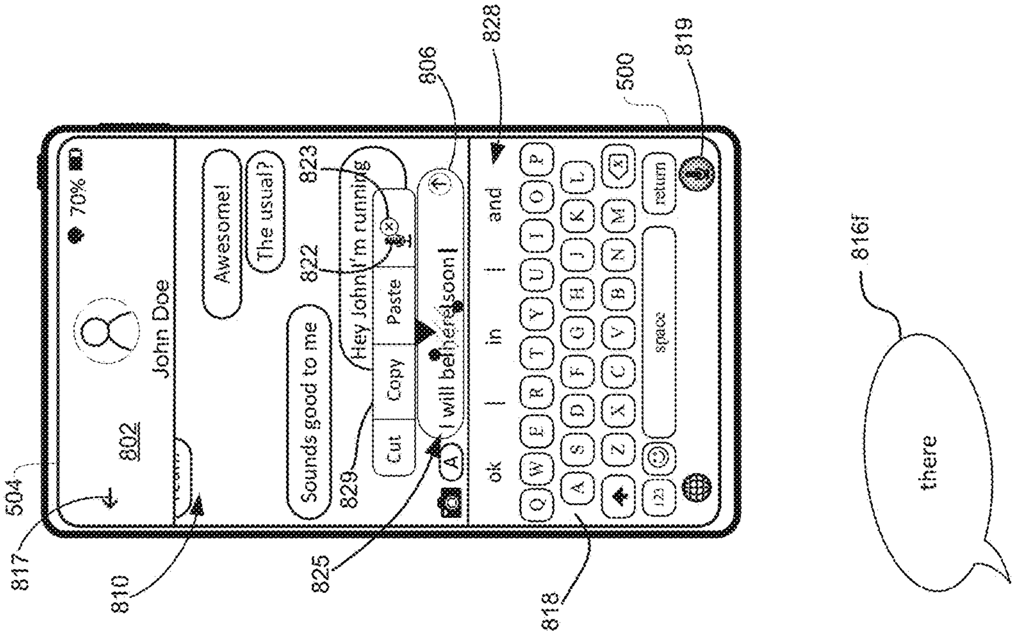
Figure 8R:
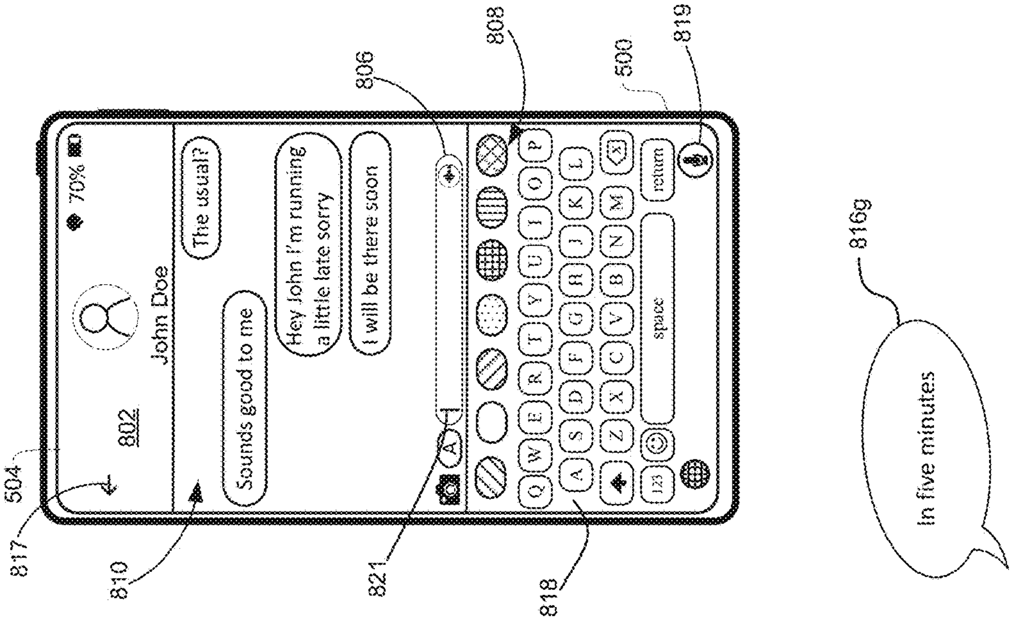
Figure 8Q:
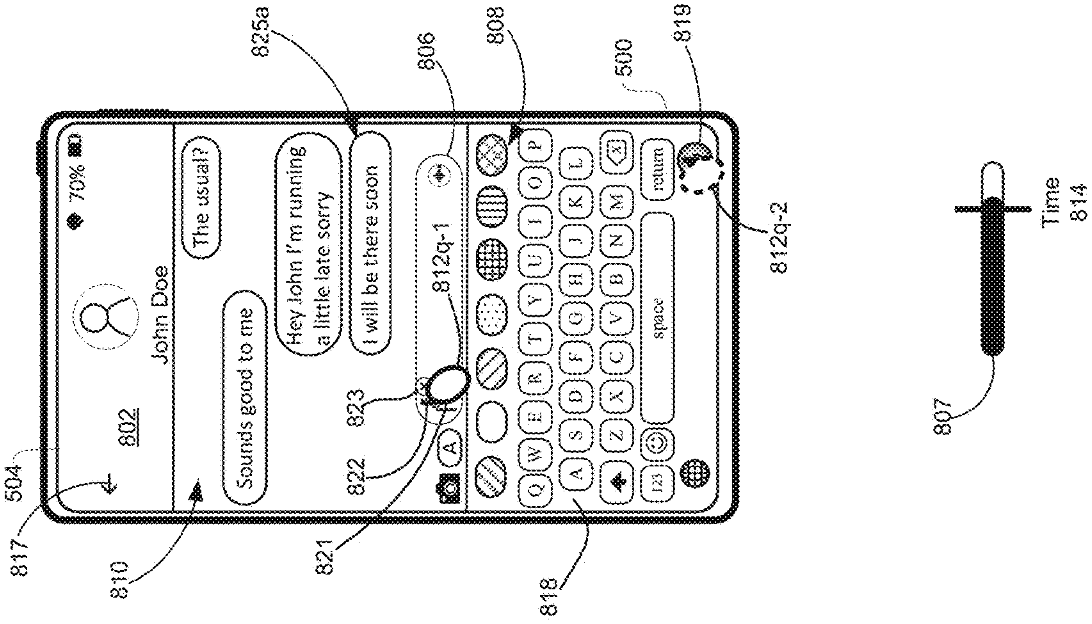
Figure 8S:
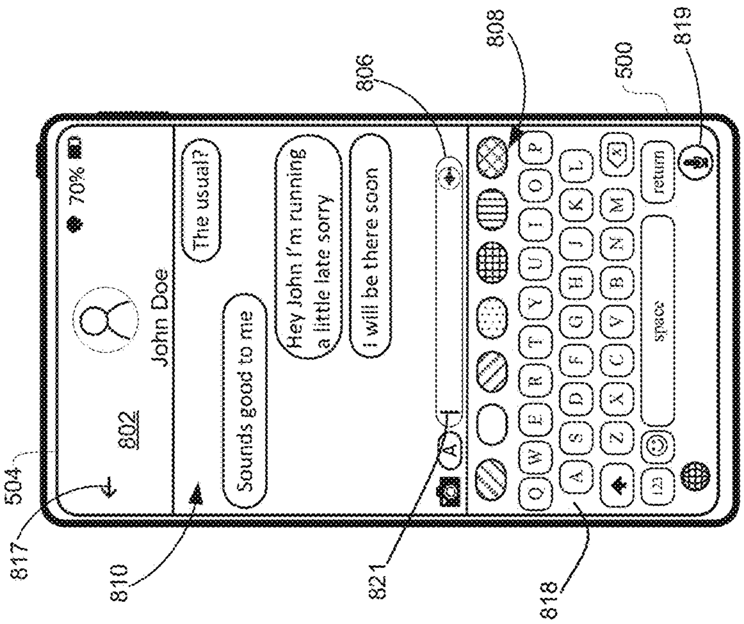

FIGS. 8A-8S illustrate exemplary ways in which an electronic device facilitates transcription of audio into text-based messages in accordance with some embodiments of the disclosure. The embodiments in these figures are used to illustrate the processes described below, including the processes described with reference to FIG. 9. Although FIGS. 8A-8S illustrate various examples of ways an electronic device is able to perform the processes described below with reference to FIG. 9, it should be understood that these examples are not meant to be limiting, and the electronic device is able to perform one or more processes described below with reference to FIG. 9 in ways not expressly described with reference to FIGS. 8A-8S.

FIG. 8A illustrates electronic device 500 displaying user interface 802 (e.g., via a display device, via a display generation component, etc.). In some embodiments, user interface 802 is displayed via a display generation component. In some embodiments, the display generation component is a hardware component (e.g., including electrical components) capable of receiving display data and displaying a user interface. In some embodiments, examples of a display generation component include a touch screen display (such as touch screen 504), a monitor, a television, a projector, an integrated, discrete, or external display device, or any other suitable display device that is in communication with device 500.

In some embodiments, user interface 802 is a messaging user interface of a messaging application via which messages between two or more users can be viewed or sent. In some embodiments, user interface 802 has one or more characteristics of user interface 602 described above in the FIG. 6 series. In FIG. 8A, user interface 802 is a user interface of a messaging conversation between the user of device 500 and John Doe. User interface 802 includes region 810, which includes representations of messages included in the messaging conversation (e.g., messages that have been sent by John Doe or the user of device 500 to the messaging conversation and/or to each other). User interface 802 also includes entry field 806, which is optionally a field into which the user of device 500 can provide content (e.g., text, images, video, files, etc.), such as via a soft keyboard or other input mechanism, to subsequently transmit to the messaging conversation. Entry field 806 includes option 805 that is optionally selectable to initiate a process to record and/or transmit an audio message to the messaging conversation (e.g., in a similar manner as described above in method 700).

In FIG. 8A, user interface 802 also includes application bar 808. Application bar 808 optionally includes one or more options that are associated with different applications or functionalities related to messaging. For example, descriptions of the one or more options of the application bar 808 are given above with reference to the FIG. 6 series. Application bar 808 is optionally displayed in user interface 802 in response to device 500 detecting selection of option 803. Additionally, in FIG. 6A, user interface 802 includes selectable option 817. In some embodiments, selectable option 817 is selectable to cause the electronic device 500 to navigate away from the user interface 802. For example, the electronic device 500 displays a user interface that includes a plurality of conversations between the user of the electronic device 500 and other users, including the conversation between the user and John Doe in FIG. 8A.

In FIG. 8A, electronic device 500 detects selection of entry field 806 (e.g., via a tap of contact 812*a* on the touch screen 504) in the user interface 802. In response to detecting the selection of the entry field 806, the electronic device 500 shifts the content of user interface 802 upward, as shown in FIG. 8B, and displays soft keyboard 818 below the application bar 808. For example, the keyboard 818 includes a plurality of keys that are selectable to enter a plurality of corresponding characters (e.g., letters, numbers, special characters) into the entry field 806. Additionally, as shown in FIG. 8A, the electronic device 500 displays text cursor 821 at a first location in the entry field 806, which optionally indicates that text (e.g., comprising characters) are able to be entered into the entry field 806 using the keyboard 818.

In some embodiments, the keyboard 818 also includes selectable option 819 that is selectable to cause electronic device 500 to activate a dictation mode at the electronic device 500. For example, while in the dictation mode, the electronic device 500 records audio at the microphone of the electronic device 500, and converts speech input provided by the user into text input to the entry field 806. As will be described below, while the text is displayed in the entry field 806, the user of device 500 is optionally able to transmit the text to the messaging conversation in response to an input to transmit that text to the messaging conversation. In FIG. 8B, the electronic device 500 detects a selection input (e.g., a tap or touch input) 812*b* directed to the selectable option 819.

In some embodiments, in response to detecting the selection input 812*b*, the electronic device 500 activates the dictation mode at the electronic device 500. For example, as shown in FIG. 8C, the electronic device 500 displays the selectable option 819 with visual emphasis (e.g., highlighting, boldening, shading) indicating that the dictation mode is active at the electronic device 500. Additionally, as shown in FIG. 8C, the electronic device 500 displays visual indicator (e.g., microphone icon) 822 at the location of the text cursor 821 in the entry field 806. In some embodiments, the visual indicator 822 indicates that the dictation mode is active at the electronic device 500. Additionally, as shown in FIG. 8C, the visual indicator 822 includes user interface object (e.g., "x" affordance) 823. In some embodiments, the user interface object 823 indicates that selection of the visual indicator 822 (e.g., and/or the user interface object 823) causes the electronic device 500 to deactivate the dictation mode at the electronic device 500, as described in more detail later. In some embodiments, the dictation mode remains active at the electronic device 500 until receiving input corresponding to a request to deactivate the dictation mode, as described herein later.

As discussed above, while the dictation mode is active, speech input detected by the electronic device 500 optionally becomes transcribed into text that is displayed in the entry field 806. In FIG. 8C, the electronic device 500 detects speech input 816*a*. For example, as shown in FIG. 8C, the electronic device 500 detects, via the microphone, the user speaking the words "Hey I'm running" while the dictation mode is active. In response to detecting the speech input 816*a*, the electronic device 500 displays text 815 corresponding to the speech input at the location of the text cursor 821 in the entry field 806, as shown in FIG. 8D. For example, as shown in FIG. 8D, the electronic device 500 displays text comprising the words "Hey I'm running" based on the detected speech input 816*a*. In some embodiments, as shown in FIG. 8D, the electronic device 500 moves the text cursor 821 in the entry field 806 while displaying the text 815. For example, in FIG. 8D, the electronic device 500 moves the text cursor 821 away from the first location in FIG. 8C and displays the text cursor 821 at and/or near an end of the text 815 (e.g., next to the last word "running").

In some embodiments, while the electronic device 500 is detecting the speech input provided by the user of the electronic device 500, the electronic device 500 ceases display of the visual indicator 822. For example, in FIG. 8D, the visual indicator 822 and the user interface object 823 are not displayed in the entry field 806 while the electronic device 500 is detecting the speech input. Additionally, as shown in FIG. 8D, the electronic device 500 optionally replaces display of selectable option 805 in the entry field 806 with send option 813. For example, as described in more detail below, the send option 813 is selectable to cause the electronic device 500 to transmit a message including the text 815 to the messaging conversation with John Doe (e.g., in region 810).

In FIG. 8D, the electronic device 500 detects additional speech input 816*b* provided by the user of the electronic device 500. For example, as shown in FIG. 8D, the electronic device 500 detects, via the microphone, the user speaking the words "a little late, sorry" (in 816*b*). In some embodiments, in response to detecting the additional speech input 816*b*, the electronic device 500 updates display of the text 815 in entry field 806 in accordance with the detected speech input, as shown in FIG. 8E. For example, as shown in FIG. 8E, the electronic device 500 updates display of the text 815 to include additional text comprising the words "a little late, sorry" at the location of the text cursor 821 in FIG. 8D. As similarly, described above, the electronic device 500 moves the text cursor 821 in the entry field 806 after updating display of the text 815 in the entry field 806, as shown in FIG. 8E. Additionally, as described above, the electronic device 500 does not display the visual indicator 822 and the user interface object 823 while detecting the speech input, as shown in FIG. 8E.

In some embodiments, the electronic device 500 redisplays the visual indicator 822 in the entry field 806 after detecting a threshold amount (e.g., 0.5, 1, 1.5, 2, 3, 5, 10, or 15 seconds) of time has elapsed since detecting an end of the speech input provided by the user. For example, in FIG. 8E, the electronic device 500 detects an end of the speech input provided by the user of the electronic device 500 (e.g., no longer detects the user speak words, numbers, and/or special characters). In some embodiments, when the electronic device 500 detects the end of the speech input from the user, the electronic device 500 determines whether the threshold amount of time above has elapsed, as indicated by time marker 814 in timeline 807.

In some embodiments, after determining that the threshold amount of time has elapsed since detecting the end of the speech input, the electronic device 500 redisplays the visual indicator 822 in the entry field 806, as shown in FIG. 8F. For example, as shown in FIG. 8F, after determining that the threshold amount of time has elapsed, as indicated by timeline 807, the electronic device 500 displays the visual indicator and the user interface object at the current location of the text cursor 821 in the entry field 806. In some embodiments, as shown in FIG. 8F, the electronic device 500 redisplays the visual indicator 822 while maintaining display of the text 815 in the entry field 806.

In FIG. 8F, the electronic device 500 detects input 812*f* directed to text cursor 821 that includes movement of the text cursor 821 to a different location in entry field 806. For example, in FIG. 8F, the electronic device 500 detects a contact (e.g., a tap and hold of a finger or other input device) directed to the text cursor, followed by movement of the contact. In some embodiments, in response to detecting the input directed to the text cursor 821, the electronic device 500 moves the text cursor 821 in the entry field 806 in accordance with the input, as shown in FIG. 8G. For example, in FIG. 8G, the text cursor 821 is displayed next to the word "Hey" of the text 815 in entry field 806.

In some embodiments, as described above, in response to detecting speech input, the electronic device 500 displays text corresponding to the speech input at the current location of the text cursor 821 in the entry field 806. In FIG. 8G, while the dictation mode is still active at the electronic device 500, the electronic device 500 detects speech input 816*c*. For example, the electronic device 500 detects the user of the electronic device 500 speak the word "John" in FIG. 8C. In some embodiments, in response to detecting the speech input, the electronic device 500 updates display of the text 815 to include additional text at the location of the text cursor 821 in the entry field 806, as shown in FIG. 8H. For example, as shown in FIG. 8H, the electronic device 500 updates the text 815 to include the word "John" in accordance with the detected speech input at the location of the text cursor 821 in FIG. 8G. As shown in FIG. 8H, after updating the text 815 to include the additional text in accordance with the detected speech input, the electronic device 500 moves the text cursor 821 in the entry field 806 (e.g., next to the word "John"). In some embodiments, as described above, while detecting the speech input 816*c* in FIG. 8G, the electronic device 500 ceases display of the visual indicator 822 and the user interface object 823 in the entry field 806, as shown in FIG. 8H.

In FIG. 8H, after detecting an end of the speech input 816*c* in FIG. 8G, the electronic device 500 detects a selection input (e.g., a tap or touch input) 812*h* directed to the send option 813. In some embodiments, in response to detecting the selection input 812*h* the electronic device transmits a message including the text 815 to the messaging conversation between the user of the electronic device 500 and John Doe. For example, as shown in FIG. 8I, the electronic device 500 updates the region 810 to include a representation of the message 815*a* transmitted to John Doe and ceases display of the text 815 in the entry field 806. In some embodiments, after transmitting the message 815*a* to John Doe, the electronic device 500 moves the text cursor 821 to the first location in the entry field 806 (e.g., first location in FIG. 8B). Additionally, in FIG. 8I, because the threshold amount of time (e.g., described above) has elapsed since detecting the end of the speech input (e.g., 816*c* in FIG. 8G), as indicated by the timeline 807, the electronic device 500 redisplays the visual indicator 822 at the current location of the text cursor 821 in the entry field 806.

In some embodiments, the dictation mode is associated with a plurality of languages at the electronic device 500. For example, the languages are selected by the user for association with the dictation mode (e.g., and/or other text-entry modes, such as using the keyboard 818). In some embodiments, the electronic device 500 displays a user interface object 824 that corresponds to a currently enabled language of the plurality of languages, as shown in FIG. 8I. For example, in FIG. 8I, the visual indication 822 is displayed with the user interface object 824 that includes a text label "English (US)" indicating that US-based English is the currently enabled language of the plurality of languages. In some embodiments, the currently enabled language is the language in which text will be displayed in the entry field 806 in response to detecting speech input while the dictation mode is active. For example, because English is the currently enabled language for the dictation mode, the electronic device 500 recognizes speech input provided in the English language and displays text corresponding to the detected speech input in the English language, as similarly shown in FIGS. 8C-8E.

In some embodiments, the user interface object 824 is selectable to initiate a process for enabling a different language for the dictation mode. In FIG. 8I, the electronic device 500 detects a selection input (e.g., a tap or touch input) directed to the user interface object 824. In some embodiments, in response to detecting the selection of the user interface object 824, the electronic device displays a menu element 826 in the user interface 802, as shown in FIG. 8J. For example, as shown in FIG. 8J, the menu element 826 includes a list of the plurality of languages associated with the dictation mode at the electronic device 500. In FIG. 8J, the menu element 826 includes a visual indication (e.g., a check mark) that indicates English is the currently enabled language for the dictation mode. In some embodiments, if the electronic device 500 were to detect selection of a different language (e.g., Spanish), the electronic device 500 would set the language as the currently enabled language. For example, if Spanish were selected as the language for the dictation mode, as similarly described above, speech input detected in the Spanish language would be transcribed to text in Spanish in the entry field 806.

As described above, in some embodiments, the electronic device 500 displays text in the entry field 806 in response to detecting selection of one or more keys of the keyboard 818. In FIG. 8K, the electronic device 500 detects selection of one or more keys of the keyboard 818. For example, the electronic device 500 detects a selection input (e.g., a tap or touch input) 812*k* directed to a series of keys of the keyboard 818. In some embodiments, in response to detecting the selection of one or more keys of the keyboard 818, the electronic device 500 displays text 825 in the entry field 806 corresponding to the selected one or more keys, as shown in FIG. 8L. For example, as shown in FIG. 8L, the electronic device 500 displays the text "I will b" corresponding to the selected keys of the keyboard 818. As shown in FIG. 8L, while displaying the text 825 in response to detecting selection of the keys, the electronic device 500 moves the text cursor 821 in the entry field 806, as similarly described above.

In some embodiments, while detecting selection of the one or more keys of the keyboard 818, the electronic device 500 ceases display of the visual indication 822 and the user interface object 824 shown previously in FIG. 8K. In some embodiments, while detecting selection of the one or more keys of the keyboard 818, the electronic device 500 displays one or more user interface objects 828 that are selectable to enter suggested text into the entry field 806. For example, in FIG. 8L, the one or more user interface objects 828 include text labels that indicate the suggested text (e.g., "be," "become," "bring") that will be entered into the entry field 806 if the one or more user interface objects 828 are selected. In some embodiments, the suggested text is entered into the entry field 806 at the location of the text cursor 821 in the entry field 806. In some embodiments, the suggested text is based on the words of the text 825 displayed in the entry field 806. For example, in FIG. 8L, because the text cursor 821 is located next to the letter "b" in the entry field 806 (e.g., indicating that additional characters will be displayed next to the letter "b"), the electronic device 500 displays the one or more user interface objects 828 that include words that begin with the letter "b" above the keyboard 818.

In FIG. 8L, the electronic device 500 detects additional selection of (e.g., via selection input 812*l* directed to) one or more keys of the keyboard 818. As indicated in FIG. 8L by the visual emphasis of the selectable option 819, the electronic device 500 is still in the dictation mode when the selection input 812*l* directed to the one or more keys of the keyboard 818 is detected. Additionally, in FIG. 8L, the electronic device 500 concurrently detects speech input 816*d* provided by the user of the electronic device 500. For example, as shown in FIG. 8L, the electronic device 500 detects, via the microphone, the user speaking the words "I hope I'm not" while the user is providing the selection input 812*l*.

In some embodiments, in response to detecting the additional selection of the keys of the keyboard 818, the electronic device 500 updates display of the text 825 in the entry field 806 to include additional text corresponding to the selected keys of the keyboard 818. For example, as shown in FIG. 8M, the electronic device 500 updates display of the text 825 to include the words "be here so" at the location of the text cursor 821 in FIG. 8L. Additionally, in some embodiments, in response to detecting the speech input 816*d* while detecting the additional selection of the keys, the electronic device 500 forgoes updating the text 825 in the entry field 806 to include text corresponding to the detected speech input. For example, as shown in FIG. 8M, the text 825 displayed in the entry field 806 is not updated to include the words "I hope I'm not" that were detected in the speech input 816*d* in FIG. 8L. Accordingly, as discussed above, while in the dictation mode, if the electronic device 500 detects input that concurrently includes selection of keys of the keyboard 818 and speech input provided by the user, the electronic device 500 displays text in the entry field 806 that corresponds to the selected keys and does not display text in the entry field 806 that corresponds to the detected speech input.

In some embodiments, if the electronic device 500 concurrently detects selection of one or more keys of the keyboard 818 and speech input provided by the user, the electronic device 500 ceases display of and/or deactivates the one or more user interface objects 828. For example, as shown in FIG. 8M, in response to concurrently detecting the selection input 812*l* and the speech input 816*d* in FIG. 8L, the electronic device 500 displays the one or more user interface objects 828 with a visual effect that obscures the text labels of the one or more user interface objects 828, indicating that the one or more user interface objects 828 are not selectable to enter suggested text into the entry field 806. In some embodiments, the electronic device 500 does not display the one or more user interface objects 828 in the user interface 802. For example, the electronic device 500 does not display any user interface objects above the keyboard 818 and/or redisplays the application bar 808 shown previously in FIG. 8K.

In FIG. 8M, the electronic device 500 concurrently detects additional selection input (e.g., tap or touch input) 812*m* directed to one or more keys of the keyboard 818 and additional speech input 816*e*. For example, the electronic device 500 concurrently detects selection of the one or more keys and the user of the electronic device 500 speaking the words "too late" in FIG. 8M. In some embodiments, as similarly described above, in response to concurrently detecting the selection of one or more keys of the keyboard 818 and the additional speech input, the electronic device 500 updates the text 825 in the entry field 806 to include additional text corresponding to the selected one or more keys and forgoes updating the text 825 to include additional text corresponding to the detected speech input, as shown in FIG. 8N. For example, in FIG. 8N, the electronic device 500 updates the text 825 in the entry field 806 to include the word "soon" corresponding to the selected keys of the keyboard 818 and does not update the text 825 to include the words "too late" corresponding to the detected speech input, despite the dictation mode still being active. Additionally, as similarly described above, in FIG. 8N, the electronic device 500 moves the text cursor 821 in the entry field 806 when updating the text 825 in the entry field 806. In some embodiments, because the electronic device 500 has detected selection of the keys of the keyboard 818, the electronic device 500 does not redisplay the visual indicator 822, as shown in FIG. 8N.

In FIG. 8N, the electronic device 500 has detected an end of the speech input provided by the user of the electronic device 500. For example, the electronic device 500 no longer detects, via the microphone, the user speaking words, letters, numbers, and/or special characters. Accordingly, in some embodiments, the electronic device 500 redisplays and/or reactivates the one or more user interface objects 828 in the user interface 802, as shown in FIG. 8N. For example, as shown in FIG. 8N, the electronic device 500 redisplays the one or more user interface objects 828 above the keyboard 818 and/or ceases display of the visual effect in FIG. 8M, indicating that the user interface objects 828 are once again selectable to enter suggested text into the entry field 806.

In FIG. 8N, the electronic device 500 detects a selection input (e.g., a double tap or touch input) 812*n* directed to a portion of the text 825 in the entry field 806. For example, the electronic device 500 detects a double tap of an object (e.g., a finger or input device) on the touch screen 504 directed to the word "here" of the text 825 in FIG. 8N. In some embodiments, in response to detecting the selection of the portion of the text 825, the electronic device 500 visually distinguishes the portion of the text 825 in the entry field 806, as shown in FIG. 8O. For example, as shown in FIG. 8O, the electronic device 500 highlights the word "here" of the text 825 in the entry field 806. Additionally, in some embodiments, the electronic device 500 displays menu element 829 in the user interface 802, as shown in FIG. 8O. For example, as shown, the menu element 829 includes a plurality of selectable options, including options for cutting the selected portion of the text 825, copying the selected portion of the text 825, and/or replacing the selected portion of the text 825. Additionally, as shown in FIG. 8O, the menu element 829 includes the visual indicator 822 and the user interface object 823 (e.g., optionally because the threshold amount of time discussed above has elapsed since detecting the end of the speech input 816*e* in FIG. 8M). For example, the visual indicator 822 and/or the user interface object 823 are selectable within the menu element 829 to deactivate the dictation mode at the electronic device 500, as similarly discussed above.

In FIG. 8O, while the portion of the text 825 is selected, the electronic device 500 detects speech input 816*f*. For example, the electronic device 500 detects, via the microphone, the user of the electronic device 500 speaking the word "there" while the dictation mode is still active at the electronic device 500 in FIG. 8O. In some embodiments, in response to detecting the speech input 816*f*, the electronic device 500 replaces display of the selected portion of the text 825 with text 827 corresponding to the detected speech input, as shown in FIG. 8P. For example, as shown in FIG. 8P, the electronic device 500 replaces the highlighted word "here" of the text 825 in FIG. 8O with the word "there" corresponding to the detected speech input. Additionally, in some embodiments, in response to detecting the speech input in FIG. 8O, the electronic device 500 ceases display of the menu element 829, including the visual indicator 822, as shown in FIG. 8P. In some embodiments, as shown in FIG. 8P, because the electronic device 500 is no longer detecting selection of the keys of the keyboard 818, the electronic device 500 replaces display of the one or more user interface objects 828 with the application bar 808 (e.g., after replacing display of the selected portion of the text 825 with the text 827).

In FIG. 8P, the electronic device 500 detects a selection input (e.g., a tap or touch input) 812*p* directed to the send option 813 in the entry field 806. In some embodiments, as similarly described above, in response to detecting the selection of the send option 813, the electronic device 500 transmits a message including the text 825 to the messaging conversation between the user of the electronic device 500 and John Doe, as shown in FIG. 8Q. For example, as shown in FIG. 8Q, the electronic device 500 updates the region 810 to include a representation of the message 825*a* transmitted to John Doe. Additionally, as shown in FIG. 8Q, after transmitting the message 825*a*, the electronic device 500 ceases display of the text 825 in the entry field 806 and moves the text cursor 821 back to the first location in the entry field 806 (e.g., the first location in FIG. 8B). In some embodiments, as shown in FIG. 8Q, because the threshold amount of time has elapsed since detecting the end of the speech input 816*f* in FIG. 8O, as indicated by timeline 807, the electronic device 500 redisplays the visual indicator 822 and the user interface object 823 at the location of the text cursor 821 in the entry field 806.

In FIG. 8Q, the electronic device 500 detects an input corresponding to a request to deactivate the dictation mode at the electronic device 500. For example, as shown in FIG. 8Q, the electronic device 500 detects a selection input (e.g., a touch or tap input) 812*q*-1 directed to the visual indication 822 and/or the user interface object 823, or a selection input 812*q*-2 directed to the selectable option 819 in the keyboard 818. In some embodiments, in response to detecting the input, the electronic device 500 deactivates the dictation mode at the electronic device. For example, as shown in FIG. 8R, the electronic device 500 no longer displays the selectable option 819 with visual emphasis (e.g., highlighting, boldening, shading), indicating that the dictation mode is no longer active at the electronic device 500. Additionally, as shown in FIG. 8R, the electronic device 500 ceases display of the visual indicator 822 and the user interface object 823 in the entry field 806.

In FIG. 8R, while the dictation mode is no longer active, the user of the electronic device 500 provides speech input 816*g*. For example, as shown in FIG. 8R, the speech input 816*g* includes the words "In five minutes." In some embodiments, in response to detecting the speech input, the electronic device 500 forgoes displaying text corresponding to the detected speech input in the entry field 806, as shown in FIG. 8S. For example, as shown in FIG. 8S, because the dictation mode is not active when the speech input 816*g* in FIG. 8R is detected, the electronic device 500 does not display text that includes the words "In five minutes" in the entry field 806.

FIG. 9 is a flow diagram illustrating a method 900 of facilitating transcription of audio into text-based messages in accordance with some embodiments of the disclosure. The method 900 is optionally performed at an electronic device such as device 100, device 300, or device 500 as described above with reference to FIGS. 1A-1B, 2-3, 4A-4B and 5A-5H. Some operations in method 900 are, optionally combined and/or order of some operations is, optionally, changed.

As described below, the method 900 provides ways to facilitate efficient audio transcription of audio into text-based messages. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 900 is performed by an electronic device (e.g., device 500) in communication with a display generation component (e.g., touch screen 504) and one or more input devices. For example, a mobile device (e.g., a tablet, a smartphone, a media player, or a wearable device), a computer (e.g., a desktop computer, a laptop computer), a wearable device (e.g., a watch, a head-mounted device), or an automobile device. In some embodiments, the electronic device has one or more characteristics of the electronic device in method 700. In some embodiments, the display generation component has one or more characteristics of the display generation component in method 700. In some embodiments, the one or more input devices have one or more characteristics of the one or more input devices in method 700.

In some embodiments, the electronic device displays (902*a*), via the display generation component, a user interface (e.g., a messaging user interface, a text-composition user interface, a note-taking user interface, an emailing user interface, and/or social media user interface), such as user interface 802 in FIG. 8A, including a text-entry region (e.g., entry field 806 in FIG. 8B) that includes a text cursor (e.g., text cursor 821 in FIG. 8B) at a first location in the text-entry region (902*b*). For example, the text-entry region displays one or more characters (e.g., letters, numbers, punctuation marks, and/or special characters) in response to receiving user input corresponding to a request to enter text into the text-entry region, as discussed in more detail below. In some embodiments, the first location at which the text cursor is displayed is a predefined location in the text-entry region (e.g., a beginning/starting location in the text-entry region). In some embodiments the first location is determined based on the content of the text-entry region. For example, the text cursor is displayed beside a character (e.g., at an end of a word or after a punctuation mark) or is displayed between characters (e.g., within a word) in the text-entry region. In some embodiments, the text cursor indicates the location in the text-entry region at which inputted text will be displayed. In some embodiments, the electronic device moves the text cursor as user input for entering text into the text entry region is received, and the text-entry region correspondingly becomes populated with characters in response to such user input. In some embodiments, the electronic device moves the text cursor in response to receiving user input directed to the text cursor (e.g., selection and movement of the text cursor) in the text-entry region.

In some embodiments, the user interface includes a first selectable option (e.g., selectable option 819 in FIG. 8B) that is selectable to initiate a dictation mode at the electronic device (902*c*). For example, the first selectable option is a selectable button displayed in the user interface. In some embodiments, the first selectable option is displayed in the text-entry region. In some embodiments, the first selectable option is displayed in a soft keyboard of the (e.g., displayed by the) electronic device (e.g., outside of the text entry region). For example, the first selectable option is displayed below the keys of the keyboard which are selectable to enter text into the text-entry region. In some embodiments, when the dictation mode is initiated, speech input detected by the electronic device is converted to text that is displayed/entered in the text-entry region, at the location of the text cursor, as discussed below.

In some embodiments, while displaying the user interface, the electronic device detects (902*d*), via the one or more input devices, a first input corresponding to selection of the first selectable option, such as selection input 812*b* directed to the selectable option 819 as shown in FIG. 8B. For example, if the user interface is displayed on a touch screen of the electronic device, the electronic device detects a touchdown of a contact on a location of the touch screen that corresponds to the first selectable option, followed by lift-off of the contact. In some embodiments, if the user interface is displayed on a display of the electronic device (e.g., external to the electronic device or integrated with the electronic device but different from a touch screen), the electronic device detects selection of the first selectable option via an external input device (e.g., keyboard, trackpad, mouse) in communication with the electronic device. In some embodiments, the first input includes an air gesture (e.g., a hand pinch gesture performed using an index finger and thumb of the user) while attention (e.g., gaze) of the user is directed to the first selectable option. In some embodiments, the first input has one or more characteristics of inputs described in method 700.

In some embodiments, in response to detecting the first input, the electronic device initiates (902*e*) the dictation mode (e.g., activating the dictation mode) and displays, via the display generation component, a first visual indicator (e.g., a microphone icon) that indicates the dictation mode is active, wherein the first visual indicator is displayed at the first location of the text cursor in the text-entry region, such as display of visual indicator 822 at the location of the text cursor 821 as shown in FIG. 8C. For example, the first visual indicator is concurrently displayed with the text cursor in the text-entry region. In some embodiments, the first visual indicator is displayed directly above the text cursor in the text-entry region. In some embodiments, the first visual indicator is displayed directly adjacent to (e.g., to the left or right of) the text cursor in the text-entry region. In some embodiments, the first visual indicator is displayed directly below the text cursor in the text-entry region. In some embodiments, the first visual indicator is selectable in the text-entry region to perform an operation involving the dictation mode (e.g., to deactivate the dictation mode).

In some embodiments, while displaying the first visual indicator at the first location in the text-entry region and while the dictation mode is active, the electronic device detects (902*f*), via the one or more input devices, a second input that includes first speech input, such as speech input 816*a* in FIG. 8C. For example, the electronic device detects, via a microphone of the electronic device, words, numbers, and/or special characters spoken by a user of the electronic device for compiling text to be displayed in the text-entry region. In some embodiments, the text corresponds to a message or an email to be sent to a user other than the user of the electronic device. In some embodiments, the text corresponds to one or more sentences, a list of tasks and/or items, and/or prose.

In some embodiments, while detecting the second input (902*g*), the electronic device displays (902*h*), via the display generation component, a first text representation of the first speech input at the first location in the text-entry region, such as display of text 815 in the entry field 806 as shown in FIG. 8D. For example, the first text representation of the first speech input is a font-based representation of the words and/or characters spoken by the user. In some embodiments, the first text representation of the speech input populates a portion of (e.g., starting at the first location) the text-entry region as the electronic device detects the words and/or characters spoken by the user. For example, the first text representation of the first speech input is displayed in the text-entry region in real time (e.g., within 0.05, 0.1, 0.4, 0.5, 0.8, 1, 1.2, or 1.5 seconds of detecting the words and/or characters spoken by the user). In some embodiments, as the electronic device displays the first text representation of the first speech input in the text-entry region, the electronic device moves the text cursor away from the first location (e.g., and to a last word, letter, number, and/or special character displayed in the text-entry region in the user interface in response to the speech input).

In some embodiments, the electronic device ceases (902*i*) display of the first visual indicator in the text-entry region, such as ceasing display of the visual indication 822 as shown in FIG. 8D. For example, after a predetermined amount of time (e.g., 0, 0.05, 0.1, 0.4, 0.5, 0.8, 1, 1.5, 2, or 3 seconds) of detecting the first speech input, the electronic device ceases display of the first visual indicator at the first location. In some embodiments, the first visual indicator is not displayed for at least a duration of the first speech input, as described in more detail below. In some embodiments, the electronic device selectively displays the first visual indicator (e.g., while not detecting speech input) in the text-entry region while the dictation mode is active. Ceasing display of a visual indicator in a text-entry region that indicates a dictation mode is active at an electronic device when the electronic device detects speech input enables text representation of the speech input to be displayed in the text-entry region without obstruction by the visual indicator and/or avoids unwanted crowding and/or population of the text-entry region, thereby improving user-device interaction.

In some embodiments, the text cursor is displayed at a second location (e.g., different from the first location) of the text-entry region after detecting an end of the first speech input (e.g., the second location is a location at or after an end portion of the first representation of the first speech input). In some embodiments, while displaying the first text representation of the first speech input at the first location in the text-entry region and after detecting an end of the second input, the electronic device determines that a threshold amount of time (e.g., 0.5, 1, 1.5, 2, 2.5, 3, 4, 5, 6, or 10 seconds) has elapsed since detecting the end of the second input, such as reaching marker 814 in timeline 807 as shown in FIG. 8F.

In some embodiments, in response to detecting that the threshold amount of time has elapsed since detecting the end of the second input, the electronic device redisplays, via the display generation component, the first visual indicator in the text-entry region at the second location of the text cursor, such as display of the visual indicator 822 at the location of the text cursor 821 as shown in FIG. 8F. For example, the electronic device redisplays the first visual indicator at the second location of the text cursor in the text-entry region to indicate that the dictation mode is still active. In some embodiments, the electronic device detects the end of the first speech input when the electronic device detects, via the microphone in communication with the electronic device, that the user is no longer speaking words, letters, numbers, and/or special characters. In some embodiments, after the first visual indicator is displayed, if the electronic device detects additional speech input, the electronic device displays a second text representation of the speech input at the second location of the cursor in the text-entry region. Additionally, as similarly described above, the electronic device ceases display of the first visual indicator at the second location in the text-entry region while detecting the additional speech input. Redisplaying a visual indicator in a text-entry region that indicates a dictation mode is active at an electronic device when the electronic device detects an end of previous speech input facilitates discovery that the dictation mode is still active at the electronic device and/or facilitates user input for displaying additional text representation of additional speech input in the text-entry region, thereby improving user-device interaction.

In some embodiments, the first visual indicator is selectable to modify operation of the dictation mode, such as selection of the first visual indicator as described with reference to FIG. 8Q. For example, the first visual indicator is displayed with an "x" indicator or affordance or similar affordance (e.g., displayed at a corner of the first visual indicator, to a side of the first visual indicator, above the first visual indicator, or below the first visual indicator) in the text-entry region. In some embodiments, the first visual indicator and/or the "x" indicator are selectable to cause the electronic device to deactivate the dictation mode at the electronic device. Displaying a visual indicator with a user interface object in a text-entry region that indicates a dictation mode is active at an electronic device facilitates discovery that the visual indicator is selectable to deactivate the dictation mode at the electronic device and/or reduces the number of inputs needed to deactivate the dictation mode at the electronic device, thereby improving user-device interaction.

In some embodiments, modifying the operation of the dictation mode includes deactivating the dictation mode at the electronic device, such as deactivating the dictation mode as described with reference to FIG. 8R. For example, in response to detecting selection input (e.g., a tap or touch or equivalent input) directed to the first visual indicator and/or the "x" affordance or indicator, the electronic device deactivates the dictation mode at the electronic device. In some embodiments, when the dictation mode is deactivated, the electronic device ceases display of the first visual indicator and the "x" affordance or indicator. In some embodiments, while the dictation mode is deactivated, if the electronic device detects additional speech input, the electronic device forgoes displaying a second text representation of the speech input in the text-entry region. Deactivating a dictation mode at an electronic device in response to detecting selection of a visual indicator in a text-entry region that indicates a dictation mode is active at the electronic device enables the dictation mode to be deactivated without displaying additional controls, thereby improving user-device interaction.

In some embodiments, the text-entry region is associated with a plurality of languages (e.g., languages in which a respective text representation of speech input is displayed, and/or languages in which the keys of a soft keyboard associated with the text-entry region are displayed) and a first language of the plurality of languages is selected prior to detecting the first input (e.g., selected by the user via a languages option displayed in the user interface, such as in the soft keyboard), such as the plurality of languages as described with reference to FIG. 8I.

In some embodiments, in response to detecting the first input, the electronic device concurrently displays, with the first visual indicator, a first user interface object corresponding to the first language, such as user interface objects 824 in FIG. 8I, wherein the dictation mode is operating according to the first language. For example, the first visual indicator is displayed adjacent to first user interface object in the text-entry region. In some embodiments, the first user interface object includes information, such as a text label, indicating that the first language is selected. In some embodiments, while the dictation mode is operating according to the first language, the electronic device recognizes the first speech input as including words and/or letters in the first language. In some embodiments, because the dictation mode is operating according to the first language, the first text representation of the first speech input is displayed in the first language (e.g., is displayed in English, Spanish, French, Mandarin Chinese, etc.) in the text-entry region. As described below, the first user interface object is selectable to initiate a process to change the language of the dictation mode. Displaying a visual indicator with a user interface object in a text-entry region that indicates a dictation mode is operating in a first language at an electronic device facilitates discovery that text representation of speech input will be displayed in the text-entry region in the first language and/or reduces the number of inputs needed to change the language the dictation mode is operating in at the electronic device, thereby improving user-device interaction.

In some embodiments, the first user interface object is selectable to initiate a process to select a second language, different from the first language, of the plurality of languages associated with the text-entry region to change a language according to which the dictation mode is operating from the first language to the second language, such as via display of menu element 826 corresponding to the plurality of languages as shown in FIG. 8J. For example, in response to detecting selection of (e.g., via a tap or touch input directed to) the first user interface object, the electronic device displays a menu including the plurality of languages associated with the text-entry region. In some embodiments, selection of the second language from the menu of the plurality of languages changes the language according to which the dictation mode is operating from the first language to the second language. Accordingly, because the dictation mode would now operate according to the second language, the electronic device would recognize the first speech input as including words and/or letters in the second language. For example, the first text representation of the first speech input would be displayed in the second language in the text-entry region. Initiating a process to change a language that a dictation mode is operating in at an electronic device in response to detecting selection of a user interface object in a text-entry region reduces the number of inputs needed to change the language the dictation mode is operating in at the electronic device, thereby improving user-device interaction.

In some embodiments, the text cursor is displayed at a second location of the text-entry region after detecting an end of the first speech input (e.g., the second location is a location at or after an end portion of the first representation of the first speech input, as described above). In some embodiments, while the dictation mode is active, while displaying the text cursor at the second location in the text-entry region and after detecting an end of the second input, the electronic device detects, via the one or more input devices, a third input corresponding to movement of the text cursor from the second location to a third location in the text-entry region, such as movement input **812*f* directed to the text cursor 821 as shown in FIG. 8**F. For example, the electronic device detects an interaction input directed to the text cursor that includes selection of the text cursor, followed by movement of the text cursor from the second location to the third location. In some embodiments, the electronic device detects a tap and hold by an object (e.g., a finger of the user or an input device) on a touch screen (e.g., or other touch sensitive surface) of the electronic device directed to the text cursor, followed by movement of the object on the touch screen (e.g., or other touch sensitive surface) to the third location in the text-entry region. In some embodiments, the electronic device detects the third input via an external input device (e.g., a mouse, trackpad, or keyboard), including a selection on the external input device that causes the text cursor to move to the third location (e.g., a click/press on the mouse, trackpad, or keyboard). In some embodiments, the electronic device detects an air pinch gesture directed to the text cursor (e.g., in which an index finger and thumb of the user contact while attention (e.g., gaze) of the user is directed to the text cursor), followed by movement of the pinch hand shape to the third location in the text-entry region. For example, the air pinch gesture is detected without the hand of the user touching a touch-sensitive surface (e.g., a touch screen of the electronic device), such as by one or more cameras in communication with the electronic device that capture images and/or track motion of the hand(s) of the user.

In some embodiments, in response to detecting the third input, the electronic device moves the text cursor from the second location to the third location in the text-entry region (e.g., displaying the text cursor at the third location), as similarly shown in FIG. 8G. In some embodiments, while displaying the text cursor at the third location in the text-entry region, the electronic device detects, via the one or more input devices, a fourth input that includes second speech input, such as speech input 816*c* in FIG. 8G. For example, as similarly described above, the electronic device detects, via a microphone of the electronic device, words, numbers, and/or special characters spoken by a user of the electronic device for compiling text to be displayed in the text-entry region.

In some embodiments, while detecting the fourth input, the electronic device displays, via the display generation component, a second text representation of the second speech input at the third location in the text-entry region, such as updating display of text 815 in the entry field 806 in accordance with the speech input as shown in FIG. 8H. For example, the electronic device displays font-based words, numbers, and/or special characters corresponding to the second speech input at the third location in the text-entry region. In some embodiments, when the electronic device displays the second text representation of the second speech input in the text-entry region, the electronic device moves the text cursor to a new location (e.g., a fourth location) of the text-entry region after (e.g., adjacent to) the second text representation. Displaying a second text representation of second speech input at a current location of a text cursor in a text-entry region in response to detecting the second speech input reduces the number of inputs needed to display the second text representation at the current location of the text cursor and/or enables the second text representation to be displayed at the current location of the text cursor without displaying additional controls, thereby improving user-device interaction.

In some embodiments, the text cursor is displayed at a second location of the text-entry region after detecting an end of the first speech input (e.g., the second location is a location at or after an end portion of the first representation of the first speech input, as described above). In some embodiments, while displaying the first text representation of the first speech input at the first location in the text-entry region and after detecting an end of the second input, the electronic device detects, via the one or more input devices, a third input that includes selection of one or more keys of a keyboard (e.g., keyboard 818 in FIG. 8K) associated with the text-entry region, such as selection input 812*k* as shown in FIG. 8K. For example, the electronic device detects the selection of the one or more keys on a soft keyboard associated with the text-entry region (e.g., displayed in the user interface). In some embodiments, the electronic device detects the one or more keys on an external (e.g., physical) keyboard in communication with the electronic device.

In some embodiments, while detecting the third input, the electronic device displays, via the display generation component, one or more characters corresponding to the selected one or more keys at the second location in the text-entry region, such as display of text 825 in entry field 806 as shown in FIG. 8L. For example, the electronic device displays font-based letters, numbers, and/or special characters corresponding to the selected one or more keys at the second location of the text cursor in the text-entry region. In some embodiments, as similarly described above, the text cursor moves in the text-entry region as the one or more characters are displayed in the text-entry region (e.g., to be adjacent to the entered one or more characters in the text-entry region).

In some embodiments, the electronic device forgoes displaying a second text representation of detected second speech input (e.g., speech input 816*d*) at the second location in the text-entry region, such as forgoing display of text corresponding to speech input 816*d* in the entry field 806 as shown in FIG. 8M. For example, while the electronic device is detecting the selection of the one or more keys of the keyboard, the electronic device detects second speech input provided by the user of the electronic device. In some embodiments, if the electronic device detects second speech input while also detecting the input on the keyboard, the electronic device forgoes displaying a second text representation of the second speech input in the text-entry region, despite the dictation mode being active. For example, the input detected at the keyboard controls the text that is displayed in the text-entry region when both keyboard input and speech input are detected. Forgoing display of a text representation of detected speech input in a text-entry region while a dictation mode is active at an electronic device when the electronic device detects input via a keyboard associated with the text-entry region enables text corresponding to the keyboard input to be displayed in the text-entry region without obstruction and/or conflict from text representation of the detected speech input and/or avoids unintentional display of the text representation of the detected speech input in the text-entry region, thereby improving user-device interaction.

In some embodiments, while detecting the selection of the one or more keys of the keyboard, the electronic device ceases display of the first visual indicator in the text-entry region, such as ceasing display of the visual indicator 822 in the entry field 806 as shown in FIG. 8L. For example, while the electronic device is detecting the input on the keyboard, the electronic device does not display the first visual indication in the text-entry region. In some embodiments, ceasing display of the first visual indicator in the text-entry region while the keys of the keyboard are being selected avoids obstruction of the display of the one or more characters corresponding to the selected one or more keys by the first visual indicator in the text-entry region. In some embodiments, ceasing display of the first visual indicator in the text-entry region while the keys of the keyboard are being selected indicates that speech input detected by the electronic device will not be converted into text that is displayed in the text-entry region. In some embodiments, after detecting the threshold amount of time described above has elapsed since detecting an end of the selection of the keys, the electronic device redisplays the first visual indicator in the text-entry region. For example, as similarly described above, the electronic device redisplays the first visual indicator at a current location of the text cursor in the text-entry region. Ceasing display of a visual indicator in a text-entry region that indicates a dictation mode is active at an electronic device when the electronic device detects selection of keys on a keyboard associated with the text-entry region enables text corresponding to the selected keys to be displayed in the text-entry region without obstruction by the visual indicator and/or avoids unwanted crowding and/or population of the text-entry region, thereby improving user-device interaction.

In some embodiments, the keyboard associated with the text-entry region includes one or more user interface objects that are selectable to enter suggested text into the text-entry region (e.g., while, before or after detecting the selection of the one or more keys of keyboard, the electronic device displays the one or more user interface objects above the keys of the keyboard based on the previously displayed characters in the text-entry region), such as user interface objects 828 in FIG. 8L. In some embodiments, while the dictation mode is active, while detecting the second speech input and while displaying the keyboard, the electronic device forgoes displaying, or deactivates, the one or more user interface objects that are selectable to enter suggested text into the text-entry region, such as forgoing display of, or deactivating, the user interface objects 828 as shown in FIG. 8M. For example, if the electronic device detects the second speech input, optionally while detecting the selection of the one or more keys of the keyboard, the electronic device does not display the one or more user interface objects above the one or more keys in the keyboard. In some embodiments, the electronic device displays the one or more user interface objects with a respective visual effect (e.g., a shading/greying effect) that indicates the one or more user interface objects are not selectable to enter suggested text into the text-entry region. For example, the one or more user interface objects are not displayed with the respective visual effect when the second speech input is not detected (e.g., indicating that the one or more user interface objects are selectable to enter suggested text into the text-entry region). In some embodiments, forgoing displaying or deactivating the one or more user interface objects helps ensure the suggested text is based on the characters displayed in the text-entry region in response to selection of the keys of the keyboard, rather than based on the detected speech input.

In some embodiments, while displaying the keyboard without detecting the second speech input, the electronic device displays the one or more user interface objects that are selectable to enter suggested text into the text-entry region, such as user interface objects 828 in FIG. 8N. For example, if the electronic device detects selection of one of the one or more user interface objects, the electronic device displays suggested text corresponding to the selected user interface object in the text-entry region. In some embodiments, in response to detecting an end of the second speech input (e.g., the electronic device no longer detects letters, numbers, and/or special characters spoken by the user), the electronic device redisplays and/or reactivates the one or more user interface objects that are selectable to enter suggested text into the text-entry region. Altering display of a user interface objects of a keyboard that are selectable to enter suggested text into a text-entry region while a dictation mode is active at an electronic device depending on whether speech input is detected helps ensure the suggested text is suggested based on input received via the keyboard rather than based on the detected speech input, thereby improving user-device interaction.

In some embodiments, in response to detecting the first input selecting the first selectable option, the dictation mode is active until detecting an input corresponding to an input for deactivating the dictation mode (e.g., a second selection of the first selectable option and/or selection of the first visual indicator, as similarly described above), such as activation of the dictation mode as described with reference to FIG. 8C. For example, speech input detected by the electronic device after the first selectable option has been selected and while the dictation mode is active is converted to text in the text-entry region. In some embodiments, pauses/breaks (e.g., 1, 2, 5, 10, 15, 30 or 45 seconds, or 1, 2, 4, 5, or 10 minutes) in between detecting speech input while the dictation mode is still active do not correspond to a second selection of the first selectable option, and the dictation mode remains active despite a lack of speech input being detected at the electronic device. In some embodiments, the dictation mode is active at the electronic device until the electronic device detects a second selection (e.g., a tap or touch input) directed to the first selectable option (e.g., in the soft keyboard) of the user interface. In some embodiments, as described above, in response to detecting selection of the first visual indicator, the electronic device deactivates the dictation mode at the electronic device. In some embodiments, while the dictation mode is deactivated, if the electronic device detects additional speech input, the electronic device forgoes displaying a second text representation of the speech input in the text-entry region. Maintaining activation of a dictation mode at an electronic device until input is detected that corresponds to a request to deactivate the dictation mode at the electronic device enables the dictation mode to remain active without receiving input for maintaining activation of the dictation mode and/or enables the user providing speech input for dictation to take pauses without having to reactivate the dictation mode at the electronic device, thereby improving user-device interaction.

In some embodiments, the text cursor is displayed at a second location of the text-entry region after detecting an end of the first speech input (e.g., the second location is a location at or after an end portion of the first representation of the first speech input, as described above). In some embodiments, while the dictation mode is active and after detecting an end of the first speech input, the electronic device detects, via the one or more input devices, a third input corresponding to a request to display a menu user interface element in the text-entry region, such as selection input 812*n* as shown in FIG. 8N. For example, the electronic device detects a respective gesture directed to the text-entry region. In some embodiments, the electronic device detects the third input directed to a portion of the first text representation in the text-entry region. In some embodiments, the electronic device detects the third input directed to a portion of the text-entry region that does not include text. In some embodiments, the electronic device detects the third input directed to the text cursor in the text-entry region. In some embodiments, the third input includes a double-tap gesture (or similar gesture) on a touch screen of the electronic device. In some embodiments, the third input includes selection via an input device (e.g., a mouse, trackpad, or keyboard) in communication with the electronic device. For example, the electronic device detects a respective click input in the text-entry region. In some embodiments, the electronic device detects an air pinch gesture directed to the text-entry region and/or the text cursor (e.g., in which an index finger and thumb of the user contact a predefined number of times (e.g., twice) and then release while attention (e.g., gaze) of the user is directed to the text-entry region and/or the text cursor). For example, as described above, the air pinch gesture is detected without the hand of the user touching a touch-sensitive surface (e.g., a touch screen of the electronic device), such as by one or more cameras in communication with the electronic device that capture images and/or track motion of the hand(s) of the user.

In some embodiments, in response to detecting the third input, the electronic device displays, via the display generation component, the menu user interface element at the second location of the text cursor in the text-entry region while the dictation mode remains active, such as display of menu element 829 as shown in FIG. 8O. For example, the electronic device displays a menu in the text-entry region at the second location of the text cursor. In some embodiments, the menu is displayed at the second location because the location at which the third input was received corresponds to the second location of the text cursor. In some embodiments, the menu is displayed at the second location because the menu is always displayed at the location of the text cursor, independent of the location of the input. In some embodiments the menu includes one or more options that are selectable to cause the electronic device to perform one or more corresponding operations. In some embodiments, the one or more corresponding operations involve the first text representation of the first speech input. For example, the one or more selectable options include a cut option, a copy option, and/or a paste option that are selectable to copy and remove a portion of the first text representation, to copy a portion of the first text representation, and/or enter previously copied content (e.g., text, images, hyperlinks) at the second location, respectively. Displaying a menu of selectable options in a text-entry region while a dictation mode remains active at an electronic device in response to receiving input corresponding to a request to display the menu facilitates user input for displaying additional text representation of additional speech input in the text-entry region while the menu is displayed and/or enables the selectable options of the menu to be selected to cause corresponding operations to be performed while the dictation mode is active, thereby improving user-device interaction.

In some embodiments, the first visual indicator is displayed within the menu user interface element with one or more second selectable options, such as display of visual indicator 822 within the menu element 829 as shown in FIG. 8O. For example, the first visual indicator is displayed adjacent to the one or more options in the menu user interface element to indicate that the dictation mode is still active at the electronic device. In some embodiments, the first visual indicator is displayed within the menu user interface element because no speech input is currently being detected by the electronic device, as previously discussed above. In some embodiments, while the first visual indicator is displayed in the menu user interface element, the first visual indicator is still selectable to deactivate the dictation mode, as described above. In some embodiments, the first visual indicator remains displayed in the text-entry region after the menu user interface element is no longer displayed (e.g., in response to an input to cease display of the menu, such as selection of one of the selectable options in the menu, or an input directed to a portion of the text entry region outside of the menu). Displaying a visual indicator that indicates a dictation mode is active at an electronic device within a menu of selectable options in a text-entry region when the menu is displayed facilitates discovery that the dictation mode is still active at the electronic device and/or facilitates user input for displaying additional text representation of additional speech input in the text-entry region while the menu is displayed, thereby improving user-device interaction.

In some embodiments, while the dictation mode is active, while displaying the first text representation of the first speech input at the first location in the text-entry region and after detecting an end of the second input, the electronic device detects, via the one or more input devices, a third input corresponding to selection of a portion of the first text representation in the text-entry region, such as selection input 812*n* directed to a portion of text 825 in the entry field 806 as shown in FIG. 8N. For example, the electronic device detects a respective gesture directed to the portion of the first text representation in the text-entry region. In some embodiments, the electronic device detects a double-tap gesture (or similar gesture) on a touch screen of the electronic device at a location corresponding to the portion of the first text representation. In some embodiments, the electronic device detects the selection via an input device (e.g., a mouse, trackpad, or keyboard) in communication with the electronic device. For example, the electronic device detects a click input followed by movement (e.g., of the text cursor) over the portion of the first text representation in the text-entry region. In some embodiments, the electronic device detects an air pinch gesture directed to the text cursor (e.g., in which an index finger and thumb of the user contact while attention (e.g., gaze) of the user is directed to the text cursor), followed by movement in the pinch hand shape over the portion of the first text representation in the text-entry region. For example, as described above, the air pinch gesture is detected without the hand of the user touching a touch-sensitive surface (e.g., a touch screen of the electronic device), such as by one or more cameras in communication with the electronic device that capture images and/or track motion of the hand(s) of the user.

In some embodiments, in response to detecting the third input, the electronic device selects the portion of the first text representation in accordance with the third input, such as selection of the portion of the text 825 in the entry field 806 as shown in FIG. 8O. For example, the electronic device displays the portion of the first text representation with visual emphasis. In some embodiments, the portion of the first text representation is displayed with highlighting or shading that indicates that the portion of the first text representation is selected. In some embodiments, as similarly discussed above, the electronic device displays a menu with the portion of the first text representation indicating that the first text representation is selected.

In some embodiments, while the portion of the first text representation is selected, the electronic device detects, via the one or more input devices, a fourth input that includes second speech input, such as speech input 816*f* in FIG. 8O. For example, as similarly described above, the electronic device detects, via a microphone of the electronic device, words, numbers, and/or special characters spoken by a user of the electronic device for compiling text to be displayed in the text-entry region.

In some embodiments, in response to detecting the fourth input, the electronic device replaces, via the display generation component, the selected portion of the first text representation of the first speech input with a second text representation of the second speech input in the text-entry region, such as replacing the selected portion of the text 825 with text 827 in the entry field 806 as shown in FIG. 8P. For example, the electronic device replaces the words, numbers, and/or special characters included in the selected portion of the first text representation with (e.g., optionally) different words, numbers, and/or special characters corresponding to the second speech input. In some embodiments, when the electronic device replaces the selected portion of the first text representation with the second text representation in the text-entry region, the electronic device moves the text cursor to a location of the text-entry region at which the second text representation is displayed (e.g., the end of the second text representation). In some embodiments, the portions of the first text representation of the first speech input that were not selected when the fourth input is detected remain displayed in the text-entry region. For example, the portions of the first text representation of the first speech input that were not selected do not get replaced with the second text representation of the second speech input in response to detecting the fourth input. Replacing a selected portion of a first text representation in the text-entry region with a second text representation of additional speech input in response to detecting the additional speech input reduces the number of inputs needed to replace the selected portion of the first text representation and/or enables the selected portion of the first text representation to be replaced without displaying additional controls, thereby improving user-device interaction.

It should be understood that the particular order in which the operations in method 900 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 900 described above with respect to FIG. 9. For example, the operation of the electronic device transcribing audio into text for transmission as a message, described above with reference to method 700 optionally has one or more of the characteristics of facilitating efficient inputting of audio for audio-based messaging, described herein with reference to other methods described herein (e.g., method 700). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5H) or application specific chips. Further, the operations described above with reference to FIG. 9 are, optionally, implemented by components depicted in FIGS. 1A-1B. For example, displaying operations 902*a*, 902*e*, and 902*h*, and detecting operations 902*d* and 902*f*, are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology potentially involves the gathering and use of data available from specific and legitimate sources to facilitate recording of audio messages. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information, usage history, handwriting styles, etc.

The present disclosure recognizes that the use of such personal information data in the present technology can be used to the benefit of users. For example, the personal information data can be used to automatically perform operations with respect to recording audio messages. Accordingly, use of such personal information data enables users to enter fewer inputs to perform an action with respect to recording audio messages. Further, other uses for personal information data that benefit the user are also contemplated by the present disclosure. For instance, speech styles may be used to identify correct audio messages or transcription.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the user is able to configure one or more electronic devices to change the discovery or privacy settings of the electronic device. For example, the user can select a setting that only allows an electronic device to access certain of the user's speech data when recording audio messages.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, audio messages can be recognized based on aggregated non-personal information data or a bare minimum amount of personal information, such as the audio information being handled only on the user's device or other non-personal information.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:

at an electronic device in communication with a display generation component and one or more input devices:

displaying, via the display generation component, a messaging user interface that includes a respective selectable option for recording an audio message, the messaging user interface corresponding to a messaging conversation including a first user of the electronic device and a second user of a second electronic device, different from the electronic device;

while displaying the messaging user interface, detecting, via the one or more input devices, a first input including an initiation of a selection input detected at a location corresponding to the respective selectable option and a termination of the selection input while continuing to display the respective selectable option, wherein the first input satisfies one or more first criteria;

in response to detecting the initiation of the selection input, initiating a process to record a respective audio message at the electronic device while continuing to display the respective selectable option;

in response to detecting the termination of the selection input:

in accordance with a determination that the termination of the selection input was detected at a first location within a boundary of the respective selectable option, transmitting, to the messaging conversation, the respective audio message including audio recorded between the initiation of the selection input and the termination of the selection input; and in accordance with a determination that the termination of the selection input was detected at a second location in a region of the messaging user interface outside of an area of the respective selectable option, terminating the process to record the respective audio message without transmitting the respective audio message to the messaging conversation.

2. The method of claim 1, further comprising:

while displaying the messaging user interface, detecting, via the one or more input devices, a second input including an initiation of a second selection input detected at a location corresponding to the respective selectable option and a termination of the second selection input detected at a location corresponding to the respective selectable option, wherein the second input does not satisfy the one or more first criteria;

in response to detecting the second input, initiating a second process to record a second respective audio message at the electronic device;

while the second process is being performed, detecting, via the one or more input devices, a third input including an initiation of a third selection input detected at a location corresponding to the respective selectable option and a termination of the third selection input detected at a location corresponding to the respective selectable option, wherein the third input does not satisfy the one or more first criteria; and in response to detecting the third input, ceasing the second process to record the second respective audio message and storing the second respective audio message, the second respective audio message including audio recorded while the second process was being performed.

3. The method of claim 2, wherein:

after detecting the second input and before detecting the third input, the respective selectable option is selectable to cease the second process, and in response to detecting the third input, the respective selectable option is selectable to playback the second respective audio message at the electronic device.

4. The method of claim 2, wherein:

the messaging user interface includes a content entry field for accepting content to be transmitted to the messaging conversation, after detecting the second input and before detecting the third input, the content entry field does not include a selectable option that is selectable to transmit the second respective audio message to the messaging conversation, and in response to detecting the third input, the content entry field does include the selectable option that is selectable to transmit the second respective audio message to the messaging conversation.

5. The method of claim 2, wherein:

the messaging user interface includes a content entry field for accepting content to be transmitted to the messaging conversation, after detecting the second input and before detecting the third input, the content entry field does not include a selectable option that is selectable to void the second respective audio message, and in response to detecting the third input, the content entry field does include the selectable option that is selectable to void the second respective audio message.

6. The method of claim 5, wherein the content entry field does not include a selectable option that is selectable to void the respective audio message while detecting or in response to detecting the first input.

7. The method of claim 5, wherein the content entry field does not include a selectable option that is selectable to transmit the respective audio message to the messaging conversation while detecting or in response to detecting the first input.

8. The method of claim 1, further comprising:

while detecting the first input, changing a value of a respective visual characteristic of the respective selectable option based on audio detected by the electronic device.

9. The method of claim 1, wherein the messaging user interface includes a content entry field for accepting content to be transmitted to the messaging conversation, and the respective selectable option is displayed outside of the content entry field.

10. The method of claim 9, wherein the content entry field includes a second respective selectable option that is selectable to initiate a process to transcribe audio detected at the electronic device into font-based text in the content entry field.

11. The method of claim 10, further comprising:

while the process to record the respective audio message is being performed, replacing display of the second respective selectable option in the content entry field with display of a visual indicator that indicates information associated with audio detected at the electronic device during the process to record the respective audio message.

12. The method of claim 9, wherein the respective selectable option is displayed in a first region of the messaging user interface in response to detecting selection of a first option in a respective user interface element displayed in the messaging user interface, the respective user interface element further including a second option that is selectable to display a second user interface, different from the respective selectable option, in the first region of the messaging user interface.

13. An electronic device, comprising:

one or more processors;

memory; and one or more programs, wherein the one or more programs are stored in the memory and configured to be executed by the one or more processors, the one or more programs including instructions for:

displaying, via a display generation component, a messaging user interface that includes a respective selectable option for recording an audio message, the messaging user interface corresponding to a messaging conversation including a first user of the electronic device and a second user of a second electronic device, different from the electronic device;

while displaying the messaging user interface, detecting, via one or more input devices, a first input including an initiation of a selection input detected at a location corresponding to the respective selectable option and a termination of the selection input while continuing to display the respective selectable option, wherein the first input satisfies one or more first criteria;

in response to detecting the initiation of the selection input, initiating a process to record a respective audio message at the electronic device while continuing to display the respective selectable option;

in response to detecting the termination of the selection input:

in accordance with a determination that the termination of the selection input was detected at a first location within a boundary of the respective selectable option, transmitting, to the messaging conversation, the respective audio message including audio recorded between the initiation of the selection input and the termination of the selection input; and in accordance with a determination that the termination of the selection input was detected at a second location in a region of the messaging user interface outside of an area of the respective selectable option, terminating the process to record the respective audio message without transmitting the respective audio message to the messaging conversation.

14. A non-transitory computer readable storage medium storing one or more programs, the one or more programs comprising instructions, which when executed by one or more processors of an electronic device, cause the electronic device to perform a method comprising:

displaying, via a display generation component, a messaging user interface that includes a respective selectable option for recording an audio message, the messaging user interface corresponding to a messaging conversation including a first user of the electronic device and a second user of a second electronic device, different from the electronic device;

while displaying the messaging user interface, detecting, via one or more input devices, a first input including an initiation of a selection input detected at a location corresponding to the respective selectable option and a termination of the selection input while continuing to display the respective selectable option, wherein the first input satisfies one or more first criteria;

in response to detecting the initiation of the selection input, initiating a process to record a respective audio message at the electronic device while continuing to display the respective selectable option;

in response to detecting the termination of the selection input:

in accordance with a determination that the termination of the selection input was detected at a first location within a boundary of the respective selectable option, transmitting, to the messaging conversation, the respective audio message including audio recorded between the initiation of the selection input and the termination of the selection input; and in accordance with a determination that the termination of the selection input was detected at a second location in a region of the messaging user interface outside of an area of the respective selectable option, terminating the process to record the respective audio message without transmitting the respective audio message to the messaging conversation.

15. The electronic device of claim 13, wherein the one or more programs further include instructions for:

while displaying the messaging user interface, detecting, via the one or more input devices, a second input including an initiation of a second selection input detected at a location corresponding to the respective selectable option and a termination of the second selection input detected at a location corresponding to the respective selectable option, wherein the second input does not satisfy the one or more first criteria;

in response to detecting the second input, initiating a second process to record a second respective audio message at the electronic device;

while the second process is being performed, detecting, via the one or more input devices, a third input including an initiation of a third selection input detected at a location corresponding to the respective selectable option and a termination of the third selection input detected at a location corresponding to the respective selectable option, wherein the third input does not satisfy the one or more first criteria; and in response to detecting the third input, ceasing the second process to record the second respective audio message and storing the second respective audio message, the second respective audio message including audio recorded while the second process was being performed.

16. The electronic device of claim 15, wherein:

after detecting the second input and before detecting the third input, the respective selectable option is selectable to cease the second process, and in response to detecting the third input, the respective selectable option is selectable to playback the second respective audio message at the electronic device.

17. The electronic device of claim 15, wherein:

the messaging user interface includes a content entry field for accepting content to be transmitted to the messaging conversation, after detecting the second input and before detecting the third input, the content entry field does not include a selectable option that is selectable to transmit the second respective audio message to the messaging conversation, and in response to detecting the third input, the content entry field does include the selectable option that is selectable to transmit the second respective audio message to the messaging conversation.

18. The electronic device of claim 15, wherein:

the messaging user interface includes a content entry field for accepting content to be transmitted to the messaging conversation, after detecting the second input and before detecting the third input, the content entry field does not include a selectable option that is selectable to void the second respective audio message, and in response to detecting the third input, the content entry field does include the selectable option that is selectable to void the second respective audio message.

19. The electronic device of claim 18, wherein the content entry field does not include a selectable option that is selectable to void the respective audio message while detecting or in response to detecting the first input.

20. The electronic device of claim 18, wherein the content entry field does not include a selectable option that is selectable to transmit the respective audio message to the messaging conversation while detecting or in response to detecting the first input.

21. The electronic device of claim 13, wherein the one or more programs further include instructions for:

while detecting the first input, changing a value of a respective visual characteristic of the respective selectable option based on audio detected by the electronic device.

22. The electronic device of claim 13, wherein the messaging user interface includes a content entry field for accepting content to be transmitted to the messaging conversation, and the respective selectable option is displayed outside of the content entry field.

23. The electronic device of claim 22, wherein the content entry field includes a second respective selectable option that is selectable to initiate a process to transcribe audio detected at the electronic device into font-based text in the content entry field.

24. The electronic device of claim 23, wherein the one or more programs further include instructions for:

while the process to record the respective audio message is being performed, replacing display of the second respective selectable option in the content entry field with display of a visual indicator that indicates information associated with audio detected at the electronic device during the process to record the respective audio message.

25. The electronic device of claim 22, wherein the respective selectable option is displayed in a first region of the messaging user interface in response to detecting selection of a first option in a respective user interface element displayed in the messaging user interface, the respective user interface element further including a second option that is selectable to display a second user interface, different from the respective selectable option, in the first region of the messaging user interface.

26. The non-transitory computer readable storage medium of claim 14, further storing instructions which, when executed by the one or more processors, further cause the electronic device perform:

while displaying the messaging user interface, detecting, via the one or more input devices, a second input including an initiation of a second selection input detected at a location corresponding to the respective selectable option and a termination of the second selection input detected at a location corresponding to the respective selectable option, wherein the second input does not satisfy the one or more first criteria;

in response to detecting the second input, initiating a second process to record a second respective audio message at the electronic device;

while the second process is being performed, detecting, via the one or more input devices, a third input including an initiation of a third selection input detected at a location corresponding to the respective selectable option and a termination of the third selection input detected at a location corresponding to the respective selectable option, wherein the third input does not satisfy the one or more first criteria; and in response to detecting the third input, ceasing the second process to record the second respective audio message and storing the second respective audio message, the second respective audio message including audio recorded while the second process was being performed.

27. The non-transitory computer readable storage medium of claim 26, wherein:

after detecting the second input and before detecting the third input, the respective selectable option is selectable to cease the second process, and in response to detecting the third input, the respective selectable option is selectable to playback the second respective audio message at the electronic device.

28. The non-transitory computer readable storage medium of claim 26, wherein:

the messaging user interface includes a content entry field for accepting content to be transmitted to the messaging conversation, after detecting the second input and before detecting the third input, the content entry field does not include a selectable option that is selectable to transmit the second respective audio message to the messaging conversation, and in response to detecting the third input, the content entry field does include the selectable option that is selectable to transmit the second respective audio message to the messaging conversation.

29. The non-transitory computer readable storage medium of claim 26, wherein:

the messaging user interface includes a content entry field for accepting content to be transmitted to the messaging conversation, after detecting the second input and before detecting the third input, the content entry field does not include a selectable option that is selectable to void the second respective audio message, and in response to detecting the third input, the content entry field does include the selectable option that is selectable to void the second respective audio message.

30. The non-transitory computer readable storage medium of claim 29, wherein the content entry field does not include a selectable option that is selectable to void the respective audio message while detecting or in response to detecting the first input.

31. The non-transitory computer readable storage medium of claim 29, wherein the content entry field does not include a selectable option that is selectable to transmit the respective audio message to the messaging conversation while detecting or in response to detecting the first input.

32. The non-transitory computer readable storage medium of claim 14, further storing instructions which, when executed by the one or more processors, further cause the electronic device to perform:

while detecting the first input, changing a value of a respective visual characteristic of the respective selectable option based on audio detected by the electronic device.

33. The non-transitory computer readable storage medium of claim 14, wherein the messaging user interface includes a content entry field for accepting content to be transmitted to the messaging conversation, and the respective selectable option is displayed outside of the content entry field.

34. The non-transitory computer readable storage medium of claim 33, wherein the content entry field includes a second respective selectable option that is selectable to initiate a process to transcribe audio detected at the electronic device into font-based text in the content entry field.

35. The non-transitory computer readable storage medium of claim 34, further storing instructions which, when executed by the one or more processors, further cause the electronic device to perform:

while the process to record the respective audio message is being performed, replacing display of the second respective selectable option in the content entry field with display of a visual indicator that indicates information associated with audio detected at the electronic device during the process to record the respective audio message.

36. The non-transitory computer readable storage medium of claim 33, wherein the respective selectable option is displayed in a first region of the messaging user interface in response to detecting selection of a first option in a respective user interface element displayed in the messaging user interface, the respective user interface element further including a second option that is selectable to display a second user interface, different from the respective selectable option, in the first region of the messaging user interface.

* * * * *